(12) United States Patent  (10) Patent No.: US 8,749,740 B2
Ashida et al.  (45) Date of Patent: Jun. 10, 2014

(54) LIQUID CRYSTAL DISPLAY DEVICE

(75) Inventors: Takeyuki Ashida, Osaka (JP); Yasuhiko Sugihara, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 173 days.

(21) Appl. No.: 13/393,926

(22) PCT Filed: Jun. 14, 2010

(86) PCT No.: PCT/JP2010/060044
§ 371 (c)(1),
(2), (4) Date: Mar. 2, 2012

(87) PCT Pub. No.: WO2011/030596
PCT Pub. Date: Mar. 17, 2011

(65) Prior Publication Data
US 2012/0162581 A1 Jun. 28, 2012

(30) Foreign Application Priority Data
Sep. 8, 2009 (JP) ................................. 2009-207543

(51) Int. Cl.
*G02F 1/1335* (2006.01)
(52) U.S. Cl.
USPC ........................................................ 349/119
(58) Field of Classification Search
USPC ........................................................ 349/119
See application file for complete search history.

(56) References Cited

U.S. PATENT DOCUMENTS 6,452,646 B1 * 9/2002 Sharp et al. ...................... 349/18
2006/0221283 A1 * 10/2006 Nakao et al. ................... 349/117
(Continued)

FOREIGN PATENT DOCUMENTS

EP 1 986 042 A1 10/2008
JP 2007-192916 8/2007
(Continued)

OTHER PUBLICATIONS

International Search Report for PCT/JP2010/060044, mailed Aug. 10, 2010.

*Primary Examiner* — Timothy L Rude
(74) *Attorney, Agent, or Firm* — Nixon & Vanderhye, P.C.

(57) ABSTRACT

The present invention provides a liquid crystal display device exhibiting an excellent gray scale inversion characteristic in a state where a color close to black is displayed. The present invention is a liquid crystal display device including a first polarizer, a second polarizer disposed to face the first polarizer, a liquid crystal display panel provided between the first polarizer and the second polarizer, and a first phase plate and a second phase plate provided between the first or second polarizer and the liquid crystal display panel. In the liquid crystal display device, the liquid crystal display panel has a pair of substrates disposed to face each other and a liquid crystal layer sandwiched between the pair of substrates, the liquid crystal layer includes a homogeneously aligned liquid crystal molecule, the first phase plate includes a liquid crystal film, the liquid crystal film is formed by being set in a state where a nematic liquid crystal is hybrid-aligned, and a specific phase difference as a phase difference in a perpendicular direction of a member which is present between the first and second polarizers, excluding the liquid crystal layer and the first phase plate, is 120 nm or more.

19 Claims, 91 Drawing Sheets

Structure 1-4

(56) References Cited

U.S. PATENT DOCUMENTS

| | | |
|---|---|---|
| 2009/0096960 A1 | 4/2009 | Uesaka |
| 2009/0185111 A1 | 7/2009 | Uesaka et al. |
| 2009/0284689 A1 | 11/2009 | Ikeda et al. |
| 2010/0085522 A1 | 4/2010 | Uesaka et al. |
| 2010/0149461 A1* | 6/2010 | Lo et al. ................. 349/102 |
| 2010/0182544 A1 | 7/2010 | Ikeda et al. |

FOREIGN PATENT DOCUMENTS

| | | |
|---|---|---|
| JP | 2007-199257 | 8/2007 |
| JP | 2007-212959 | 8/2007 |
| JP | 2007-316211 | 12/2007 |
| JP | 2008-129177 | 6/2008 |
| JP | 2008-309957 | 12/2008 |
| JP | 2009-042657 | 2/2009 |
| WO | WO 2007/100143 A1 | 9/2007 |

* cited by examiner

Structure 1

Structure 1 +
transparent protective layer

Structure 1-1

Structure 1-2

Structure 1-3

Structure 1-4

6
12

10

11
13
5

Structure 2

6

10

11
12
5

Structure 2 +
transparent protective layer

Structure 2-1

Structure 2-2

Structure 2-3

Structure 2-4

(a)

(b)

(c)

(d)

(e)

(f)

(g)

(e)

(f)

(g)

(a)

(b)

(c)

(d)

(e)

(f)

(g)

(e)

(f)

(g)

(e)

(f)

(g)

(a)

(b)

(c)

(d)

(e)

(f)

(g)

(a)

(b)

(c)

(d)

(e)

(f)

(g)

(a)

(b)

(c)

(d)

(e)

(f)

(g)

(h)

(i)

(j)

(k)

(l)

(e)

(f)

(g)

(h)

(i)

(j)

(k)

(l)

(a)

(b)

(c)

(d)

(e)

(f)

(g)

(h)

(i)

(j)

(k)

(l)

(a)

(b)

(c)

(d)

(e)

(f)

(g)

(h)

(i)

(j)

(k)

(l)

(a)

(b)

(c)

(d)

(e)

(f)

(g)

(h)

(i)

(j)

(k)

(l)

(a)

(b)

(c)

(d)

(e)

(f)

(g)

(h)

(a)

(b)

(c)

(d)

(e)

(f)

(g)

(h)

(i)

(j)

(k)

(l)

(a)

(b)

(c)

(d)

(i)

(j)

(k)

(l)

Structure 1-1

Structure 1-2

Structure 1-3

Structure 1-4

(a)

(b)

(c)

(d)

(e)

(f)

(g)

(h)

(i)

(j)

(k)

(l)

(a)

(b)

(c)

(d)

(e)

(f)

(g)

(h)

(i)

(j)

(k)

(l)

(e)

(f)

(g)

(h)

(i)

(j)

(k)

(l)

(a)

(b)

(c)

(d)

(e)

(f)

(g)

(h)

(i)

(j)

(k)

(l)

(a)

(b)

(c)

(d)

(e)

(f)

(g)

(h)

(i)

(j)

(k)

(l)

(a)

(b)

(c)

(d)

(e)

(f)

(g)

(h)

(i)

(j)

(k)

(l)

(a)

(b)

(c)

(d)

(e)

(f)

(g)

(h)

(i)

(j)

(k)

(l)

(a)

(b)

(c)

(d)

(e)

(f)

(g)

(h)

(i)

(j)

(k)

(l)

Structure 2-1

Structure 2-2

Structure 2-3

Structure 2-4

LIQUID CRYSTAL DISPLAY DEVICE

This application is the U.S. phase of International Application No. PCT/JP2010/060044 filed 14 Jun. 2010 which designated the U.S. and claims priority to JP 2009-207543 filed 8 Sep. 2009, the entire contents of each of which are hereby incorporated by reference.

TECHNICAL FIELD

The present invention relates to a liquid crystal display device. More specifically, the present invention relates to a liquid crystal display device suitable as an ECB (Electrically Controlled Birefringence) mode liquid crystal display device.

BACKGROUND ART

A liquid crystal display device normally includes a pair of polarizers, a liquid crystal display panel (a liquid crystal cell) sandwiched between the pair of polarizers, and one or a plurality of phase plates disposed between the liquid crystal display panel and at least one of the pair of polarizers. The liquid crystal display panel has a pair of substrates disposed to face each other and a liquid crystal layer sandwiched between the pair of substrates.

Examples of the mode of the liquid crystal display panel include a TN (Twisted Nematic) mode, an STN (Super Twisted Nematic) mode, an ECB mode, an IPS (In-Plane Switching) mode, a VA (Vertical Alignment) mode, an OCB (Optically Compensated Birefringence) mode, an HAN (Hybrid Aligned Nematic) mode, an ASM (Axially Symmetric Aligned Microcell) mode, a half tone gray scale mode, a domain division mode, and a display mode using a ferroelectric liquid crystal or an antiferroelectric liquid crystal.

With reference to the ECB mode, there is disclosed a technology utilizing a liquid crystal film set in a state where a nematic liquid crystal is hybrid-aligned (see, e.g., Patent Documents 1 to 4).

[Patent Document 1] Japanese Patent Application Laid-open No. 2007-316211
[Patent Document 2] Japanese Patent Application Laid-open No. 2008-129177
[Patent Document 3] Japanese Patent Application Laid-open No. 2008-309957
[Patent Document 4] Japanese Patent Application Laid-open No. 2009-42657

However, in an ECB mode liquid crystal display device described in each of Patent Documents 1 to 4, there have been cases where gray scale is inverted in a wide visual angle range when a color close to black is displayed.

DISCLOSURE OF THE INVENTION

The present invention has been achieved in view of the above-described circumstances, and an object thereof is to provide a liquid crystal display device which exhibits an excellent gray scale inversion characteristic in a state where a color close to black is displayed.

The present inventors have conducted various studies on a liquid crystal display device which exhibits an excellent gray scale inversion characteristic in a state where a color close to black is displayed. As a result, the present inventors have found that it is possible to reduce a viewing angle range where gray scale inversion occurs when a color close to black is displayed by employing a mode in which a phase difference in a perpendicular direction of a member which is present between a pair of polarizers, excluding a liquid crystal layer and a phase plate (a first phase plate) including a liquid crystal film, is 130 nm or more, and/or a mode in which the phase difference of a liquid crystal display panel is 210 to 310 nm, an average tilt angle of a nematic liquid crystal included in the liquid crystal film is 34 to 40°, an in-plane phase difference of a second phase plate is 130 to 150 nm, and an Nz coefficient of the second phase plate is 1.35 to 1.75, and the present inventors have conceived that the above-described problem can be perfectly solved by the reduction in viewing angle range and have reached the present invention.

That is, the present invention is a liquid crystal display device including a first polarizer, a second polarizer, a liquid crystal display panel, a first phase plate, and a second phase plate, wherein the second polarizer is disposed to face the first polarizer, the liquid crystal display panel is provided between the first polarizer and the second polarizer, the first phase plate and the second phase plate are provided between the first or second polarizer and the liquid crystal display panel independently of each other, the liquid crystal display panel has a pair of substrates disposed to face each other and a liquid crystal layer sandwiched between the pair of substrates, the liquid crystal layer includes a homogeneously aligned liquid crystal molecule, the first phase plate includes a liquid crystal film, the liquid crystal film is formed by being set in a state where a nematic liquid crystal is hybrid-aligned, and a specific phase difference as a phase difference in a perpendicular direction of a member which is present between the first and second polarizers, excluding the liquid crystal layer and the first phase plate, is 120 nm or more (hereinafter also referred to as a "first liquid crystal display device of the present invention").

When the specific phase difference is less than 120 nm, gray scale inversion may not be sufficiently suppressed when a color close to black is displayed.

The configuration of the first liquid crystal display device of the present invention is not especially limited by other components as long as it essentially includes such components.

A detailed description is given hereinbelow of preferred modes in the first liquid crystal display device of the present invention.

Although the upper limit of the specific phase difference is not particularly limited, the upper limit thereof is preferably 330 nm. Normally, before the value mentioned above, a gray scale inversion characteristic reaches its peak.

The first polarizer, the first phase plate, the liquid crystal display panel, the second phase plate, and the second polarizer may be disposed in this order, and the specific phase difference may be 120 nm or more and 300 nm or less. With this, it is possible to exhibit a further excellent gray scale inversion characteristic in a state where a color close to black is displayed.

The liquid crystal display device may further include a transparent protective layer having a phase difference in a perpendicular direction of 25 nm or more and 35 nm or less, the first polarizer, the transparent protective layer, the first phase plate, the liquid crystal display panel, the second phase plate, and the second polarizer may be disposed in this order, and the specific phase difference may be 150 nm or more and 330 nm or less. With this, it is possible to exhibit the further excellent gray scale inversion characteristic in the state where a color close to black is displayed.

The liquid crystal display device may further include a third phase plate exhibiting optically negative uniaxiality in a perpendicular direction, the first polarizer, the first phase plate, the liquid crystal display panel, the second phase plate, the third phase plate, and the second polarizer may be disposed in this order, and the specific phase difference may be 140 nm or more and 250 nm or less. With this, it is possible to exhibit the further excellent gray scale inversion characteristic in the state where a color close to black is displayed without deteriorating an isocontrast characteristic.

The liquid crystal display device may further include a third phase plate exhibiting optically negative uniaxiality in a perpendicular direction, the first polarizer, the first phase plate, the liquid crystal display panel, the third phase plate, the second phase plate, and the second polarizer may be disposed in this order, and the specific phase difference may be 130 nm or more and 290 nm or less. With this, it is possible to exhibit the further excellent gray scale inversion characteristic in the state where a color close to black is displayed without deteriorating the isocontrast characteristic.

The liquid crystal display device may further include a third phase plate exhibiting optically negative uniaxiality in a perpendicular direction, the first polarizer, the first phase plate, the third phase plate, the liquid crystal display panel, the second phase plate, and the second polarizer may be disposed in this order, and the specific phase difference may be 130 nm or more and 290 nm or less. With this, it is possible to exhibit the further excellent gray scale inversion characteristic in the state where a color close to black is displayed without deteriorating the isocontrast characteristic.

The liquid crystal display device may further include a third phase plate exhibiting optically negative uniaxiality in a perpendicular direction, the first polarizer, the third phase plate, the first phase plate, the liquid crystal display panel, the second phase plate, and the second polarizer may be disposed in this order, and the specific phase difference may be 140 nm or more and 250 nm or less. With this, it is possible to exhibit the further excellent gray scale inversion characteristic in the state where a color close to black is displayed without deteriorating the isocontrast characteristic.

Thus, in the mode in which the first polarizer, the first phase plate, the liquid crystal display panel, the second phase plate, and the second polarizer are disposed in this order (hereinafter also referred to as a "first mode"), the specific phase difference is preferably 150 nm or more and 250 nm or less. With this, in the first mode, it is possible to reliably exhibit the further excellent gray scale inversion characteristic in the state where a color close to black is displayed.

The first polarizer, the second phase plate, the first phase plate, the liquid crystal display panel, and the second polarizer may be disposed in this order, and the specific phase difference may be 120 nm or more and 260 nm or less. With this, it is possible to exhibit the further excellent gray scale inversion characteristic in the state where a color close to black is displayed.

The liquid crystal display device may further include a transparent protective layer having a phase difference in a perpendicular direction of 25 nm or more and 35 nm or less, the first polarizer, the transparent protective layer, the second phase plate, the first phase plate, the liquid crystal display panel, and the second polarizer may be disposed in this order, and the specific phase difference may be 150 nm or more and 240 nm or less. With this, it is possible to exhibit the further excellent gray scale inversion characteristic in the state where a color close to black is displayed.

The liquid crystal display device may further include a third phase plate exhibiting optically negative uniaxiality in a perpendicular direction, the first polarizer, the second phase plate, the first phase plate, the liquid crystal display panel, the third phase plate, and the second polarizer may be disposed in this order, and the specific phase difference may be 140 nm or more and 250 nm or less. With this, it is possible to exhibit the further excellent gray scale inversion characteristic in the state where a color close to black is displayed without deteriorating the isocontrast characteristic.

The liquid crystal display device may further include a third phase plate exhibiting optically negative uniaxiality in a perpendicular direction, the first polarizer, the second phase plate, the first phase plate, the third phase plate, the liquid crystal display panel, and the second polarizer may be disposed in this order, and the specific phase difference may be 140 nm or more and 210 nm or less. With this, it is possible to exhibit the further excellent gray scale inversion characteristic in the state where a color close to black is displayed without deteriorating the isocontrast characteristic.

The liquid crystal display device may further include a third phase plate exhibiting optically negative uniaxiality in a perpendicular direction, the first polarizer, the second phase plate, the third phase plate, the first phase plate, the liquid crystal display panel, and the second polarizer may be disposed in this order, and the specific phase difference may be 130 nm or more and 210 nm or less. With this, it is possible to exhibit the further excellent gray scale inversion characteristic in the state where a color close to black is displayed without deteriorating the isocontrast characteristic.

The liquid crystal display device may further include a third phase plate exhibiting optically negative uniaxiality in a perpendicular direction, the first polarizer, the third phase plate, the second phase plate, the first phase plate, the liquid crystal display panel, and the second polarizer may be disposed in this order, and the specific phase difference may be 140 nm or more and 270 nm or less. With this, it is possible to exhibit the further excellent gray scale inversion characteristic in the state where a color close to black is displayed without deteriorating the isocontrast characteristic.

Thus, in the mode in which the first polarizer, the second phase plate, the first phase plate, the liquid crystal display panel, and the second polarizer are disposed in this order (hereinafter also referred to as a "second mode"), the specific phase difference is preferably 150 nm or more and 210 nm or less. With this, in the second mode, it is possible to exhibit the further excellent gray scale inversion characteristic in the state where a color close to black is displayed.

According to the first liquid crystal display device of the present invention, it is possible to achieve a non-gray scale inversion share of preferably 60% or more.

The present invention is also a liquid crystal display device including a first polarizer, a second polarizer, a liquid crystal display panel, a first phase plate, and a second phase plate, wherein the second polarizer is disposed to face the first polarizer, the liquid crystal display panel is provided between the first polarizer and the second polarizer, the first phase plate is provided between the first polarizer and the liquid crystal display panel, the second phase plate is provided between the second polarizer and the liquid crystal display panel, the liquid crystal display panel has a pair of substrates disposed to face each other and a liquid crystal layer sandwiched between the pair of substrates, the liquid crystal layer includes a homogeneously aligned liquid crystal molecule, a phase difference of the liquid crystal display panel is 210 to 310 nm, the first phase plate includes a liquid crystal film, the liquid crystal film is formed by being set in a state where a nematic liquid crystal is hybrid-aligned, an average tilt angle of the nematic liquid crystal is 34 to 40°, an in-plane phase difference of the second phase plate is 130 to 150 nm, and an Nz coefficient of the second phase plate is 1.35 to 1.75 (hereinafter also referred to as a "second liquid crystal display device of the present invention").

The configuration of the second liquid crystal display device of the present invention is not especially limited by other components as long as it essentially includes such components.

According to the second liquid crystal display device of the present invention, it is possible to achieve the non-gray scale inversion share of preferably 60% or more.

Effects of the Invention

According to each of the first and second liquid crystal display devices of the present invention, it is possible to exhibit an excellent gray scale inversion characteristic in a state where a color close to black is displayed.

BEST MODE FOR CARRYING OUT THE INVENTION

Figure 1:
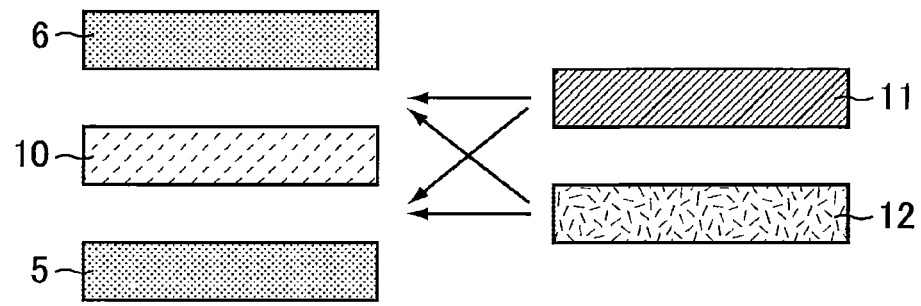
FIG. 1 is a schematic cross-sectional view showing a structure of a liquid crystal display device according to a first embodiment.

In the present description, a non-gray scale inversion share denotes a percentage of a range where gray scale inversion does not occur relative to a total viewing angle Tange. In addition, the presence or absence of the gray scale inversion is determined by comparing brightness ratios between the 0th level and the 7th level in the display of 64 levels of gray scale from the 0th level (black display) to the 63rd level (white display).

Further, in the present description, a viewing angle share denotes a percentage of a range where a contrast ratio is 50:1 or more relative to the total viewing angle range.

Note that the total viewing angle range means a range in all azimuths having a polar angle of 0 to 80°.

In the present description, a liquid crystal film means a film obtained by forming a liquid crystal material such as a low-molecular liquid crystal, a high-molecular liquid crystal, and the like into a film. Although the presence or absence of liquid crystal properties of the liquid crystal film itself is not particularly limited, the liquid crystal film does not normally exhibit the liquid crystal properties.

Furthermore, in the present description, an average tilt angle means an average value of an angle formed between a director of a nematic liquid crystal and a plane of the liquid crystal film in a perpendicular direction of the liquid crystal film. The average tilt angle can be determined by employing a crystal rotation method.

Other definitions of terms and symbols in the present description are as follows unless otherwise specified:
(1) Principal indices of refraction ($n_x$, $n_y$, $n_z$)

"$n_x$" is an index of refraction in a direction in which the index of refraction is maximized in a plane of an optically anisotropic layer (i.e., a slow axis direction), "$n_y$" is an index of refraction in a direction orthogonal to the slow axis in the plane of the layer (i.e., a fast axis direction), and "$n_z$" is an index of refraction in a perpendicular direction of the layer.
(2) In-plane phase difference Re An in-plane phase difference Re is a phase difference value determined by $(n_x - n_y) \times d$ when the thickness of the optically anisotropic layer is represented by d (nm).

(3) Phase difference in perpendicular direction Rth

A phase difference value in a perpendicular direction Rth is a phase difference value determined by $((nx+ny)/2-nz) \times d$ when the thickness of the optically anisotropic layer is represented by d (nm).

(4) Nz coefficient

An Nz coefficient is a value defined by $(nx-nz)/(nx-ny)$.

(5) The Re, Rth, and Nz coefficient satisfy the relationship of Rth=Re×(Nz coefficient−0.5).

The phase difference value of the optically anisotropic layer was measured by using Rets-200PT-Rf manufactured by Otsuka Electronics Co. Ltd.

The Nz coefficient of the optically anisotropic layer was measured by using Rets-200PT-Rf manufactured by Otsuka Electronics Co. Ltd. The Nz coefficient was calculated on the basis of the phase difference value in a front direction (a direction of the normal to a screen), the phase difference value from a direction obtained by rotating the normal direction by 45° with the slow axis of the optically anisotropic layer used as the rotation axis, the index of refraction of the optically anisotropic layer, and the thickness of the optically anisotropic layer.

EZcontrast manufactured by ELDIM was used for the measurement of a gray scale inversion characteristic.

Note that, in the present description, the index of refraction, the phase difference value, and the Nz coefficient are values in single-color light having a wavelength of 550 nm at a temperature of 25° C. unless otherwise specified.

The present invention will be mentioned in more detail referring to the drawings in the following embodiments, but is not limited to these embodiments.

(First Embodiment)

A liquid crystal display device of the present embodiment is a transmission liquid crystal display device and, as shown in FIG. 1, includes a first polarizer 5, a liquid crystal display panel (liquid crystal cell) 10, a second polarizer 6, a first phase plate 11, a second phase plate 12, and a backlight provided behind theses elements. The first polarizer 5, the liquid crystal display panel 10, and the second polarizer 6 are disposed in this order. The first phase plate 11 and the second phase plate 12 are disposed between the first or second polarizer 5 or 6 and the liquid crystal display panel 10. The first and second phase plates 11 and 12 may be disposed on one polarizer side or may be disposed on different polarizer sides. When they are disposed on one polarizer side, the first phase plate 11 is normally disposed closer to the liquid crystal display panel 10 than the second phase plate 12. In addition, between the first phase plate 11 and the liquid crystal display panel, no other optically anisotropic layer is normally provided.

The liquid crystal display device of the present embodiment further includes a third phase plate on an as needed basis. The third phase plate is disposed between two adjacent members among the first polarizer 5, the liquid crystal display panel 10, the second polarizer 6, the first phase plate 11, and the second phase plate 12.

Figure 2:
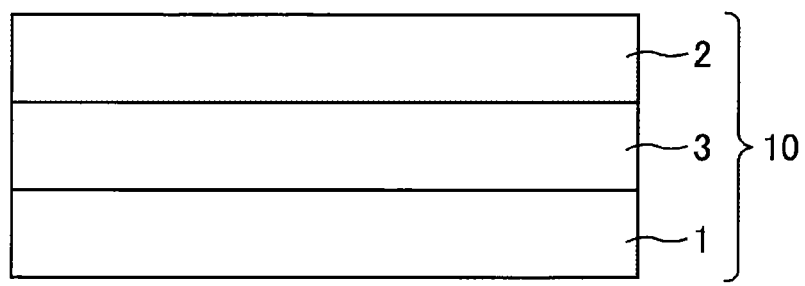
FIG. 2 is a schematic cross-sectional view showing the structure of the liquid crystal display device according to the first embodiment.

As shown in FIG. 2, the liquid crystal display panel 10 has a pair of transparent substrates 1 and 2 disposed so as to face each other, and a liquid crystal layer 3 is sandwiched between the substrates 1 and 2.

A specific phase difference (hereinafter also referred to as a "total Rth") is 120 nm or more, the specific phase difference being a phase difference in a perpendicular direction of a member (e.g., the second phase plate 12, the third phase plate or the like) which is present between the first polarizer 5 and the second polarizer 6, excluding the liquid crystal layer 3 and the first phase plate 11. With this, it is possible to exhibit an excellent gray scale inversion characteristic when a color close to black is displayed.

Although the upper limit of the total Rth is not particularly limited, the upper limit thereof is normally about 330 nm. Normally, before the value mentioned above, the gray scale inversion characteristic reaches its peak.

In addition, according to the liquid crystal display device of the first embodiment, it is possible to achieve a non-gray scale inversion share of preferably 60% or more (more preferably 65% or more and further preferably 70% or more). When the non-gray scale inversion share is less than 60%, it may be felt that the gray scale inversion is not sufficiently suppressed when a color close to black is displayed.

Note that the thickness of each member is not particularly limited, and the thickness thereof may be set to the value similar to that in a common liquid crystal display device.

Figure 3:
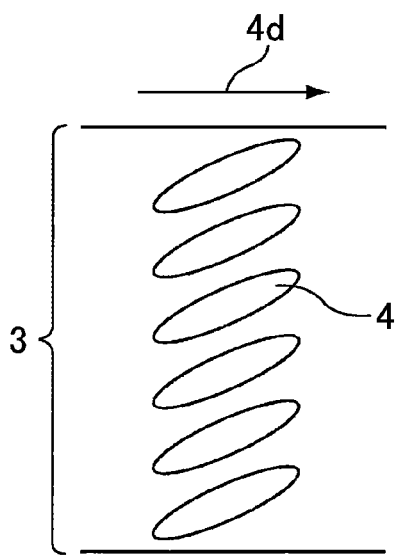
FIG. 3 is a schematic cross-sectional view showing the structure of the liquid crystal display device according to the first embodiment.
Figure 4:
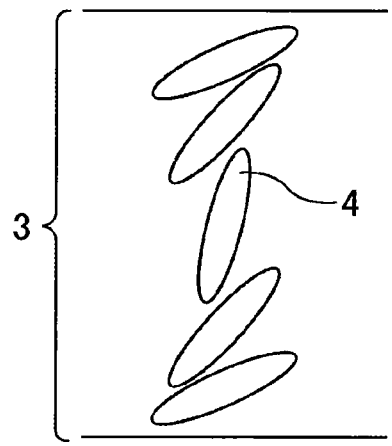
FIG. 4 is a schematic cross-sectional view showing the structure of the liquid crystal display device according to the first embodiment.

The liquid crystal layer 3 is formed from a liquid crystal composition containing various common low-molecular liquid crystals and high-molecular liquid crystals and, as shown in FIG. 3, the liquid crystal layer 3 includes liquid crystal molecules 4 which are homogeneously aligned when no voltage is applied (hereinafter also referred to as a "homogeneous liquid crystal"). The liquid crystal molecule 4 is a nematic liquid crystal having positive dielectric constant anisotropy. The twist angle of the liquid crystal molecule 4 is 0° or more and 5° or less. When the voltage is applied, as shown in FIG. 4, the liquid crystal molecule 4 is tilted in the perpendicular direction of the liquid crystal layer 3. As described later, the first and second polarizers 5 and 6 are disposed in a crossed Nicol configuration, and the liquid crystal display panel 10 shows a normally white mode.

A phase difference (Δnd) of the liquid crystal display panel 10 is preferably 210 to 310 nm, more preferably 240 to 280 nm, and especially preferably 260 nm. When the Δnd exceeds 310 nm, a driving voltage may increase, or the gray scale inversion characteristic may deteriorate. When the Δnd is less than 210 nm, the brightness may lower.

Figure 116:
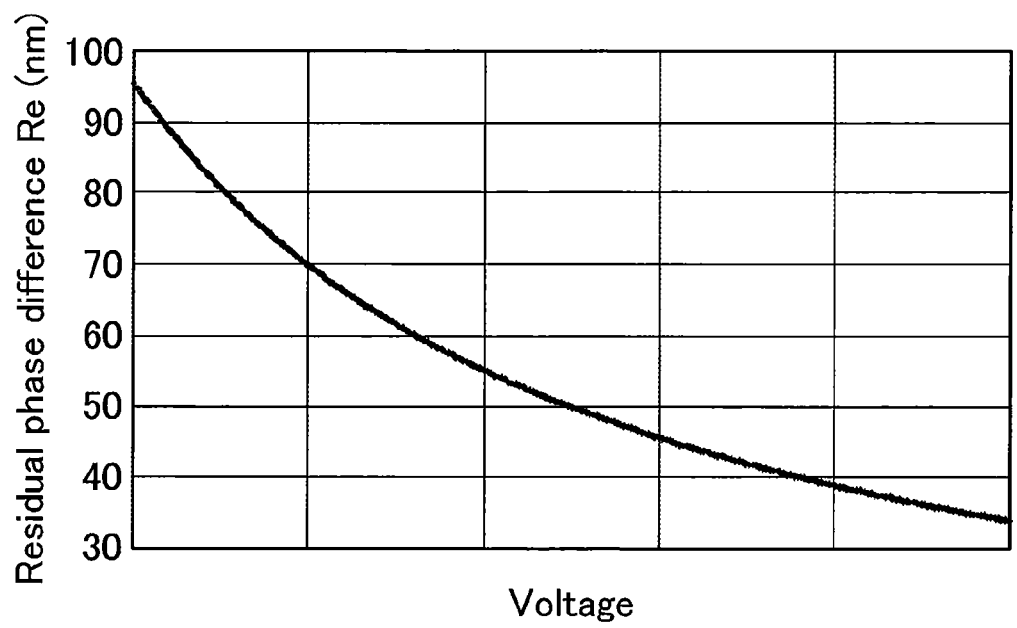
FIG. 116 is a graph showing a relationship between a residual phase difference and an applied voltage in the liquid crystal display device according to the first embodiment.

A phase difference (residual phase difference) Re of the liquid crystal display panel 10 in the front direction when black is displayed is preferably 40 to 60 nm, more preferably 45 to 55 nm, and especially preferably 50 nm. When the residual phase difference Re exceeds 60 nm, the viewing angle tends to deteriorate. As shown in FIG. 116, the relationship between the voltage and the residual phase difference Re is not linear, and a change in the residual phase difference Re relative to a change in voltage is reduced as the residual phase difference Re is reduced. As a result, when the residual phase difference Re is excessively reduced, specifically when the residual phase difference Re is less than 40 nm, a harmful effect on a reduction in power consumption may increase.

A drive method for the liquid crystal display panel 10 is not particularly limited, and examples thereof include a passive matrix method, an active matrix method, and a plasma address method. Among them, the active matrix method using an active element such as a TFT (Thin film Transistor) or the like is suitable.

Each of the substrates 1 and 2 aligns the liquid crystal molecules 4 in a specific direction. Although each of the substrates 1 and 2 may have a property which aligns the liquid crystal material, an alignment member having the property which aligns the liquid crystal molecules 4 (e.g., an alignment layer or the like) is normally provided on each of the substrates 1 and 2.

On each of the substrates 1 and 2 on the liquid crystal layer 3 side, an electrode for applying the voltage to the liquid crystal layer 3 is provided. An example of the material for the electrode includes a transparent conductive film made of indium tin oxide (ITO) or the like. When a transparent substrate provided with the alignment layer is used, the electrode is normally provided between the transparent substrate and the alignment layer. Note that a color filter may also be provided on the substrate 1 or 2 on the liquid crystal layer 3 side.

Each of the first and second polarizers 5 and 6 has a function of converting natural light into linearly polarized light. As the first and second polarizers 5 and 6, a normal polarizer used in the liquid crystal display device can be appropriately used. A common polarizer is formed by dyeing a polyvinyl alcohol (PVA) film as a base material with iodine or a dye, and stretching the film four to six times. The first and second polarizers 5 and 6 are so-called O-type polarizers.

Figure 5:
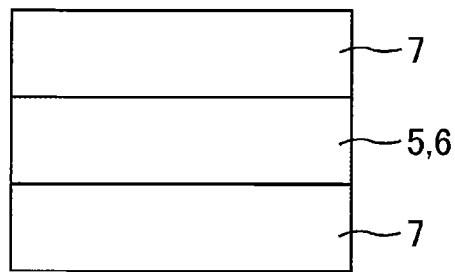
FIG. 5 is a schematic cross-sectional view showing the structure of the liquid crystal display device according to the first embodiment.

Although the first polarizer 5 and/or the second polarizer 6 may be used singly, in terms of improvements in strength, moisture resistance, and heat resistance, as shown in FIG. 5, a transparent protective layer 7 is preferably provided on both surfaces of the first and second polarizers 5 and 6. As the transparent protective layer 7, a transparent protective layer used in a common polarizing plate can be appropriately used, and a triacetyl cellulose (TAC) film is normally used. Examples of the TAC film include a liquid crystal polarizing plate TAC film manufactured by Konica Minolta Opto, Inc., and Fuji TAC manufactured by FUJIFILM Corporation.

The Rth of the TAC film having a film thickness of 40 μm is usually about 30 nm. Consequently, in terms of use of the common TAC film as the transparent protective layer 7, the Rth of the transparent protective layer 7 is preferably 25 to 35 nm and especially preferably 30 nm.

On the other hand, as the transparent protective layer 7, a protective film made of an acrylic polymer which satisfies Rth=0 nm may also be used. In addition, as the transparent protective layer provided on the liquid crystal display panel 10 side of the first polarizer 5 and/or the second polarizer 6, the first phase plate 11, the second phase plate 12, or the third phase plate may also be used instead.

Although the Rth of the transparent protective layer is preferably 0 in an IPS mode, the Rth preferably has a positive value in other modes. Accordingly, the Rth of the transparent protective layer 7 is not particularly limited, and can be appropriately set within a range which satisfies the above-mentioned range of the total Rth.

The second phase plate 12 is used for optical compensation in the front direction. The phase difference value in the perpendicular direction of the second phase plate 12 influences a viewing angle characteristic, and the viewing angle characteristic is changed by adjusting the phase difference value. The material for the second phase plate 12 is not particularly limited, and examples thereof include polycarbonate, polysulfone, cellulose acetate, polyvinyl chloride, and polyolefin. The second phase plate 12 can be formed by using, e.g., a method of uniaxially stretching a polymeric film made of the above material (raw film) in a longitudinal (length) direction or a lateral (width) direction, or a method of biaxially stretching the polymeric film in the longitudinal and lateral directions. In addition, the second phase plate 12 may also be formed by stretching the polymeric film made of the above material in a direction oblique to the longitudinal or lateral direction, as described in Japanese Patent Application Laid-open No. 2007-203556 or Japanese Patent Application Laid-open No. 2007-90532.

Although the Re of the second phase plate 12 is especially preferably 140 nm, the Re thereof may also be 130 to 150 nm (preferably 135 to 145 nm) in consideration of variations in products. In addition, the Re of the second phase plate 12 preferably substantially satisfies the relationship of (residual phase difference Re of liquid crystal display panel 10)=(Re of second phase plate 12)−(phase difference Re, h of liquid crystal film).

The phase plate satisfying the Re=140 nm is mass-produced for a VA mode liquid crystal display device utilizing circularly polarized light and can be used in the present embodiment, and hence the phase plate is advantageous in terms of cost. In addition, a stack of the phase plate satisfying Re=140 nm and the polarizer functions also as a circularly polarizing plate, and hence it is possible to prevent visual recognition of reflection in the electrode in the panel.

The Rth of the second phase plate 12 is not particularly limited as long as the Rth thereof is set to satisfy the above-mentioned range of the total Rth in consideration of the presence or absence of other optical members such as the third phase plate, the transparent protective layer, and the like.

The Nz coefficient of the second phase plate 12 is not particularly limited as long as the Nz coefficient is set such that the Re and the Rth satisfy the desired ranges.

The third phase plate is mainly used for adjusting the total Rth. The third phase plate has optically negative uniaxiality in the perpendicular direction, and satisfies the relationship of nx=ny>nz or nx≅ny>nz. The third phase plate functions as a so-called negative C plate. The material for the third phase plate is not particularly limited, and examples of the material include the same materials as those for the second phase plate 12 described above. The third phase plate can be formed by using, e.g., the method of biaxially stretching the polymeric film (the raw film) made of the above-described material in the longitudinal and lateral directions. In addition, as the material for the third phase plate, a liquid crystal composition may also be used. Specifically, examples of the liquid crystal composition include a hardened layer or a cured layer of a liquid crystal composition containing a liquid crystal compound subjected to planar alignment, and a hardened layer or a cured layer of a liquid crystal composition containing a discotic liquid crystal compound subjected to columnar alignment.

Note that, in the present description, the "planar alignment" denotes a state where the liquid crystal compounds (liquid crystal molecules) are aligned such that the helical axis of the liquid crystal is orthogonal to both layer interfaces. In addition, the "columnar alignment" denotes a state where the discotic liquid crystal compounds are aligned so as to be stacked on each other into a columnar shape. Further, the "hardened layer" denotes a layer in which the liquid crystal composition in a softened state, melted state, or dissolved in a solution is cooled and hardened. Furthermore, the "cured layer" denotes a layer in which a part or all of the liquid crystal compositions are cross-linked by at least one of heat, a catalyst, light, and a radiation to be brought into a stabilized state in which the liquid crystal compositions cannot be melted or dissolved, or are difficult to melt or dissolve. Note that the above-described cured layer also includes a cured layer which derives from the hardened layer of the liquid crystal composition.

In addition, the "liquid crystal composition" denotes a composition which has a liquid crystal phase and exhibits a liquid crystal property. Examples of the liquid crystal phase include a nematic liquid crystal phase, a smectic liquid crystal phase, a cholesteric liquid crystal phase, and a columnar liquid crystal phase. As the liquid crystal composition used for the third phase plate, the liquid crystal composition having the nematic liquid crystal phase is preferable. This is because the phase difference film having high transparency can be obtained therefrom.

The Rth of the third phase plate is not particularly limited as long as the Rth thereof is set so as to satisfy the above-mentioned range of the total Rth in consideration of the presence or absence of other optical members such as the second phase plate 12, the transparent protective layer, and the like.

The Nz coefficient of the third phase plate is not particularly limited as long as the Nz coefficient is set such that the Rth satisfies the desired range.

The Rth of the TAC film having a film thickness of 40 μm is normally about 30 nm, and this TAC film is also the negative C plate. Thus, the above-described transparent protective layer 7 may also be used as the third phase plate.

The first phase plate 11 is a tilt alignment phase plate, and is mainly used to improve the viewing angle characteristic. The first phase plate 11 includes at least the liquid crystal film, and the liquid crystal film is made of a liquid crystal material exhibiting optically positive uniaxiality. The material includes at least one type of the nematic liquid crystal exhibiting the optically positive uniaxiality. Note that the material may include only the nematic liquid crystal, or may be a composition containing the nematic liquid crystal. The liquid crystal film is formed by setting the nematic liquid crystal in the liquid crystal state in a state where the nematic liquid crystal is hybrid-aligned in the normal direction (i.e., the perpendicular direction of the first phase plate 11). The first phase plate 11 may include an over-coat layer made of an acrylic coating material or the like in addition to the liquid crystal film.

In the state where the nematic liquid crystal is hybrid-aligned, the angle formed between the director of the liquid crystal and the liquid crystal film plane on the upper surface of the film is different from that on the lower surface of the film. Consequently, the angle formed between the director and the film plane in the vicinity of the interface of the film upper surface is different from that in the vicinity of the interface of the film lower surface, and the angle is continuously changed between the film upper surface and the film lower surface.

In the liquid crystal film, the director of the nematic liquid crystal is tilted at different angles at all locations in the perpendicular direction of the film. Accordingly, when the liquid crystal film is viewed as a structure of a film, an optical axis does not exist in the liquid crystal film.

The liquid crystal film has a specific average tilt angle. Although the average tilt angle of the liquid crystal film is especially preferably 37°, the average tilt angle thereof may also be 34 to 40° (preferably 35 to 39°) in consideration of variations in products.

In the vicinity of one of the interfaces of the liquid crystal film, the absolute value of the angle formed between the director of the nematic liquid crystal and the film plane is normally 20 to 90°, preferably 40 to 90°, and more preferably 50 to 80°. At the interface opposite to the interface, the absolute value of the angle formed therebetween is normally 0 to 20°, and preferably 0 to 10°.

In the present embodiment, the liquid crystal film in which the angle formed between the director of the nematic liquid crystal and the film plane is 70° in the vicinity of one interface of the liquid crystal film, the angle formed therebetween at the interface opposite to the one interface is 2°, and the formed angle is continuously changed between the interfaces is especially preferable.

The liquid crystal film is disposed such that the interface having the larger absolute value of the angle is positioned on the liquid crystal display panel 10 side. That is, the interface on the side where the nematic liquid crystal stands up is disposed closer to the liquid crystal display panel 10 than the interface on the side where the nematic liquid crystal lies down.

The material for the liquid crystal film is not particularly limited, and the liquid crystal film may be formed by, e.g., hybrid-aligning a nematic phase low-molecular liquid crystal in its liquid crystal state, and then cross-linking the liquid crystal by using light or heat to set the liquid crystal. A specific example of the liquid crystal film includes NR film manufactured by Nippon Oil Corporation.

In the film in which the nematic liquid crystal is hybrid-aligned, an index of refraction ne in a direction in parallel with the director of the nematic liquid crystal is different from an index of refraction no in a direction orthogonal to the director thereof. When it is assumed that a value (ne−no) obtained by subtracting no from ne is a virtual birefringence, a virtual in-plane phase difference Re, h when viewed from the direction of the normal to the liquid crystal film is given by the product of the virtual birefringence (ne−no) and the film thickness of the liquid crystal film.

The phase difference Re, h is preferably 70 to 110 nm, more preferably 80 to 100 nm, and especially preferably 90 nm. When the phase difference exceeds 110 nm, the driving voltage may increase or the gray scale inversion characteristic may deteriorate. When the phase difference is less than 70 nm, the viewing angle characteristic may deteriorate and the brightness may lower. Note that the phase difference Re, h can be controlled by changing the thickness of the liquid crystal film. In addition, the phase difference Re, h can be easily determined by using polarization optical measurement such as ellipsometry or the like.

The film thickness of the liquid crystal film is not particularly limited, and can be appropriately set in accordance with physical properties of the material or the like. The film thickness thereof is normally 0.2 to 10 μm, preferably 0.3 to 5 μm, and more preferably 0.5 to 2 μm. When the film thickness thereof is less than 0.2 μm, sufficient compensation effects may not be obtained. When the film thickness thereof exceeds 10 μm, the display of the display device may be unnecessarily colored.

The upper and lower surfaces of the first phase plate 11, the alignment direction of the first phase plate 11, and the alignment direction of the homogeneous liquid crystal of the liquid crystal layer 3 are defined as follows.

Figure 6:
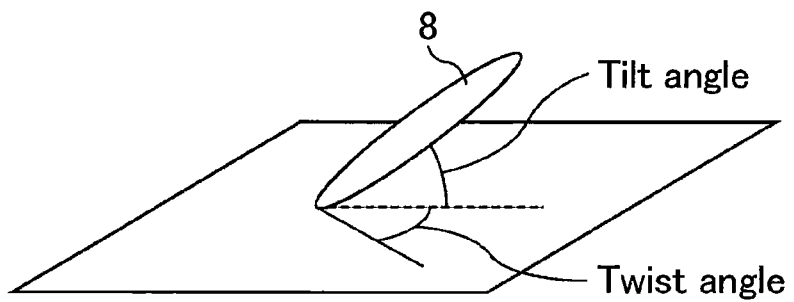
FIG. 6 is a schematic perspective view of a nematic liquid crystal according to the first embodiment for explaining a tilt angle and a twist angle.
Figure 7:
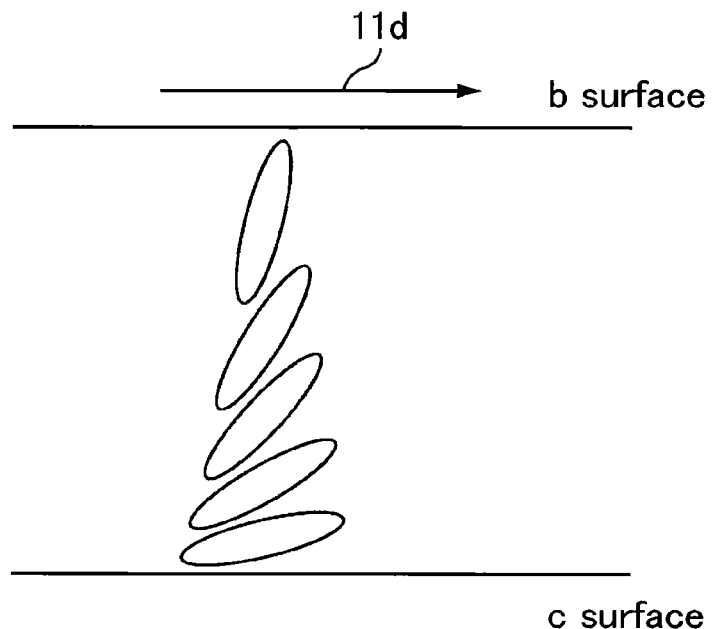
FIG. 7 is a schematic cross-sectional view of a liquid crystal layer according to the first embodiment for explaining an alignment direction of a homogeneous liquid crystal.

Each of the upper and lower surfaces of the first phase plate 11 is defined by the angle formed between the director of the nematic liquid crystal and the film plane in the vicinity of the film interface of the liquid crystal film. Specifically, as shown in FIGS. 6 and 7, a surface on which the angle formed between the director of the nematic liquid crystal 8 and the film plane is 20 to 90° on an acute angle side is defined as a b surface, while a surface on which the angle formed therebetween is 0 to 20° on the acute angle side is defined as a c surface. In addition, when the c surface is viewed from the b surface through the liquid crystal film, a direction in which the angle formed between the director of the nematic liquid crystal and a component of the director projected to the c surface is an acute angle, and which is in parallel with the projected component is defined as an alignment direction 11d of the first phase plate.

Normally, at the interface of the liquid crystal layer 3, the homogeneous liquid crystal 4 is not in parallel with the interface but is tilted at an angle, and the angle is generally called a pretilt angle. As shown in FIG. 3, a direction in which the angle formed between the director of the homogeneous liquid crystal 4 at the interface of the liquid crystal layer 3 and a component of the director projected to the interface is an acute angle, and which is in parallel with the projected component is defined as an alignment direction 4d of the homogeneous liquid crystal.

The first phase plate 11, the second phase plate 12, the first polarizer 5, and the second polarizer 6 may be laminated together via a bonding layer or an adhesive layer. An example of the material for the bonding layer or the adhesive layer includes an acrylic resin. Specifically, examples thereof include SK-2057 and SK-1478 (heat resisting type) manufactured by Soken Chemical & Engineering Co., Ltd. and the like. In addition, for example, there may be used an bonding layer or an adhesive layer as a countermeasure against blanching by moisture and heat, an bonding layer having a low bonding force capable of re-peeling, a UV-cut bonding layer or adhesive layer in which a UV absorbent is blended, a bonding layer or an adhesive layer for an aluminum deposited surface for preventing the delamination of the deposited surface, and a light diffusion bonding layer or adhesive layer in which light-diffusing particles are blended.

Preferred structures of the present embodiment are shown in FIGS. 8 to 19. The preferred structures of the present embodiment are structures in which individual members are stacked in the orders shown below.

Figure 8:
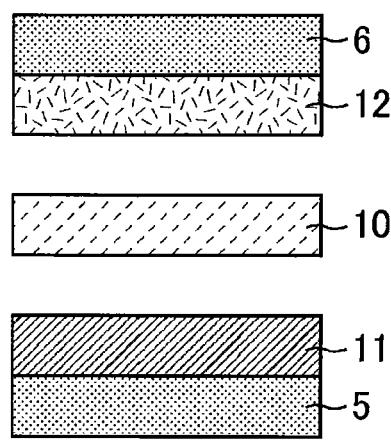
FIG. 8 is a schematic cross-sectional view showing Structure 1 of the liquid crystal display device according to the first embodiment.

<Structure 1>
first polarizer 5/first phase plate 11/liquid crystal display panel 10/second phase plate 12/second polarizer 6 (FIG. 8)

Figure 9:
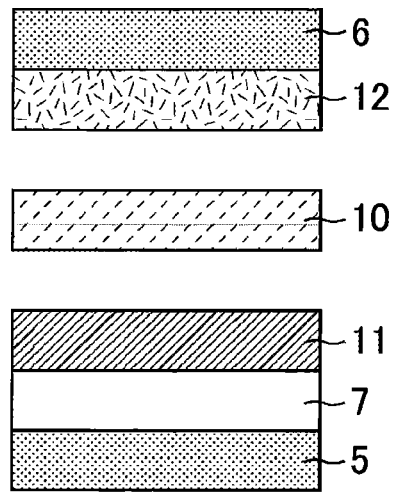
FIG. 9 is a schematic cross-sectional view showing Structure 1+transparent protective layer of the liquid crystal display device according to the first embodiment.

<Structure 1+Transparent Protective Layer>
first polarizer 5/transparent protective layer 7/first phase plate 11/liquid crystal display panel 10/second phase plate 12/second polarizer 6 (FIG. 9)

Figure 10:
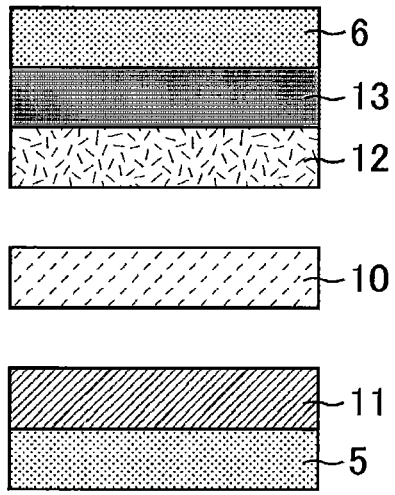
FIG. 10 is a schematic cross-sectional view showing Structure 1-1 of the liquid crystal display device according to the first embodiment.

<Structure 1-1>
first polarizer 5/first phase plate 11/liquid crystal display panel 10/second phase plate 12/third phase plate 13/second polarizer 6 (FIG. 10)

Figure 11:
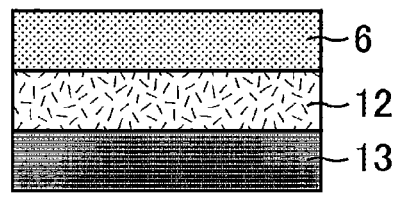
FIG. 11 is a schematic cross-sectional view showing Structure 1-2 of the liquid crystal display device according to the first embodiment.
Figure 11:
Figure 11:
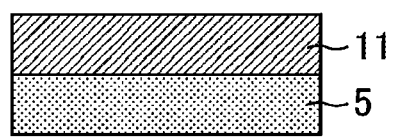

<Structure 1-2>
first polarizer 5/first phase plate 11/liquid crystal display panel 10/third phase plate 13/second phase plate 12/second polarizer 6 (FIG. 11)

Figure 12:
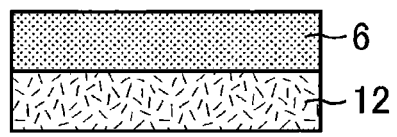
FIG. 12 is a schematic cross-sectional view showing Structure 1-3 of the liquid crystal display device according to the first embodiment.
Figure 12:
Figure 12:
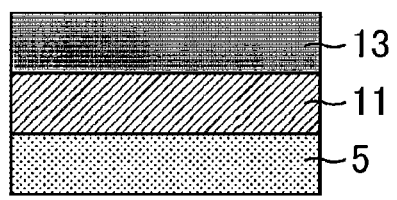

<Structure 1-3>
first polarizer 5/first phase plate 11/third phase plate 13/liquid crystal display panel 10/second phase plate 12/second polarizer 6 (FIG. 12)

Figure 13:
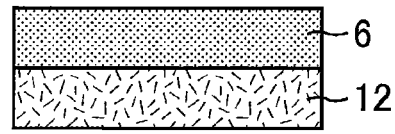
FIG. 13 is a schematic cross-sectional view showing Structure 1-4 of the liquid crystal display device according to the first embodiment.
Figure 13:
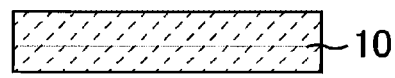
Figure 13:
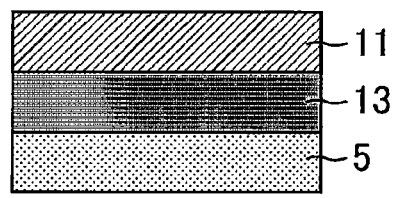

<Structure 1-4>
first polarizer 5/third phase plate 13/first phase plate 11/liquid crystal display panel 10/second phase plate 12/second polarizer 6 (FIG. 13)

Figure 14:
FIG. 14 is a schematic cross-sectional view showing Structure 2 of the liquid crystal display device according to the first embodiment.
Figure 14:
Figure 14:
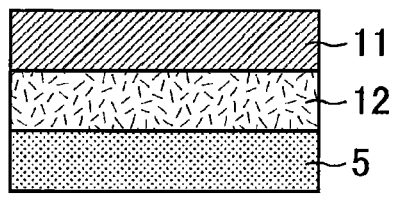

<Structure 2>
first polarizer 5/second phase plate 12/first phase plate 11/liquid crystal display panel 10/second polarizer 6 (FIG. 14)

Figure 15:
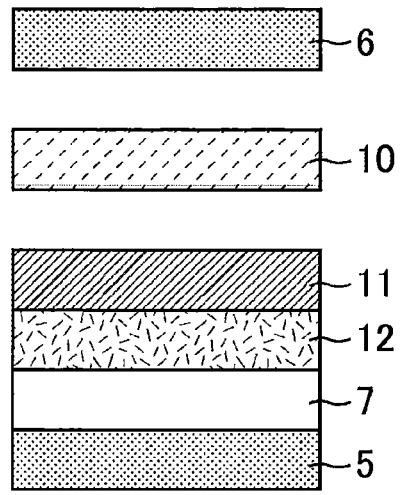
FIG. 15 is a schematic cross-sectional view showing Structure 2+transparent protective layer of the liquid crystal display device according to the first embodiment.

<Structure 2+Transparent Protective Layer>
first polarizer 5/transparent protective layer 7/second phase plate 12/first phase plate 11/liquid crystal display panel 10/second polarizer 6 (FIG. 15)

Figure 16:
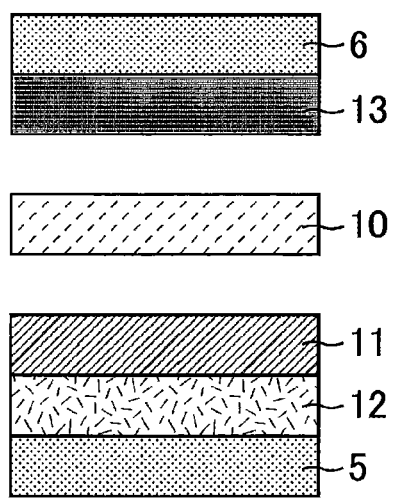
FIG. 16 is a schematic cross-sectional view showing Structure 2-1 of the liquid crystal display device according to the first embodiment.

<Structure 2-1>
first polarizer 5/second phase plate 12/first phase plate 11/liquid crystal display panel 10/third phase plate 13/second polarizer 6 (FIG. 16)

Figure 17:
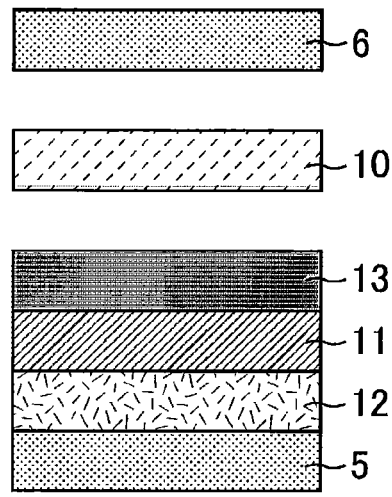
FIG. 17 is a schematic cross-sectional view showing Structure 2-2 of the liquid crystal display device according to the first embodiment.

<Structure 2-2>
first polarizer 5/second phase plate 12/first phase plate 11/third phase plate 13/liquid crystal display panel 10/second polarizer 6 (FIG. 17)

Figure 18:
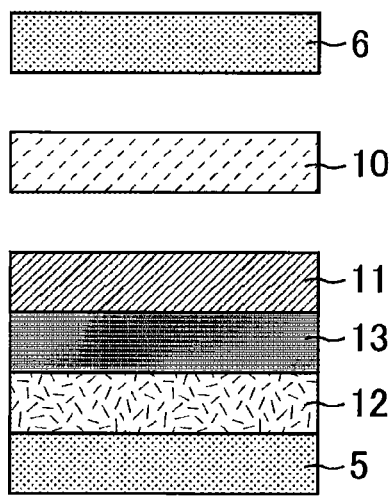
FIG. 18 is a schematic cross-sectional view showing Structure 2-3 of the liquid crystal display device according to the first embodiment.

<Structure 2-3>
first polarizer 5/second phase plate 12/third phase plate 13/first phase plate 11/liquid crystal display panel 10/second polarizer 6 (FIG. 18)

Figure 19:
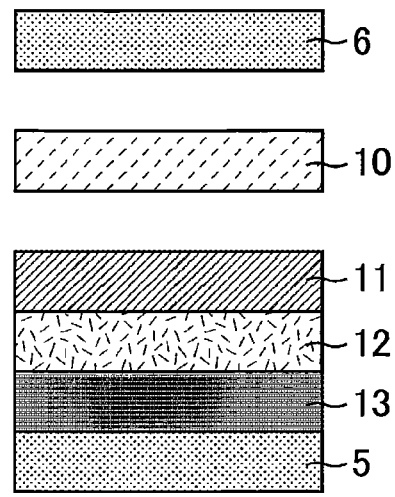
FIG. 19 is a schematic cross-sectional view showing Structure 2-4 of the liquid crystal display device according to the first embodiment.

<Structure 2-4>
first polarizer 5/third phase plate 13/second phase plate 12/first phase plate 11/liquid crystal display panel 10/second polarizer 6 (FIG. 19)

Note that, in each structure, the first phase plate 11 is formed only of the liquid crystal film.

In addition, the front and the rear in each structure are not particularly limited. In each structure, a case where the first polarizer 5 is disposed on the observer side and a case where the first polarizer 5 is disposed on the backlight side are optically equal to each other, and they exhibit similar display characteristics. Specifically, the display characteristics such as the gray scale inversion characteristic and an isocontrast characteristic are merely rotated about the front direction by 180°.

Figure 20:
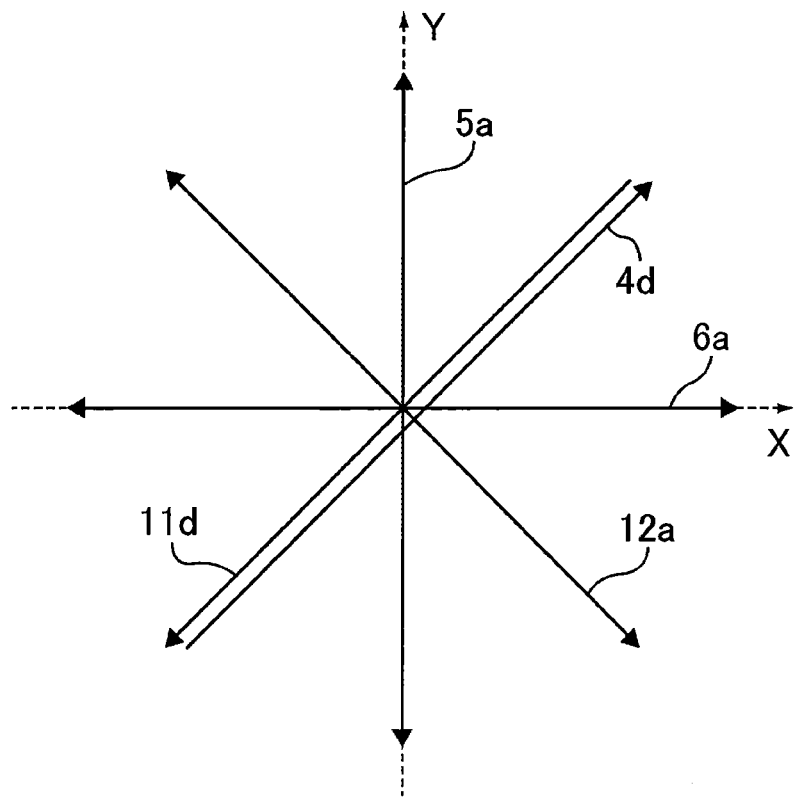
FIG. 20 is a conceptual view for explaining an arrangement mode of optical axes of optical members according to the first embodiment.
Figure 21:
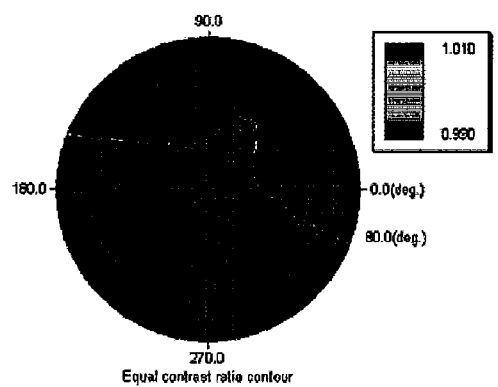
FIG. 21 are graphs each showing a gray scale inversion characteristic of Structure 1 of the liquid crystal display device according to the first embodiment of which (a) shows a case where a total Rth=70 nm is satisfied, (b) shows a case where the total Rth=126 nm is satisfied, (c) shows a case where the total Rth=154 nm is satisfied, and (d) shows a case where the total Rth=182 nm is satisfied.
Figure 21:
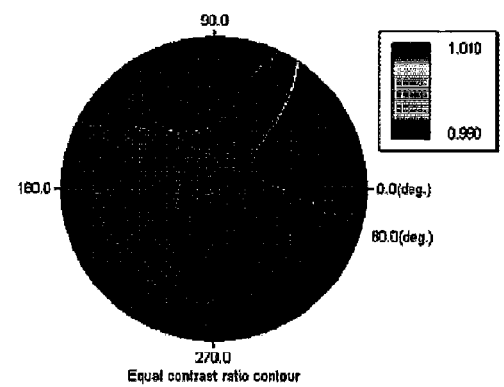
Figure 21:
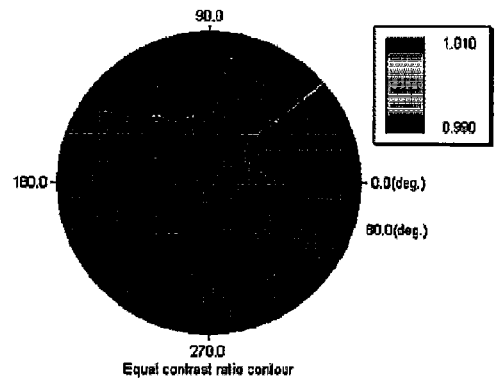
Figure 21:
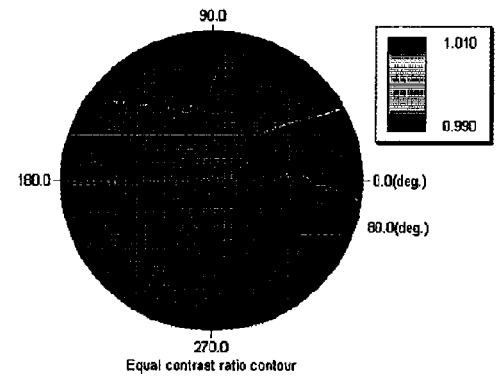
Figure 22:
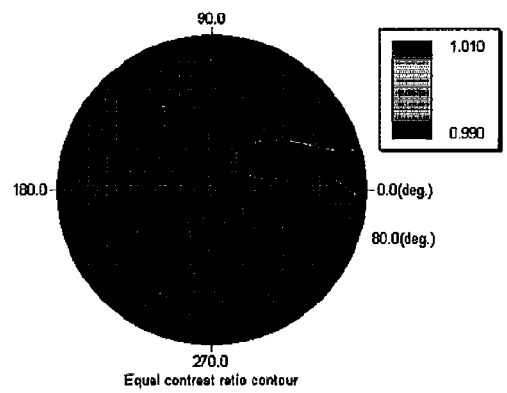
FIG. 22 are graphs each showing the gray scale inversion characteristic of Structure 1 of the liquid crystal display device according to the first embodiment of which (e) shows a case where the total Rth=210 nm is satisfied, (f) shows a case where the total Rth=252 nm is satisfied, and (g) shows a case where the total Rth=294 nm is satisfied.
Figure 22:
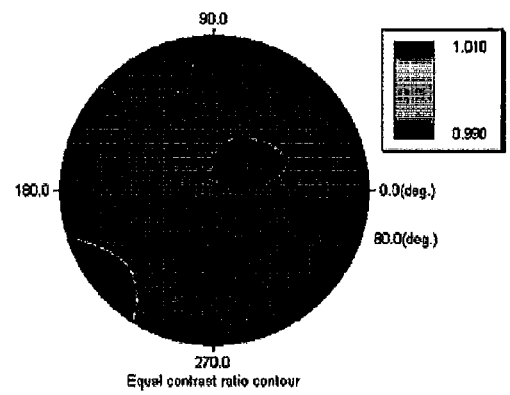
Figure 22:
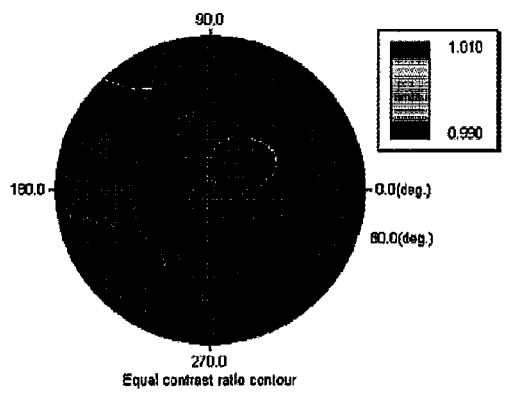
Figure 23:
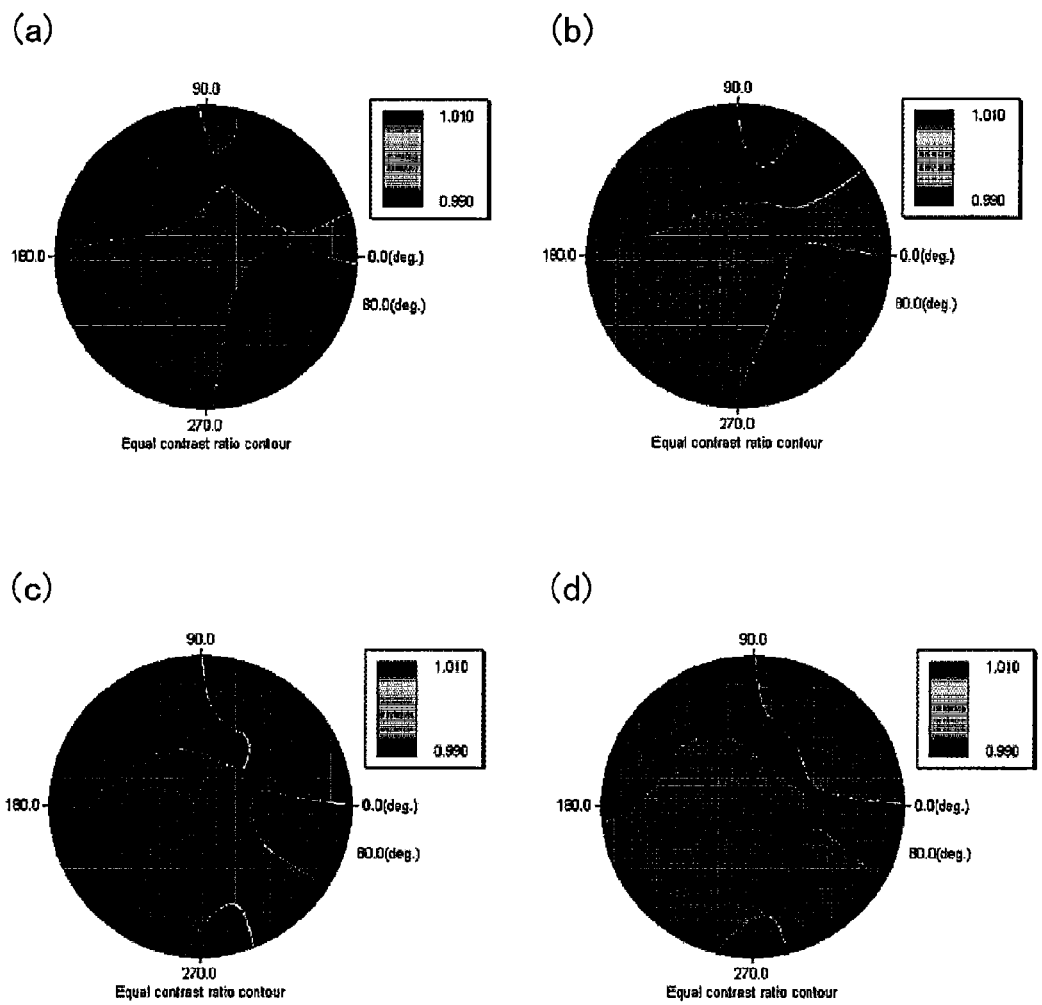
FIG. 23 are graphs each showing the gray scale inversion characteristic of Structure 2 of the liquid crystal display device according to the first embodiment of which (a) shows the case where the total Rth=70 nm is satisfied, (b) shows the case where the total Rth=126 nm is satisfied, (c) shows the case where the total Rth=154 nm is satisfied, and (d) shows the case where the total Rth=182 nm is satisfied.
Figure 24:
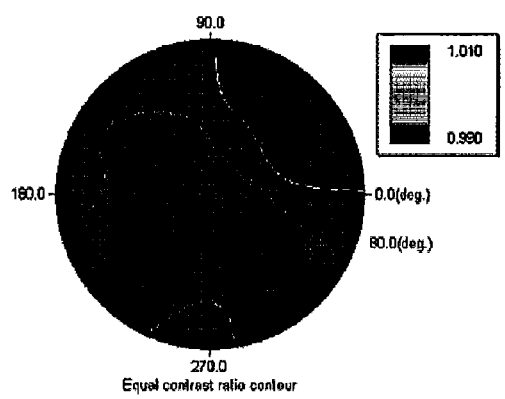
FIG. 24 are graphs each showing the gray scale inversion characteristic of Structure 2 of the liquid crystal display device according to the first embodiment of which (e) shows the case where the total Rth=210 nm is satisfied, (f) shows the case where the total Rth=252 nm is satisfied, and (g) shows the case where the total Rth=294 nm is satisfied.
Figure 24:
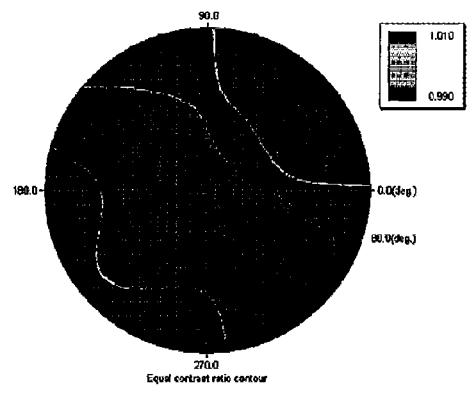
Figure 24:
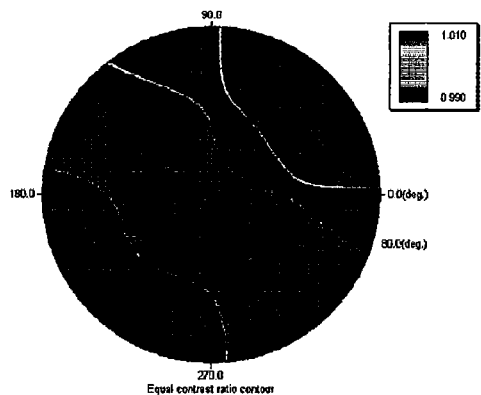
Figure 25:
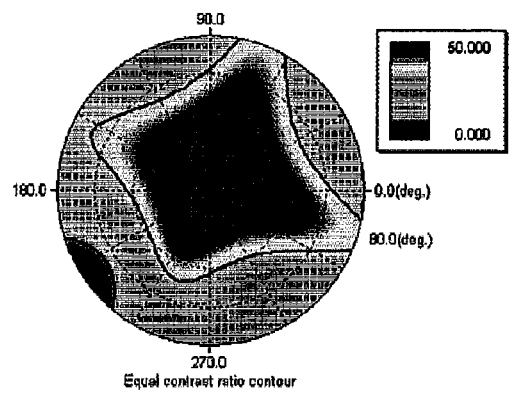
FIG. 25 are graphs each showing an isocontrast characteristic of Structure 1 of the liquid crystal display device according to the first embodiment of which (a) shows the case where the total Rth=70 nm is satisfied, (b) shows the case where the total Rth=126 nm is satisfied, (c) shows the case where the total Rth=154 nm is satisfied, and (d) shows the case where the total Rth=182 nm is satisfied.
Figure 25:
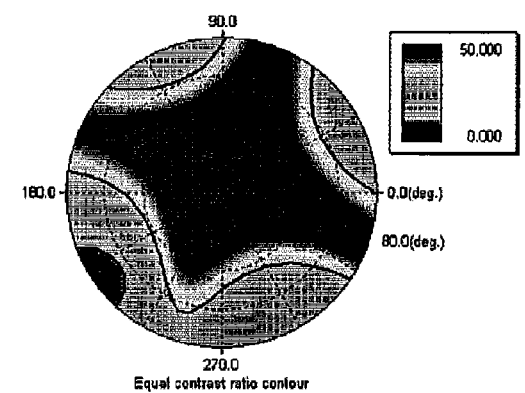
Figure 25:
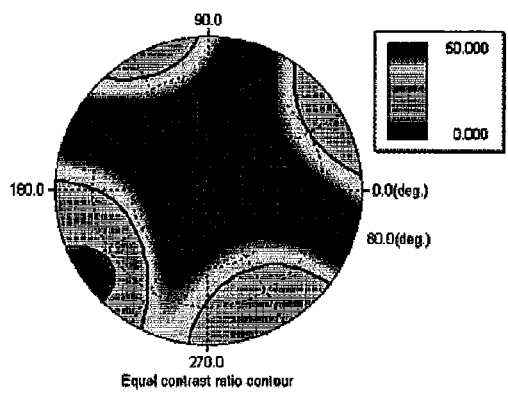
Figure 25:
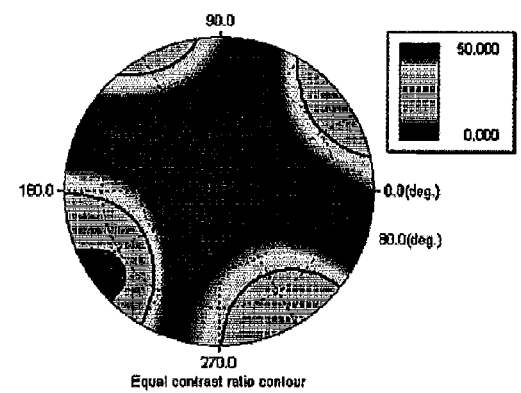
Figure 26:
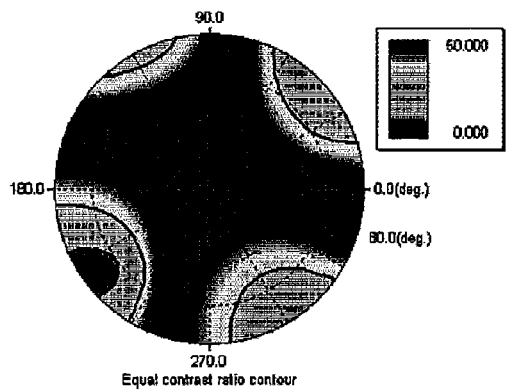
FIG. 26 are graphs each showing the isocontrast characteristic of Structure 1 of the liquid crystal display device according to the first embodiment of which (e) shows the case where the total Rth=210 nm is satisfied, (f) shows the case where the total Rth=252 nm is satisfied, and (g) shows the case where the total Rth=294 nm is satisfied.
Figure 26:
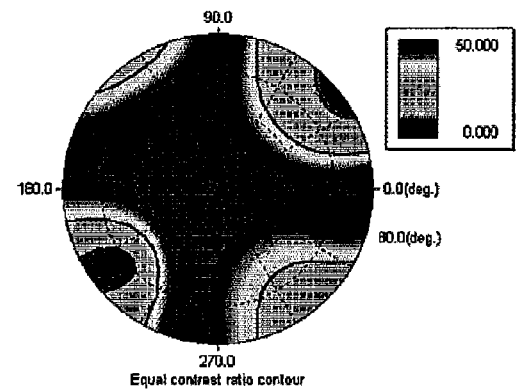
Figure 26:
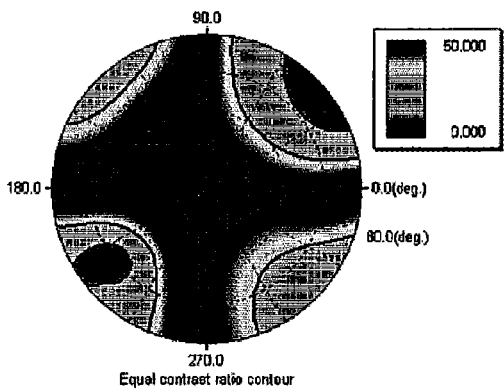
Figure 27:
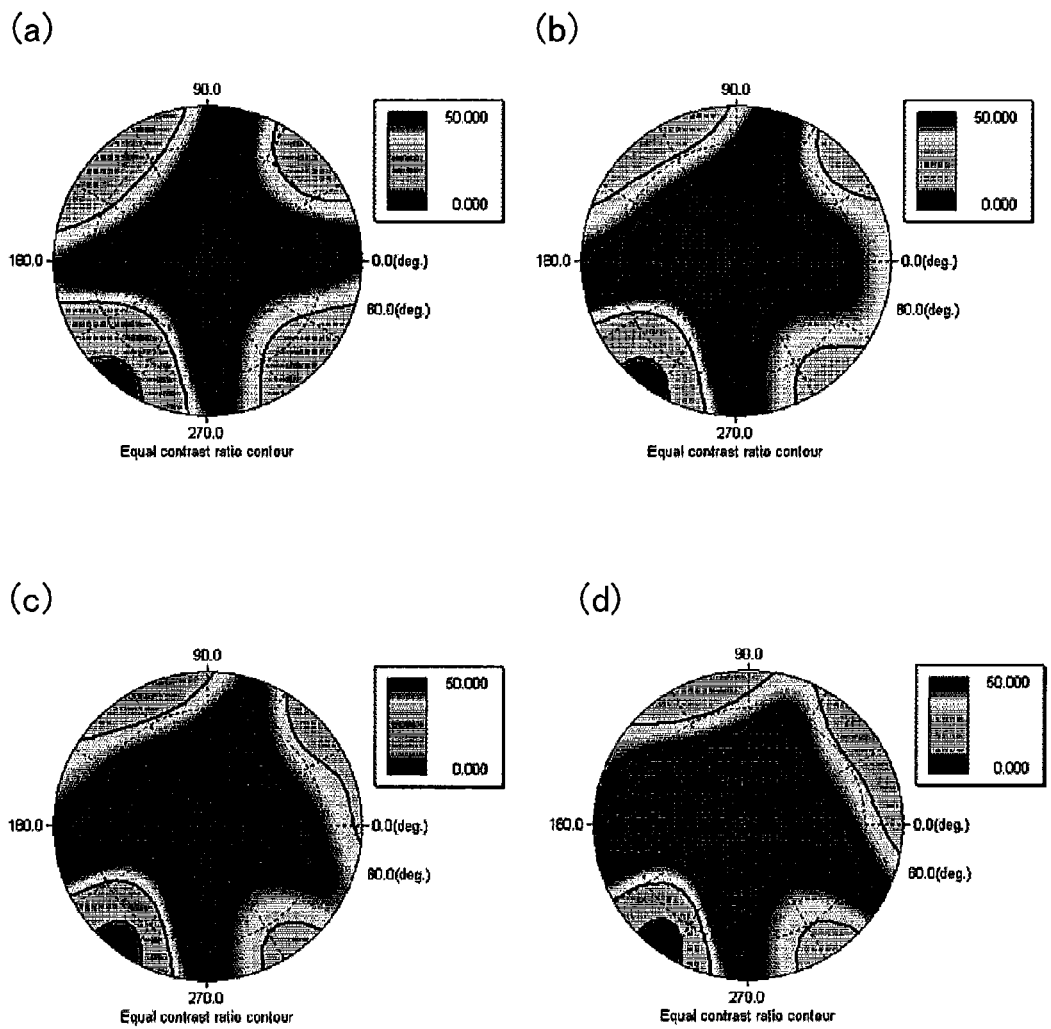
FIG. 27 are graphs each showing the isocontrast characteristic of Structure 2 of the liquid crystal display device according to the first embodiment of which (a) shows the case where the total Rth=70 nm is satisfied, (b) shows the case where the total Rth=126 nm is satisfied, (c) shows the case where the total Rth=154 nm is satisfied, and (d) shows the case where the total Rth=182 nm is satisfied.
Figure 28:
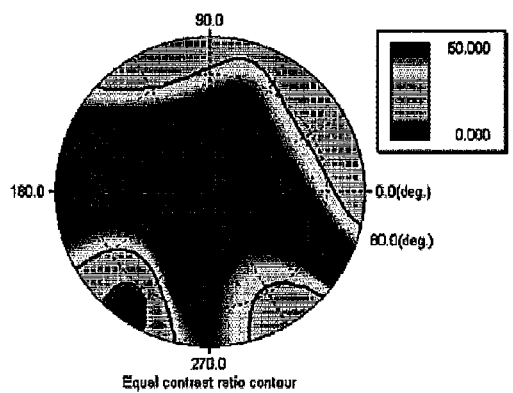
FIG. 28 are graphs each showing the isocontrast characteristic of Structure 2 of the liquid crystal display device according to the first embodiment of which (e) shows the case where the total Rth=210 nm is satisfied, (f) shows the case where the total Rth=252 nm is satisfied, and (g) shows the case where the total Rth=294 nm is satisfied.
Figure 28:
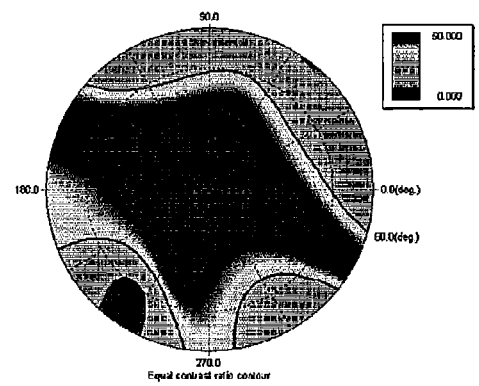
Figure 28:
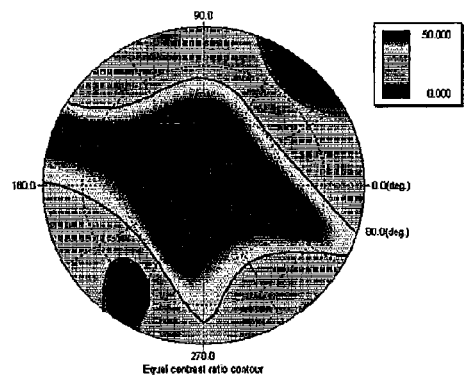

A description is given of the azimuth of the optical axis of each member by using FIG. 20. Herein, in a plane in parallel with a main surface of the transparent substrate 1 or 2 constituting the liquid crystal display panel 10, an X axis and a Y axis which are orthogonal to each other are defined for the sake of convenience. The wording "in-plane" means being in a plane defined by the X axis and the Y axis. In addition, the X axis corresponds to the horizontal direction of the screen, while the Y axis corresponds to the orthogonal direction of the screen. Further, it is assumed that the positive (+) direction (an azimuth of 0°) of the X axis corresponds to the right side of the screen, while the negative (−) direction (an azimuth of 180°) of the X axis corresponds to the left side of the screen. Furthermore, it is assumed that the positive (+) direction (an azimuth of 90°) of the Y axis corresponds to the upper side of the screen, while the negative (−) direction (an azimuth of 270°) of the Y axis corresponds to the lower side of the screen.

The azimuth of an absorption axis 5a of the first polarizer 5 is preferably in a range of 90°±2°, more preferably in a range of 90°±1°, and especially preferably 90°. When the azimuth thereof is out of the range of 90°±2°, the contrast may be reduced.

The azimuth of an absorption axis 6a of the second polarizer 6 is preferably in a range of 0°±2°, more preferably in a range of 0°±1°, and especially preferably 0°. When the azimuth thereof is out of the range of 0°±2°, the contrast may be reduced.

The azimuth of a slow axis 12a of the second phase plate 12 is preferably in a range of 135°±2°, more preferably in a range of 135°±1°, and especially preferably 135°. When the azimuth thereof is out of the range of 135°±2°, the contrast may be reduced.

The alignment direction 4d of the homogeneous liquid crystal is preferably in a range of 45°±2°, more preferably in a range of 45°±1°, and especially preferably 45°. When the alignment direction 4d thereof is out of the range of 45°±2°, the contrast may be reduced.

The alignment direction 11d of the first phase plate 11 is preferably in a range of 225°±2°, more preferably in a range of 225°±1°, and especially preferably 225°. When the alignment direction 11d thereof is out of the range of 225°±2°, the contrast may be reduced.

Note that the azimuths of the optical axes are not absolute, and relative angles between the individual optical axes may appropriately fall within the ranges described above. That is, the absorption axis 5a and the absorption axis 6a are preferably orthogonal to each other. Specifically, the angle formed between the absorption axes 5a and 6a is preferably in a range of 90°±2°, more preferably in a range of 90°±1°, and especially preferably 90°. When an azimuth which halves the angle formed between the absorption axes 5a and 6a is assumed to be φ1, the azimuth of the slow axis 12a is preferably in a range of φ1±2°, more preferably in a range of φ1±1°, and especially preferably φ1. The alignment direction 4d of the homogeneous liquid crystal and the alignment direction 11d of the first phase plate are preferably opposite to and in parallel with each other. Specifically, the alignment directions 4d and 11d thereof are preferably opposite to each other, and the angle formed between the alignment directions 4d and 11d thereof is preferably in a range of 0°±2° (more preferably in a range of 0°±1° and especially preferably 0°).

The result of simulation of the isocontrast characteristic and the gray scale inversion characteristic while the total Rth is changed in each structure is shown below. Note that, in each of the drawings showing the gray scale inversion characteristic, a range where the gray scale is inverted (a range where the 7th level of the gray scale is darker than the 0th level thereof) is indicated by dark gray and a range where the gray scale is not inverted (a range where the 7th level of the gray scale is brighter than the 0th level thereof) is indicated by light gray. In each of the drawings showing the isocontrast characteristic, the innermost contour indicates a contrast ratio of 50:1.

Simulation conditions are as follows and LCD MASTER manufactured by SHINTECH, Inc. was used for the simulation.
  phase difference (Δnd) of liquid crystal display panel: 260 nm
  residual phase difference Re of liquid crystal display panel: 50 nm
  Re of second phase plate: 140 nm
  Re of third phase plate: 0 nm
  average tilt angle of liquid crystal film: 37°
  phase difference Re, h of liquid crystal film: 90 nm
  Rth of transparent protective layer: 30 nm
  Re of transparent protective layer: 0 nm
  absorption axis of first polarizer: 90°
  absorption axis of second polarizer:
  slow axis of second phase plate: 135°
  alignment direction of homogeneous liquid crystal: 45°
  alignment direction of first phase plate: 225°
  white display: 0 V When visual evaluation of the gray scale inversion in an actual panel was performed, it was visually observed that the the non-gray scale inversion share by 1.2 was used as a judgment reference value, when only the commonest Rth of the second phase plate 12 was considered as the total Rth, i.e., when the total Rth=70 nm was satisfied. When the value is not less than the judgment reference value, it is possible to achieve an extremely excellent gray scale inversion characteristic. However, in Structure 1+transparent protective layer and Structure 2+transparent protective layer, the Rth of the transparent protective layer was fixed to 30 nm, and hence the judgment reference value in the structure without the transparent protective layer, i.e., Structure 1 or Structure 2 was used as the reference. In addition, in Structures 1-1 to 1-4 and Structures 2-1 to 2-4, a value obtained by multiplying the non-gray scale inversion share by 1.2 was used as the judgment reference value, when the Rth of the third phase plate was set to 0 nm.

When the non-gray scale inversion share was improved from that when the total Rth=70 nm was satisfied by 13%, it was possible to visually observe slight suppression of the gray scale inversion and, when the non-gray scale inversion share was improved from that when the total Rth=70 nm was satisfied by 15%, it was possible to visually observe the suppression of the gray scale inversion though the level of the suppression was not as high as the level in the case of the improvement by 20%.

As for the isocontrast characteristic, the viewing angle share when the total Rth was equal to the reference value (=70 nm) was used as a judgment reference value. In a case where the value is not less than the reference value, even when the gray scale inversion characteristic is improved, the isocontrast characteristic is not sacrificed.

Figure 29:
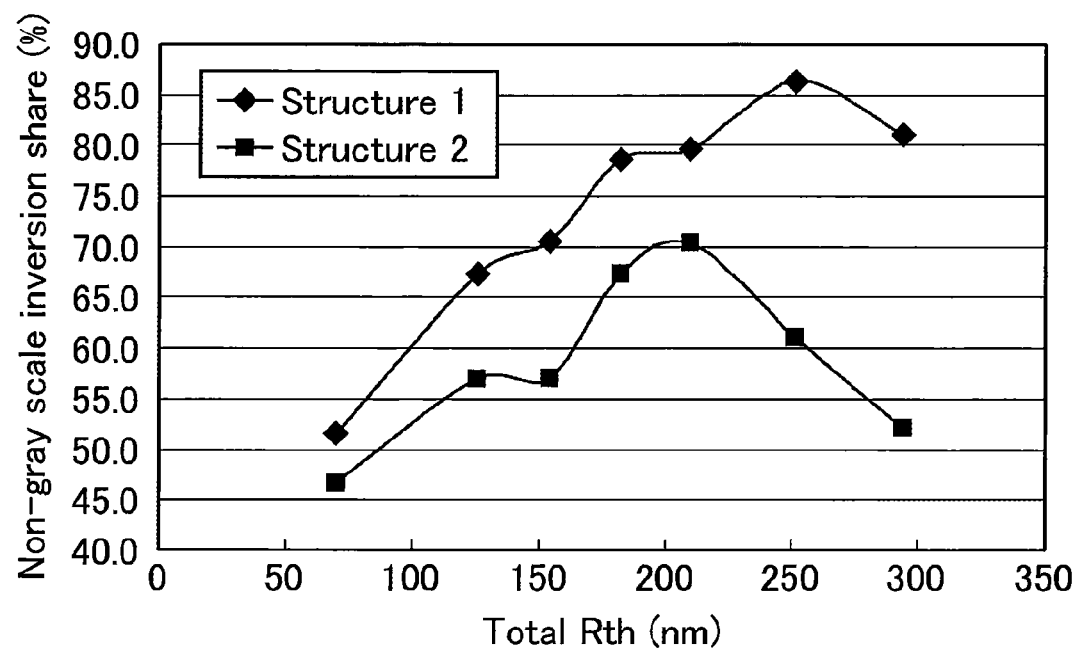
FIG. 29 is a graph showing a non-gray scale inversion share of each of Structure 1 and Structure 2 of the liquid crystal display device according to the first embodiment.
Figure 30:
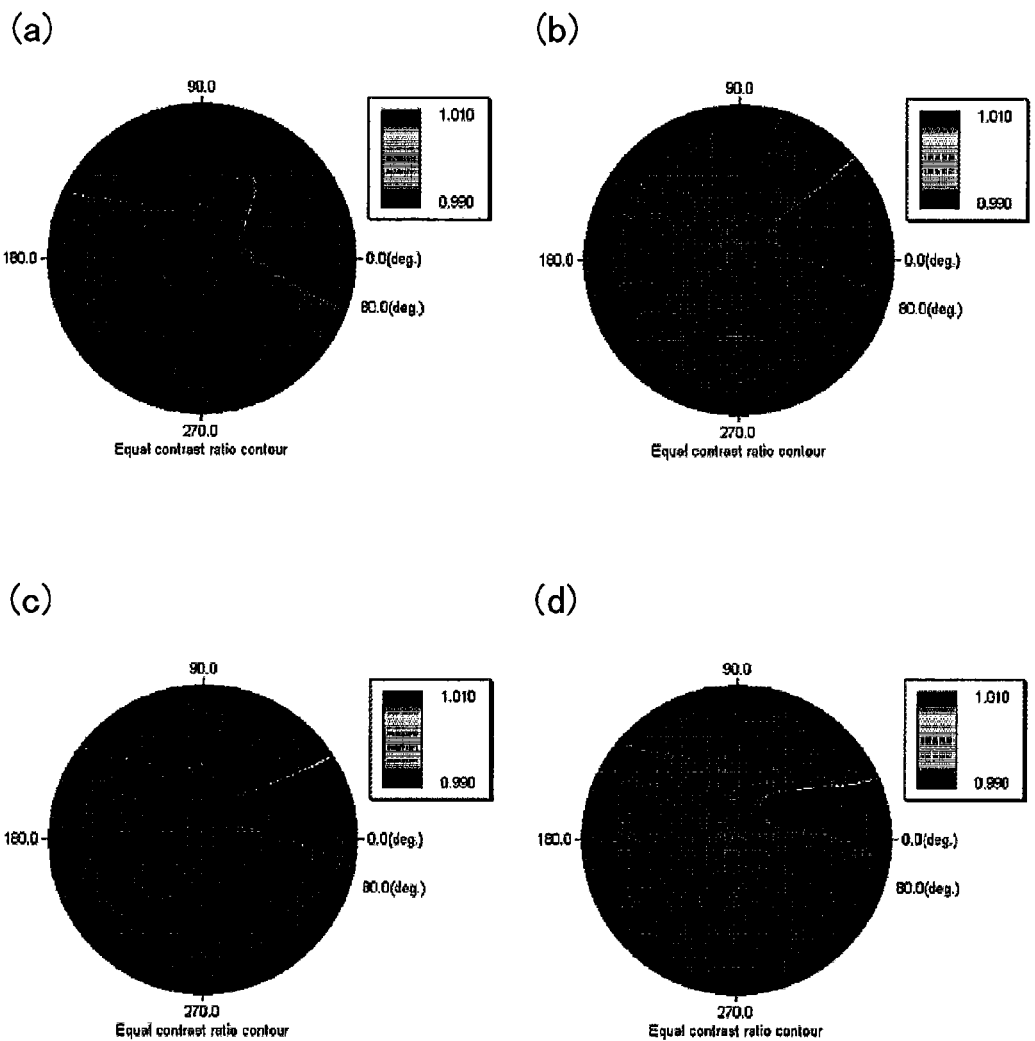
FIG. 30 are graphs each showing the gray scale inversion characteristic of Structure 1+transparent protective layer of the liquid crystal display device according to the first embodiment of which (a) shows a case where the total Rth=100 nm is satisfied, (b) shows a case where the total Rth=156 nm is satisfied, (c) shows a case where the total Rth=184 nm is satisfied, and (d) shows a case where the total Rth=212 nm is satisfied.
Figure 31:
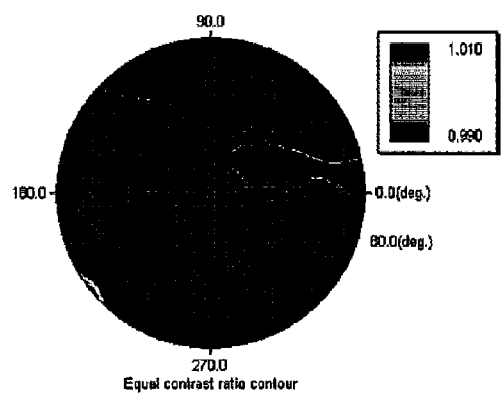
FIG. 31 are graphs each showing the gray scale inversion characteristic of Structure 1+transparent protective layer of the liquid crystal display device according to the first embodiment of which (e) shows a case where the total Rth=240 nm is satisfied, (f) shows a case where the total Rth=282 nm is satisfied, and (g) shows a case where the total Rth=324 nm is satisfied.
Figure 31:
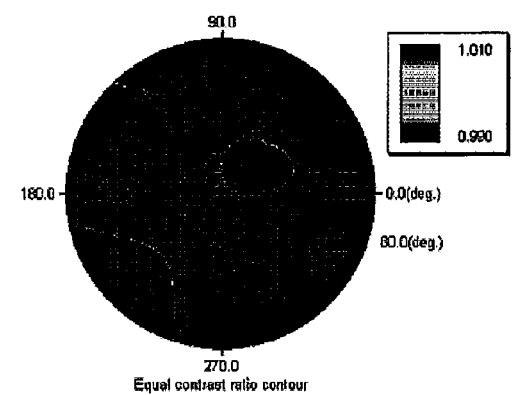
Figure 31:
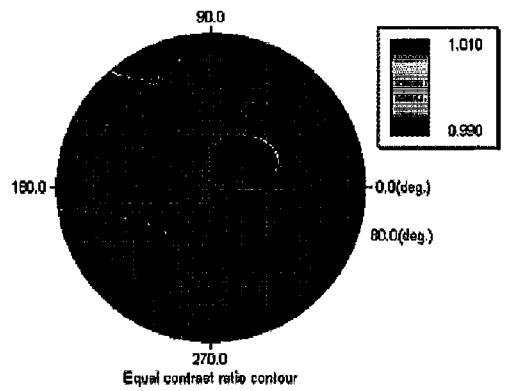
Figure 32:
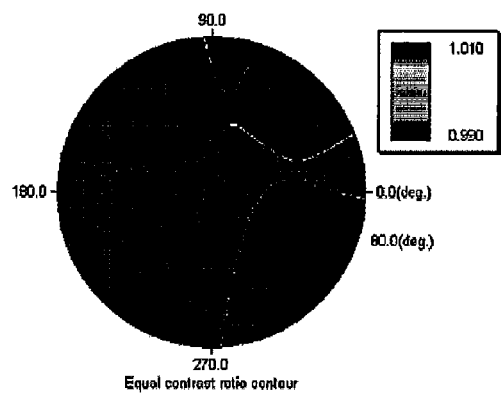
FIG. 32 are graphs each showing the gray scale inversion characteristic of Structure 2+transparent protective layer of the liquid crystal display device according to the first embodiment of which (a) shows the case where the total Rth=100 nm is satisfied, (b) shows the case where the total Rth=156 nm is satisfied, (c) shows the case where the total Rth=184 nm is satisfied, and (d) shows the case where the total Rth=212 nm is satisfied.
Figure 32:
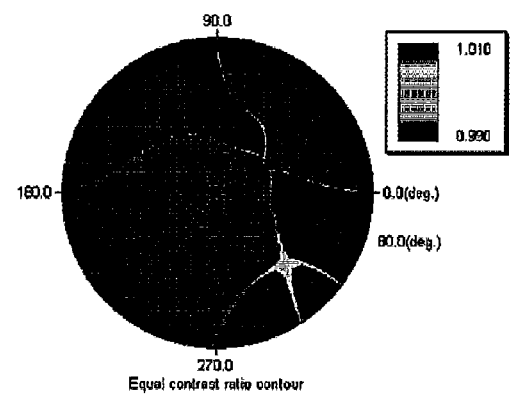
Figure 32:
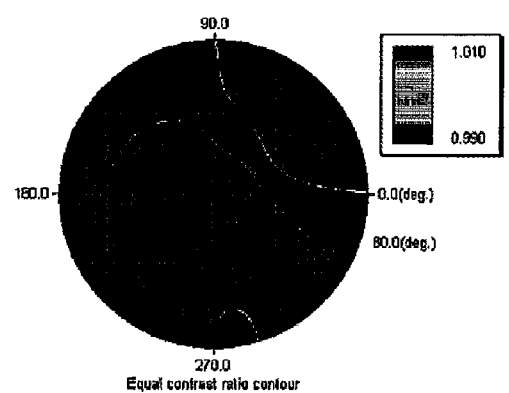
Figure 32:
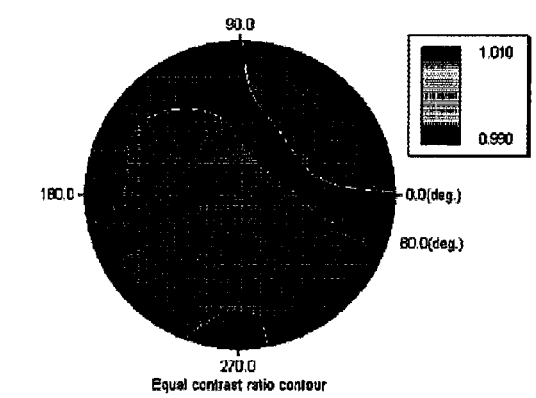
Figure 33:
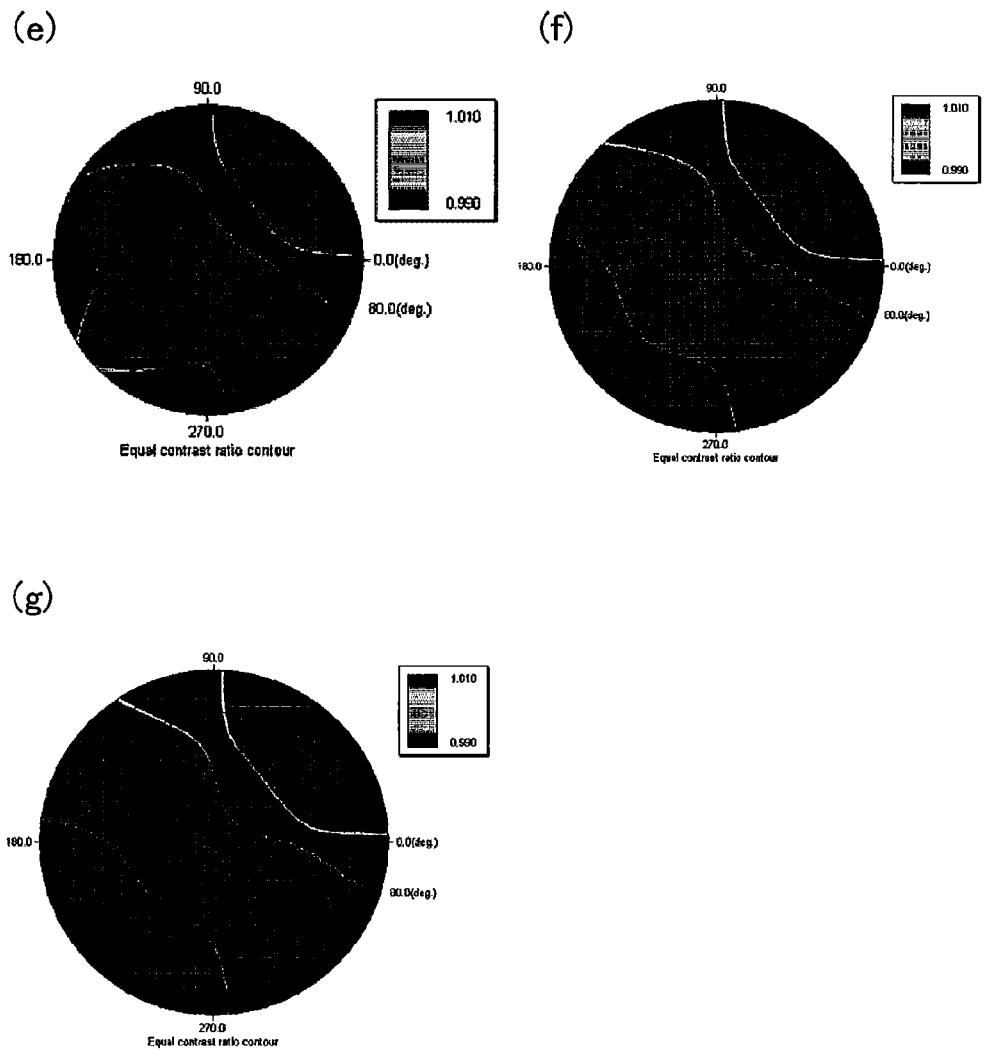
FIG. 33 are graphs each showing the gray scale inversion characteristic of Structure 2+transparent protective layer of the liquid crystal display device according to the first embodiment of which (e) shows the case where the total Rth=240 nm is satisfied, (f) shows the case where the total Rth=282 nm is satisfied, and (g) shows the case where the total Rth=324 nm is satisfied.
Figure 34:
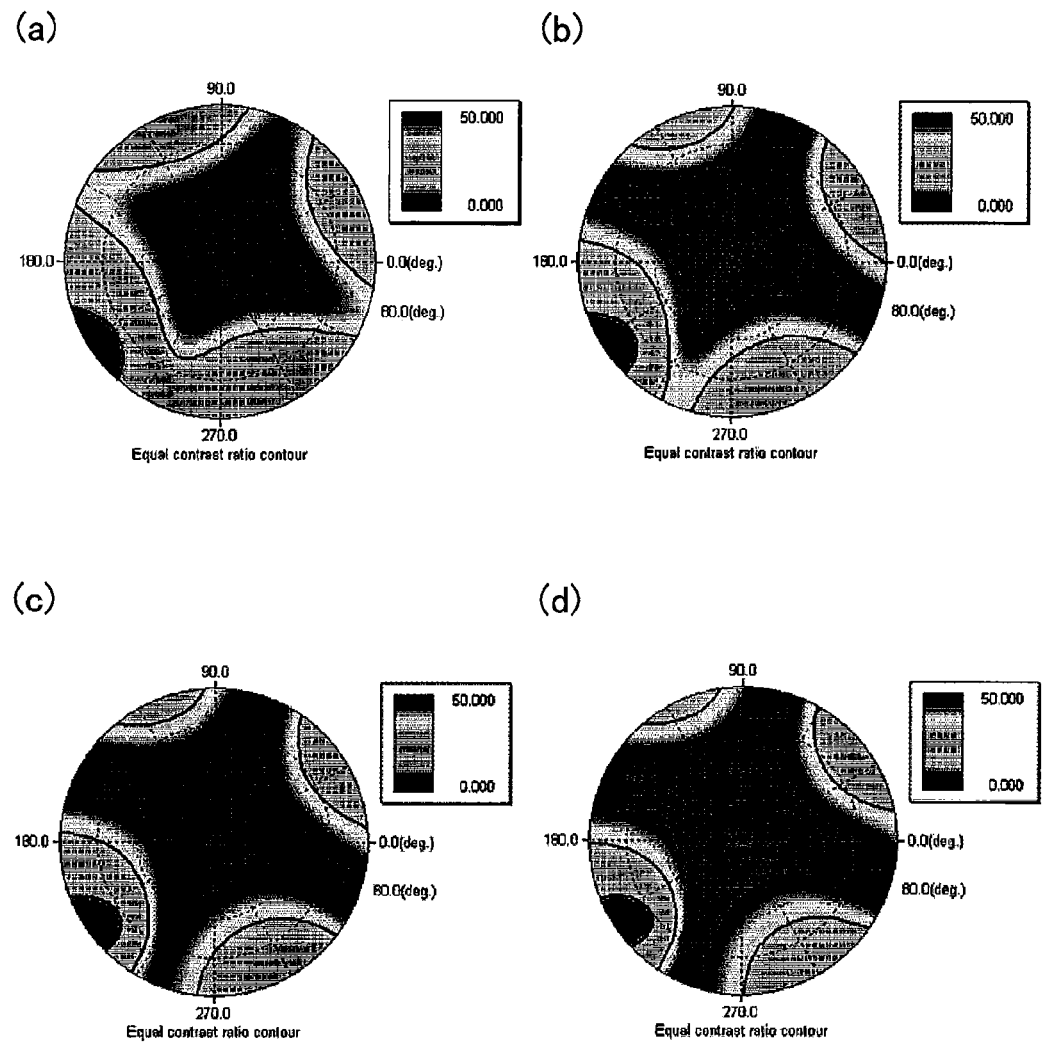
FIG. 34 are graphs each showing the isocontrast characteristic of Structure 1+transparent protective layer of the liquid crystal display device according to the first embodiment of which (a) shows the case where the total Rth=100 nm is satisfied, (b) shows the case where the total Rth=156 nm is satisfied, (c) shows the case where the total Rth=184 nm is satisfied, and (d) shows the case where the total Rth=212 nm is satisfied.
Figure 35:
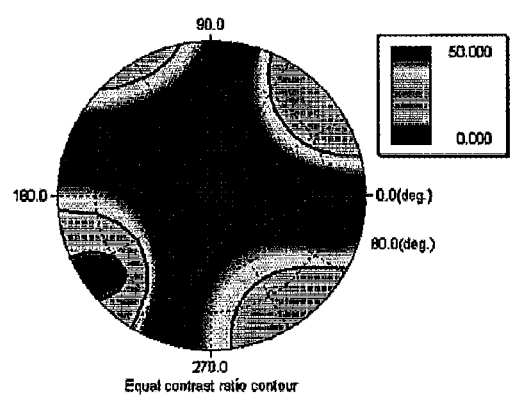
FIG. 35 are graphs each showing the isocontrast characteristic of Structure 1+transparent protective layer of the liquid crystal display device according to the first embodiment of which (e) shows the case where the total Rth=240 nm is satisfied, (f) shows the case where the total Rth=282 nm is satisfied, and (g) shows the case where the total Rth=324 nm is satisfied.
Figure 35:
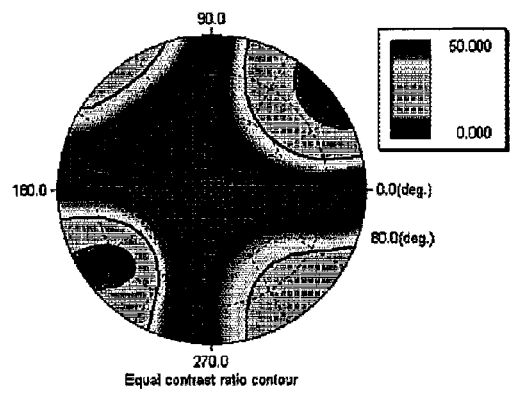
Figure 35:
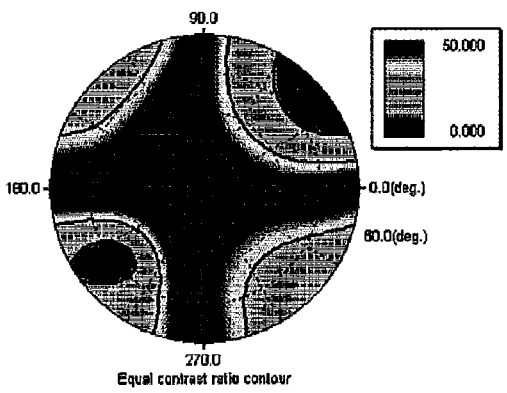
Figure 36:
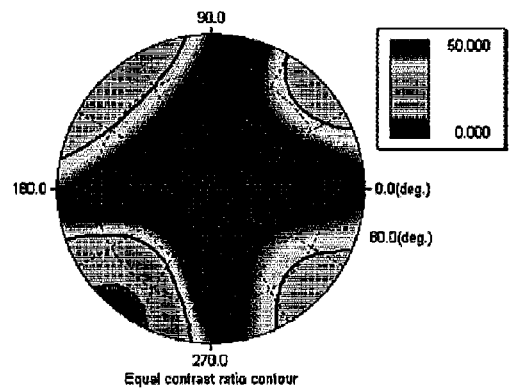
FIG. 36 are graphs each showing the isocontrast characteristic of Structure 2+transparent protective layer of the liquid crystal display device according to the first embodiment of which (a) shows the case where the total Rth=100 nm is satisfied, (b) shows the case where the total Rth=156 nm is satisfied, (c) shows the case where the total Rth=184 nm is satisfied, and (d) shows the case where the total Rth=212 nm is satisfied.
Figure 36:
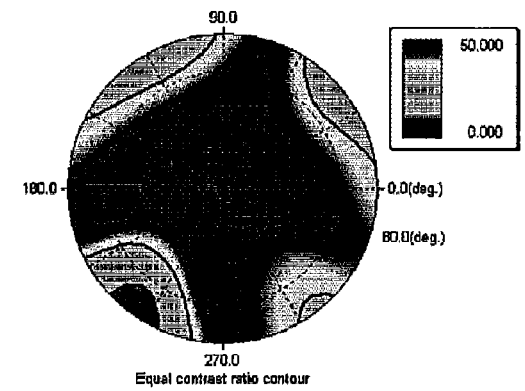
Figure 36:
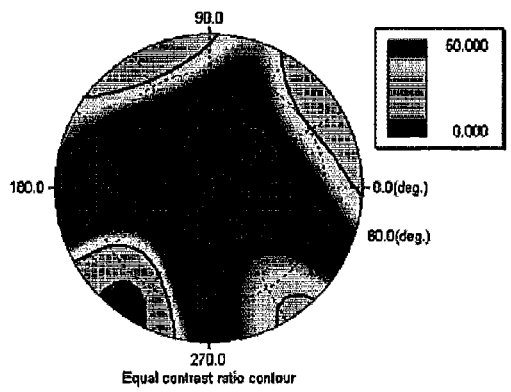
Figure 36:
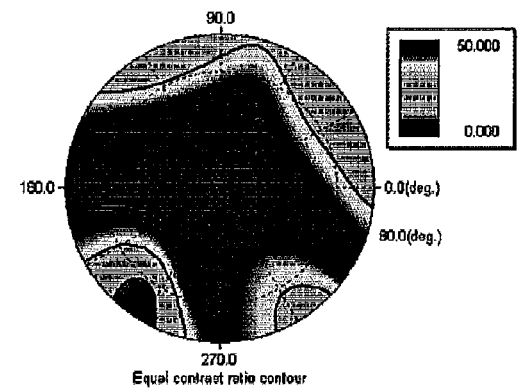
Figure 37:
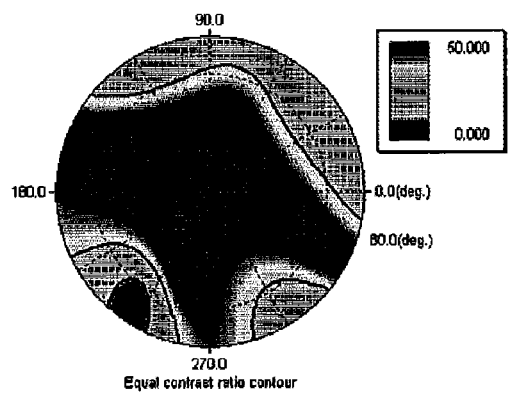
FIG. 37 are graphs each showing the isocontrast characteristic of Structure 2+transparent protective layer of the liquid crystal display device according to the first embodiment of which (e) shows the case where the total Rth=240 nm is satisfied, (f) shows the case where the total Rth=282 nm is satisfied, and (g) shows the case where the total Rth=324 nm is satisfied.
Figure 37:
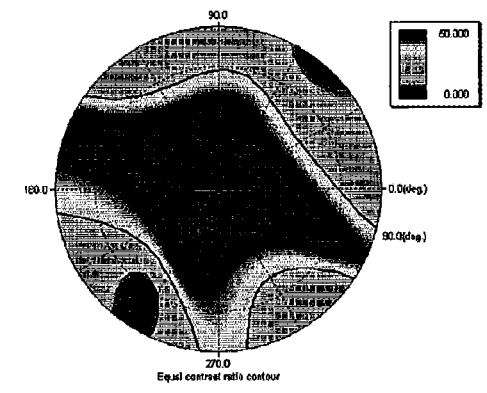
Figure 37:
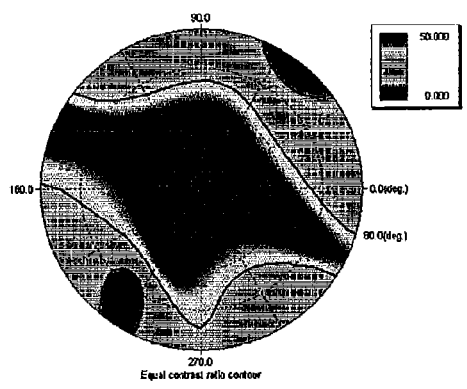

With regard to each of Structures 1 and 2, the result of calculation performed with the Rth of the second phase plate 12 set to 70 nm, 126 nm, 154 nm, 182 nm, 210 nm, 252 nm, or 294 nm by setting the Nz coefficient of the second phase plate 12 to 1, 1.4, 1.6, 1.8, 2, 2.3, or 2.6 is shown in FIGS. 21 to 28. In addition, with regard to each of Structures 1 and 2, the result of calculation of the non-gray scale inversion share is shown in FIG. 29 and Table 1. Note that, in Structures 1 and 2, the Rth of the second phase plate 12 is used as the total Rth as-is.

TABLE 1

| NZ coefficent | 1 | 1.4 | 1.6 | 1.8 | 2 | 2.3 | 2.6 | Judgment reference value |
|---|---|---|---|---|---|---|---|---|
| Total Rth (nm) | 70 | 126 | 154 | 182 | 210 | 252 | 294 | |
| Structure 1 | 51.5% | 67.4% | 70.6% | 78.6% | 79.8% | 86.4% | 81.2% | 61.8% |
| Structure 2 | 46.8% | 57.0% | 57.0% | 67.3% | 70.5% | 61.1% | 52.2% | 56.1% | gray scale inversion was especially effectively suppressed in a case where the gray scale inversion share was improved from that at the time of the total Rth of a reference value by 20%. The reference value of the total Rth was set to 70 nm. The reference value was determined from the most preferable Re (=140 nm) of the second phase plate 12 and the Nz coefficient (=1) obtained when the raw film of the second phase plate 12 was stretched by a longitudinal uniaxial stretching method as the easiest method. Consequently, in the following evaluation, in each structure, a value obtained by multiplying As the result, in Structure 1, it was found that the non-gray scale inversion share of not less than the judgment reference value was exhibited in the range of the total Rth of 120 nm or more and 300 nm or less, and the extremely excellent gray scale inversion characteristic could be achieved. In Structure 1, the total Rth may be 180 nm or more, or may also be 250 nm or more. Based on this, it is possible to significantly improve the gray scale inversion characteristic. In addition, in Structure 2, it was found that the non-gray scale inversion share of not less than the judgment reference value was exhibited in the range of the total Rth of 120 nm or more and 260 nm or less, and the extremely excellent gray scale inversion characteristic could be achieved. In Structure 2, the total Rth may be 180 nm or more. Based this, it is possible to significantly improve the gray scale inversion characteristic.

Figure 38:
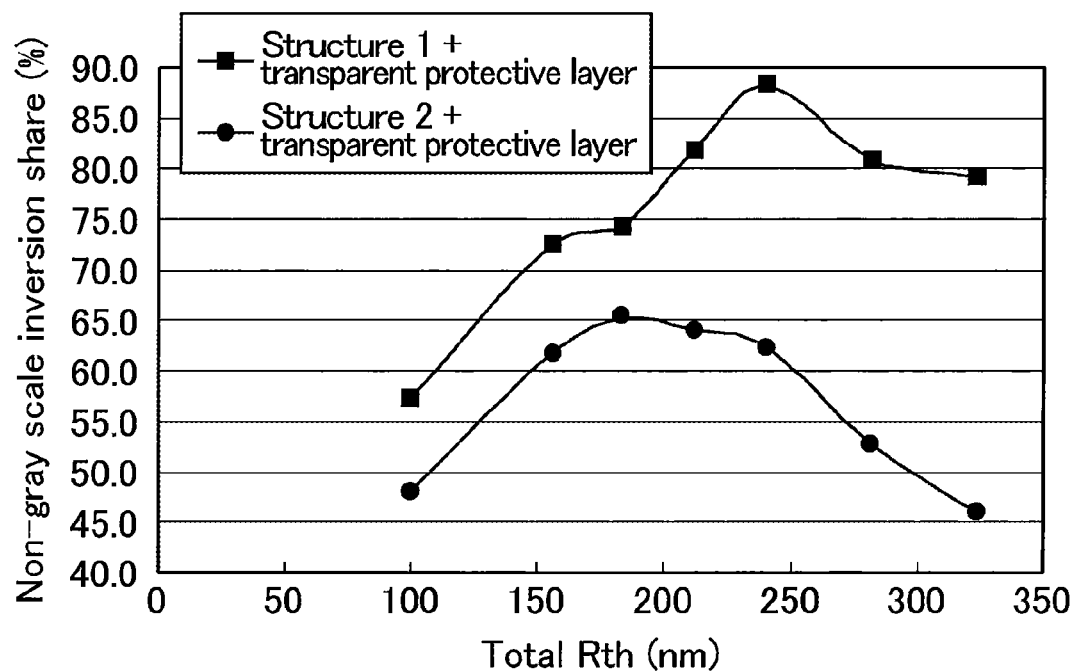
FIG. 38 is a graph showing the non-gray scale inversion share of each of Structure 1+transparent protective layer and Structure 2+transparent protective layer of the liquid crystal display device according to the first embodiment.

With regard to each of Structure 1+transparent protective layer and Structure 2+transparent protective layer, the result of calculation performed with the Rth of the second phase plate 12 set to 70 nm, 126 nm, 154 nm, 182 nm, 210 nm, 252 nm, or 294 nm by setting the Nz coefficient of the second phase plate 12 to 1, 1.4, 1.6, 1.8, 2, 2.3, or 2.6 is shown in FIGS. 30 to 37. In addition, with regard to each of Structure 1+transparent protective layer and Structure 2+transparent protective layer, the result of calculation of the non-gray scale inversion share is shown in FIG. 38 and Table 2. Note that, in Structure 1+transparent protective layer and Structure 2+transparent protective layer, the total Rth corresponds to the sum of each Rth of the second phase plate 12 and the Rth (30 nm) of the transparent protective layer.

total Rth may also be 210 nm or more. Based on this, it is possible to significantly improve the gray scale inversion characteristic. In addition, in Structure 2+transparent protective layer, it was found that the non-gray scale inversion share of not less than the judgment reference value was exhibited in the range of the total Rth of 150 nm or more and 240 nm or less, and the extremely excellent gray scale inversion characteristic could be achieved.

Figure 39:
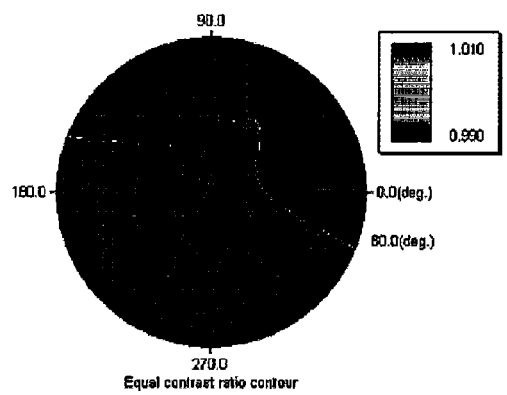
FIG. 39 are graphs each showing the gray scale inversion characteristic of Structure 1-1 of the liquid crystal display device according to the first embodiment of which (a) shows the case where the total Rth=70 nm is satisfied, (b) shows a case where the total Rth=130 nm is satisfied, (c) shows a case where the total Rth=140 nm is satisfied, and (d) shows a case where the total Rth=150 nm is satisfied.
Figure 39:
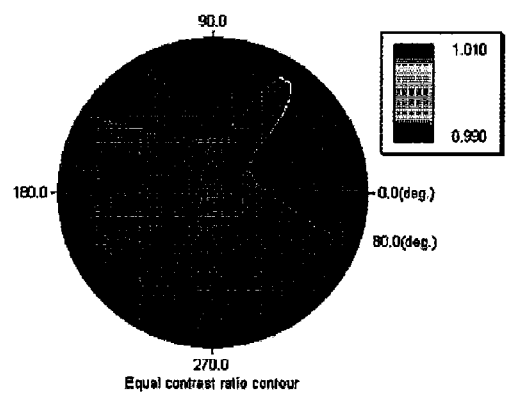
Figure 39:
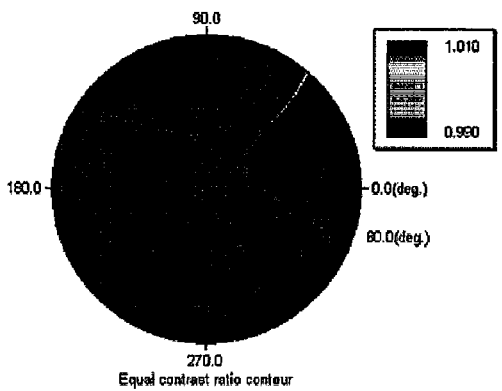
Figure 39:
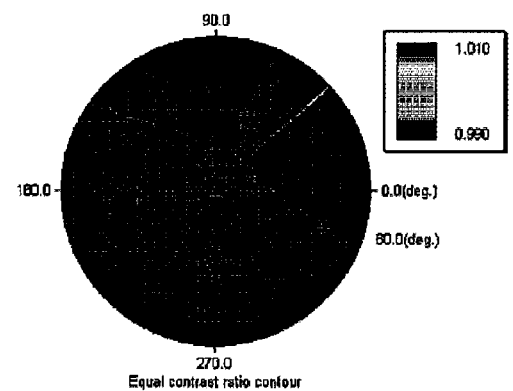
Figure 40:
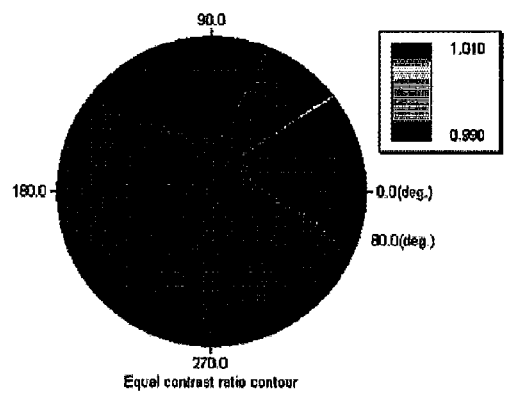
FIG. 40 are graphs each showing the gray scale inversion characteristic of Structure 1-1 of the liquid crystal display device according to the first embodiment of which (e) shows a case where the total Rth=160 nm is satisfied, (f) shows a case where the total Rth=170 nm is satisfied, (g) shows a case where the total Rth=190 nm is satisfied, and (h) shows the case where the total Rth=210 nm is satisfied.
Figure 40:
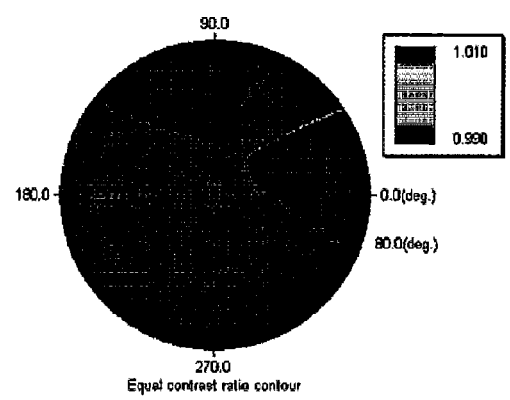
Figure 40:
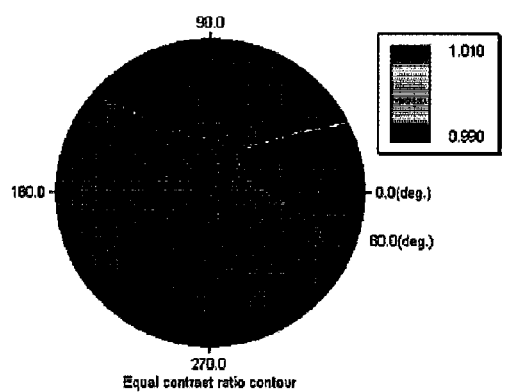
Figure 40:
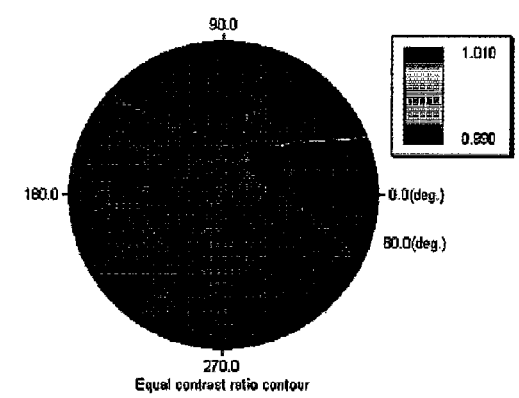
Figure 41:
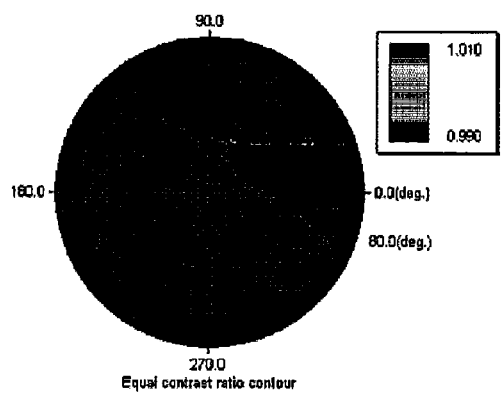
FIG. 41 are graphs each showing the gray scale inversion characteristic of Structure 1-1 of the liquid crystal display device according to the first embodiment of which (i) shows a case where the total Rth=230 nm is satisfied, (j) shows a case where the total Rth=250 nm is satisfied, (k) shows a case where the total Rth=270 nm is satisfied, and (l) shows a case where the total Rth=290 nm is satisfied.
Figure 41:
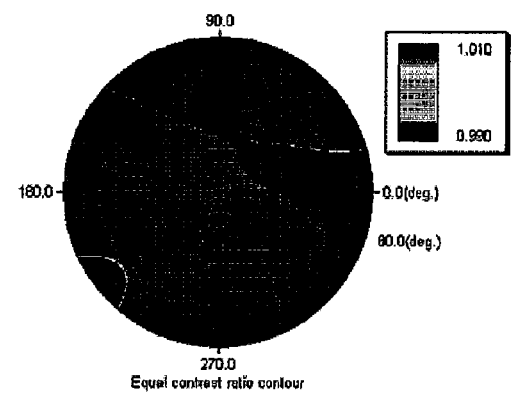
Figure 41:
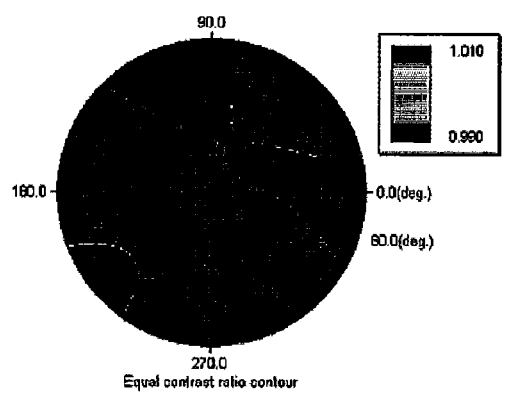
Figure 41:
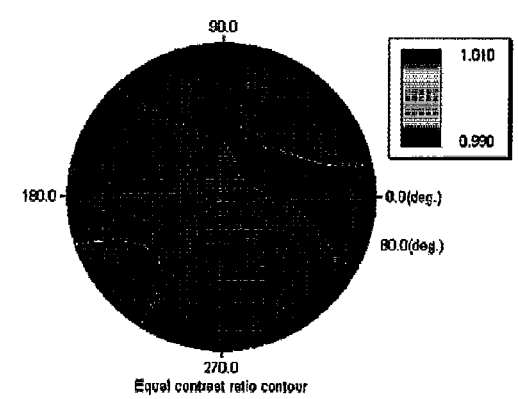
Figure 42:
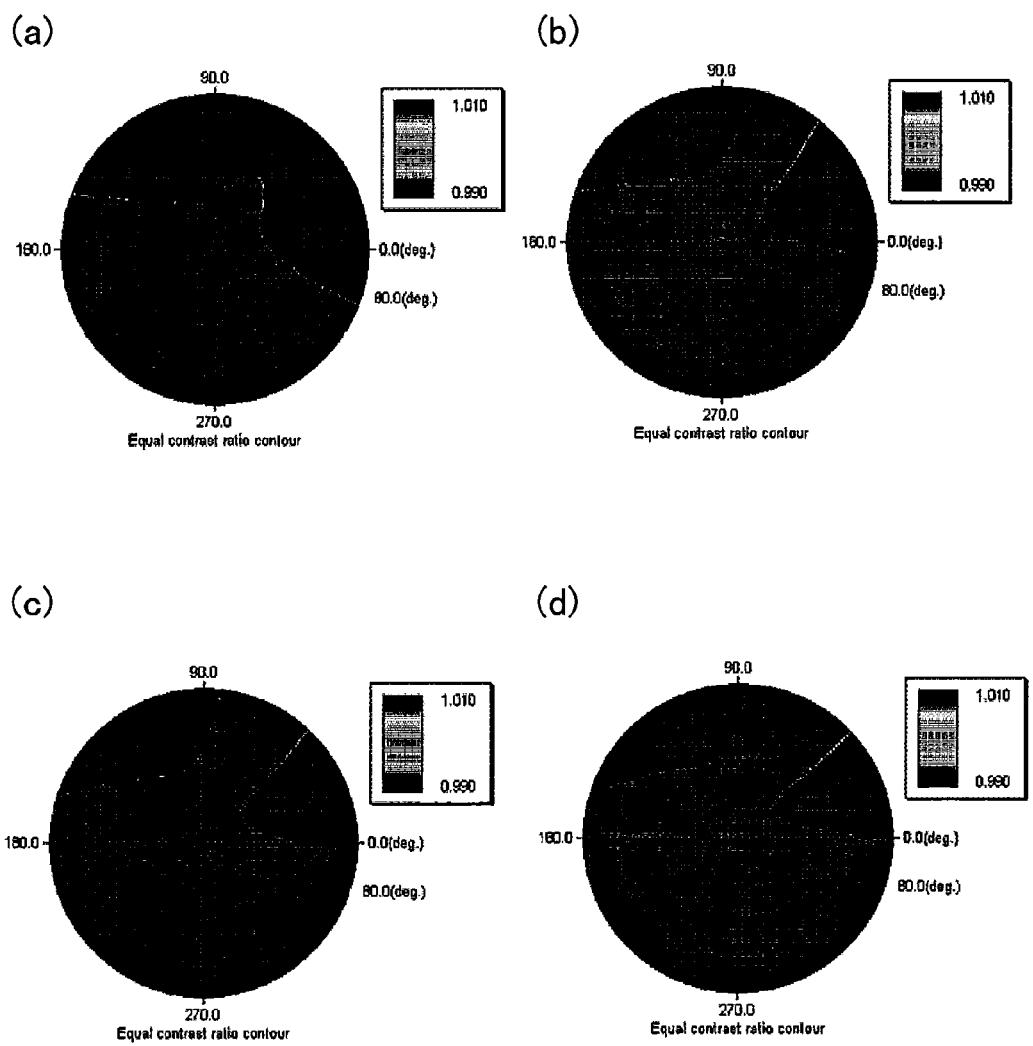
FIG. 42 are graphs each showing the gray scale inversion characteristic of Structure 1-2 of the liquid crystal display device according to the first embodiment of which (a) shows the case where the total Rth=70 nm is satisfied, (b) shows the case where the total Rth=130 nm is satisfied, (c) shows the case where the total Rth=140 nm is satisfied, and (d) shows the case where the total Rth=150 nm is satisfied.
Figure 43:
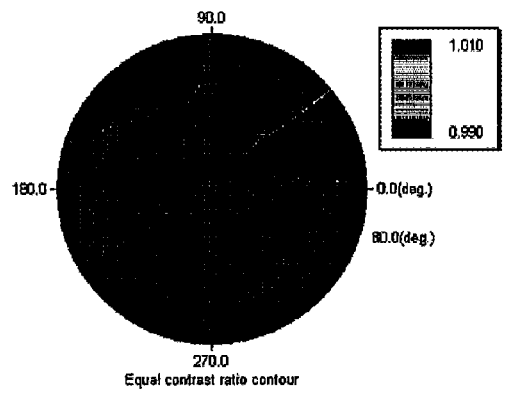
FIG. 43 are graphs each showing the gray scale inversion characteristic of Structure 1-2 of the liquid crystal display device according to the first embodiment of which (e) shows the case where the total Rth=160 nm is satisfied, (f) shows the case where the total Rth=170 nm is satisfied, (g) shows the case where the total Rth=190 nm is satisfied, and (h) shows the case where the total Rth=210 nm is satisfied.
Figure 43:
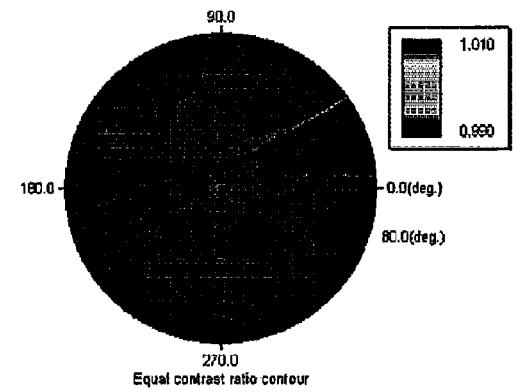
Figure 43:
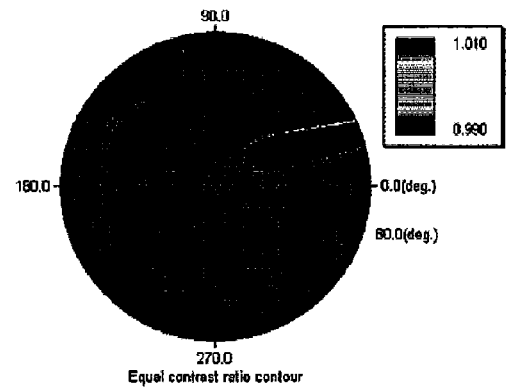
Figure 43:
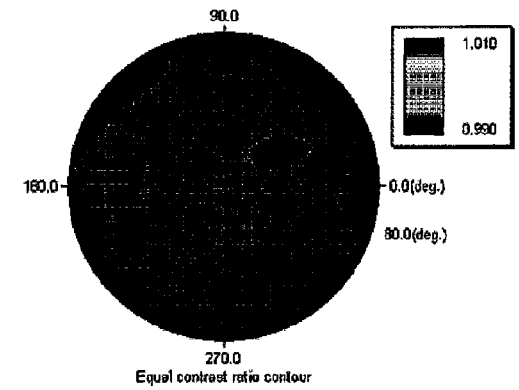
Figure 44:
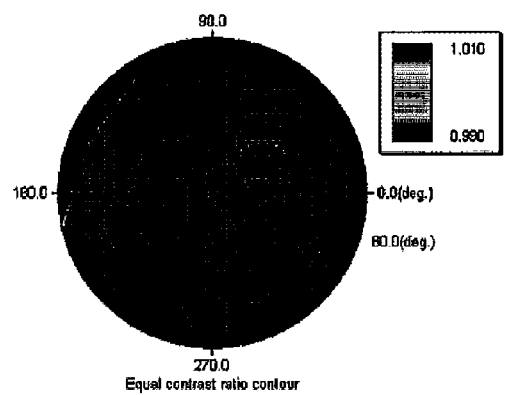
FIG. 44 are graphs each showing the gray scale inversion characteristic of Structure 1-2 of the liquid crystal display device according to the first embodiment of which (i) shows the case where the total Rth=230 nm is satisfied, (j) shows the case where the total Rth=250 nm is satisfied, (k) shows the case where the total Rth=270 nm is satisfied, and (l) shows the case where the total Rth=290 nm is satisfied.
Figure 44:
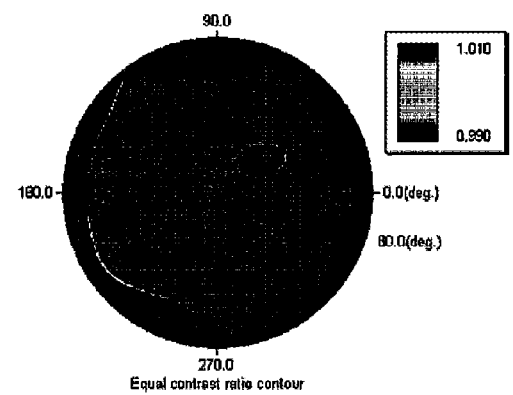
Figure 44:
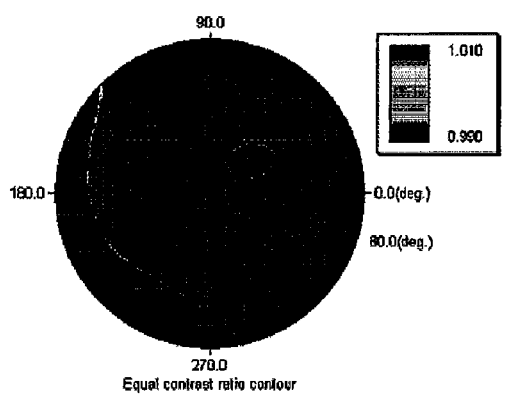
Figure 44:
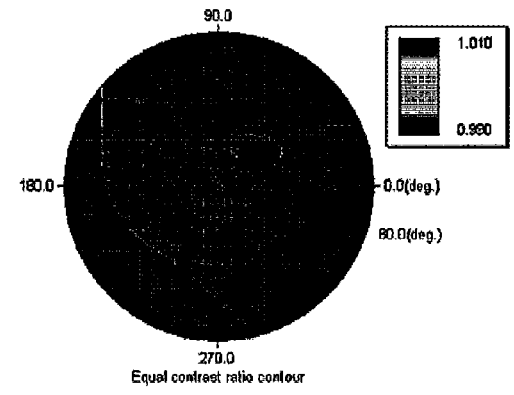
Figure 45:
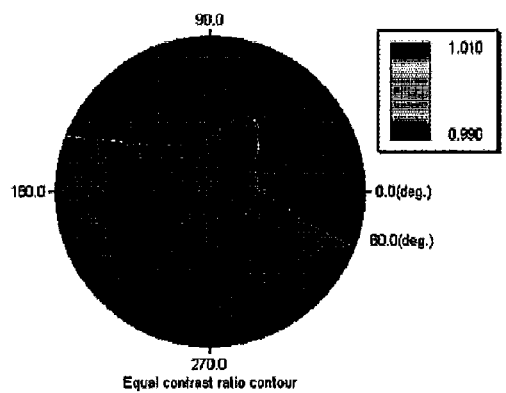
FIG. 45 are graphs each showing the gray scale inversion characteristic of Structure 1-3 of the liquid crystal display device according to the first embodiment of which (a) shows the case where the total Rth=70 nm is satisfied, (b) shows the case where the total Rth=130 nm is satisfied, (c) shows the case where the total Rth=140 nm is satisfied, and (d) shows the case where the total Rth=150 nm is satisfied.
Figure 45:
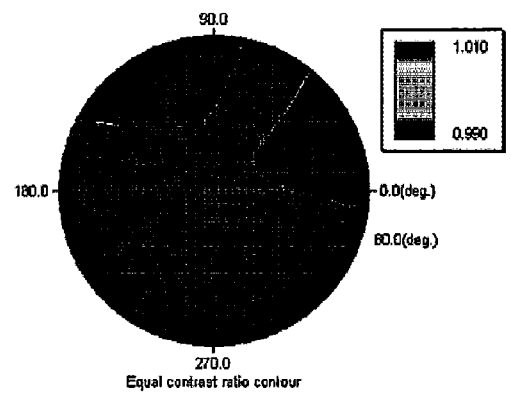
Figure 45:
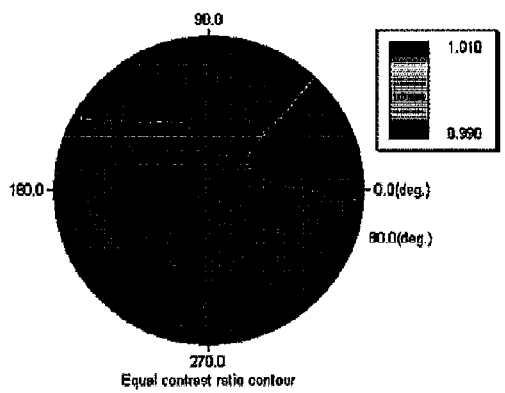
Figure 45:
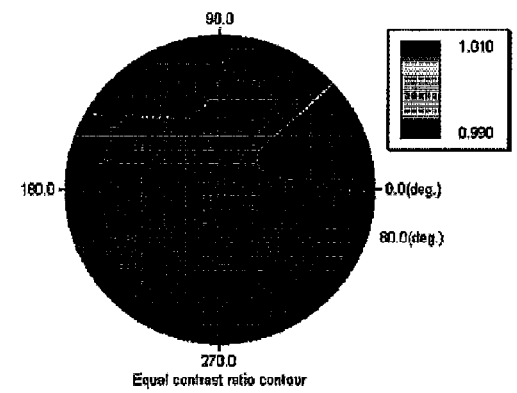
Figure 46:
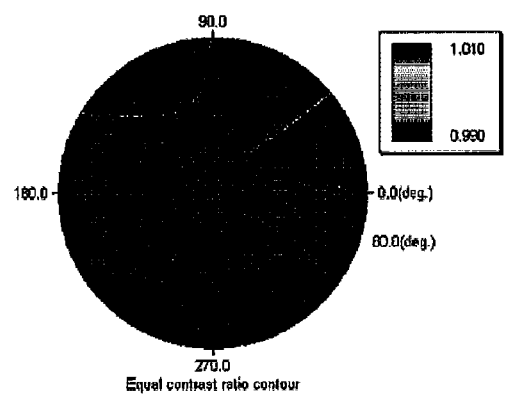
FIG. 46 are graphs each showing the gray scale inversion characteristic of Structure 1-3 of the liquid crystal display device according to the first embodiment of which (e) shows the case where the total Rth=160 nm is satisfied, (f) shows the case where the total Rth=170 nm is satisfied, (g) shows the case where the total Rth=190 nm is satisfied, and (h) shows the case where the total Rth=210 nm is satisfied.
Figure 46:
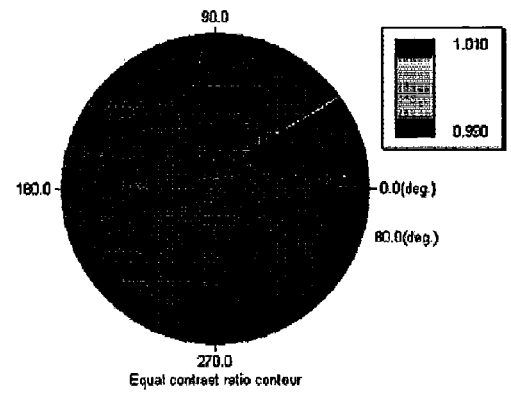
Figure 46:
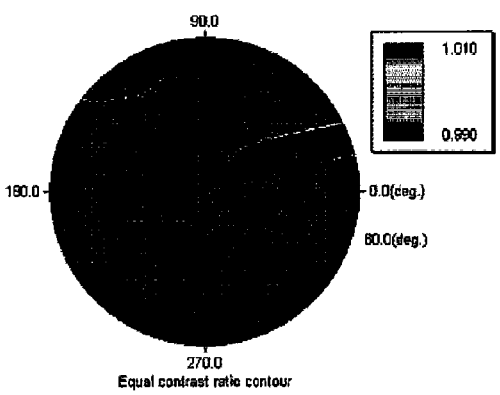
Figure 46:
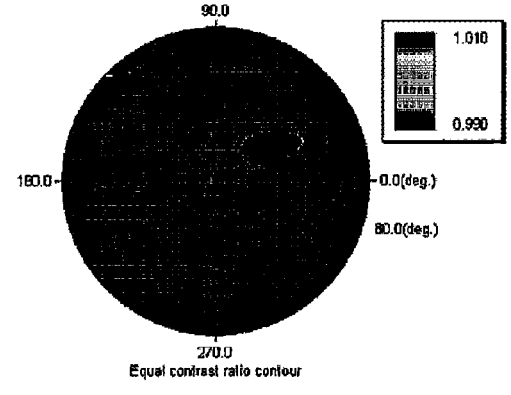
Figure 47:
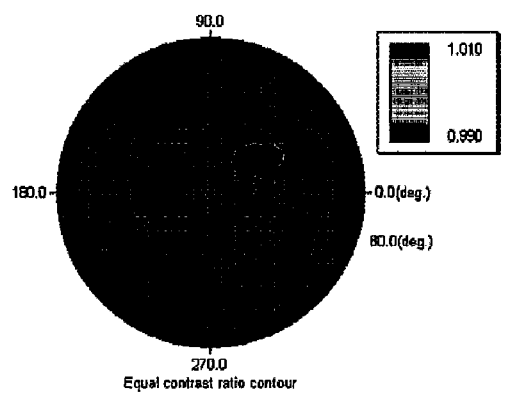
FIG. 47 are graphs each showing the gray scale inversion characteristic of Structure 1-3 of the liquid crystal display device according to the first embodiment of which (i) shows the case where the total Rth=230 nm is satisfied, (j) shows the case where the total Rth=250 nm is satisfied, (k) shows the case where the total Rth=270 nm is satisfied, and (l) shows the case where the total Rth=290 nm is satisfied.
Figure 47:
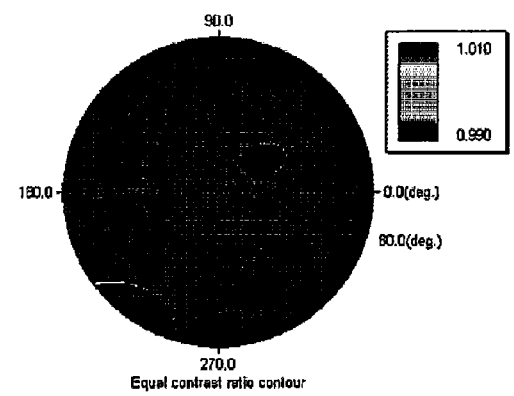
Figure 47:
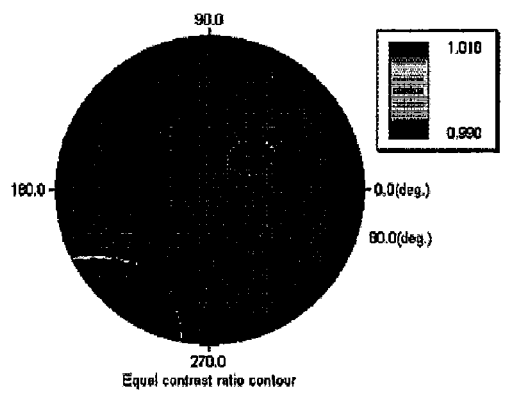
Figure 47:
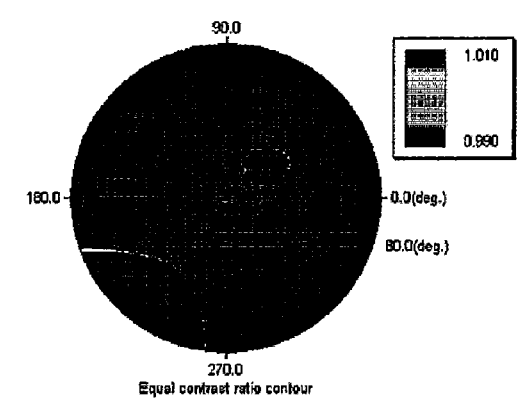
Figure 48:
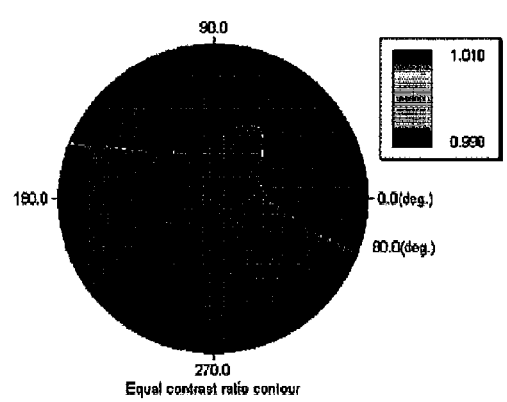
FIG. 48 are graphs each showing the gray scale inversion characteristic of Structure 1-4 of the liquid crystal display device according to the first embodiment of which (a) shows the case where the total Rth=70 nm is satisfied, (b) shows the case where the total Rth=130 nm is satisfied, (c) shows the case where the total Rth=140 nm is satisfied, and (d) shows the case where the total Rth=150 nm is satisfied.
Figure 48:
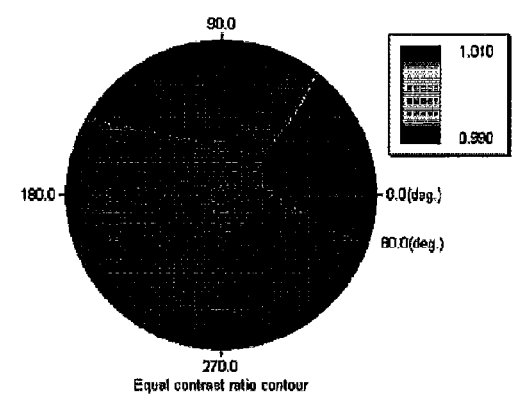
Figure 48:
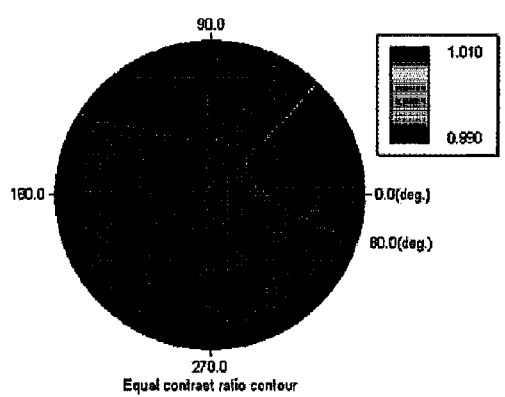
Figure 48:
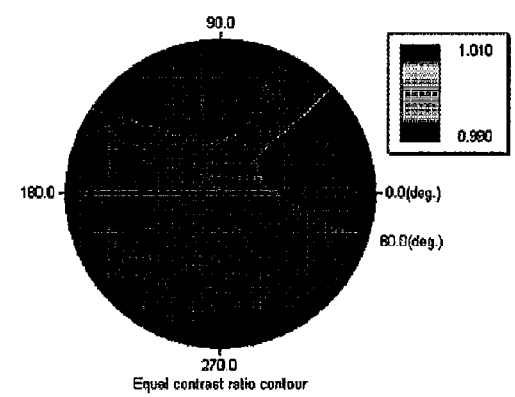
Figure 49:
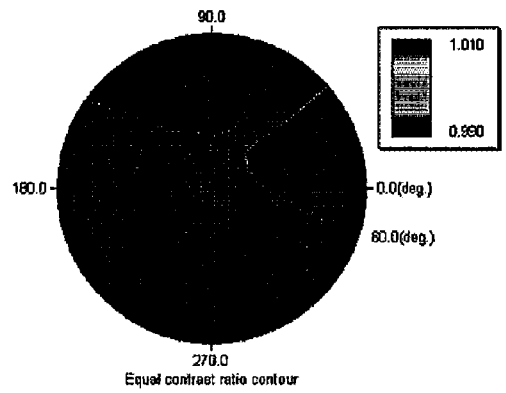
FIG. 49 are graphs each showing the gray scale inversion characteristic of Structure 1-4 of the liquid crystal display device according to the first embodiment of which (e) shows the case where the total Rth=160 nm is satisfied, (f) shows the case where the total Rth=170 nm is satisfied, (g) shows the case where the total Rth=190 nm is satisfied, and (h) shows the case where the total Rth=210 nm is satisfied.
Figure 49:
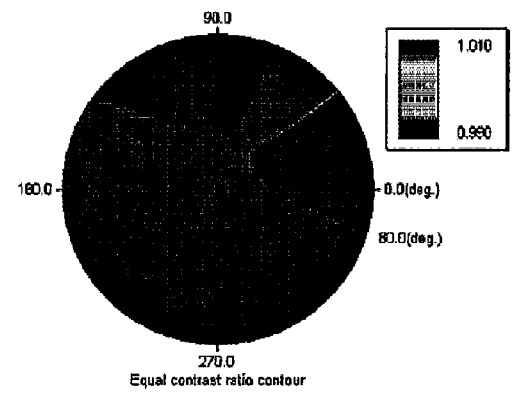
Figure 49:
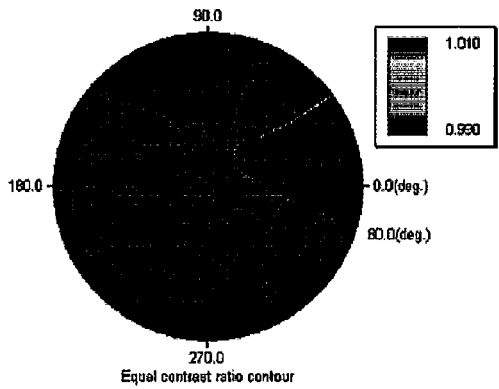
Figure 49:
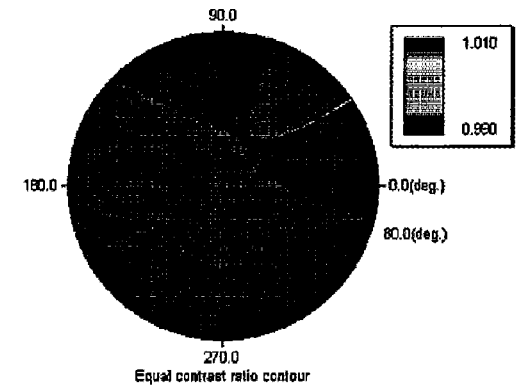
Figure 50:
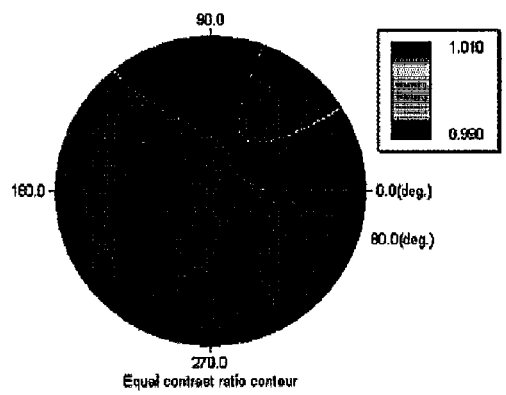
FIG. 50 are graphs each showing the gray scale inversion characteristic of Structure 1-4 of the liquid crystal display device according to the first embodiment of which (i) shows the case where the total Rth=230 nm is satisfied, (j) shows the case where the total Rth=250 nm is satisfied, (k) shows the case where the total Rth=270 nm is satisfied, and (l) shows the case where the total Rth=290 nm is satisfied.
Figure 50:
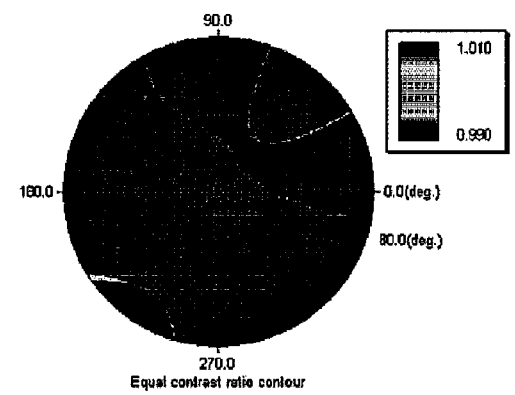
Figure 50:
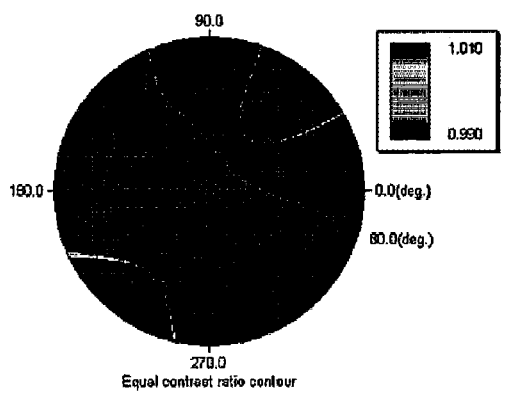
Figure 50:
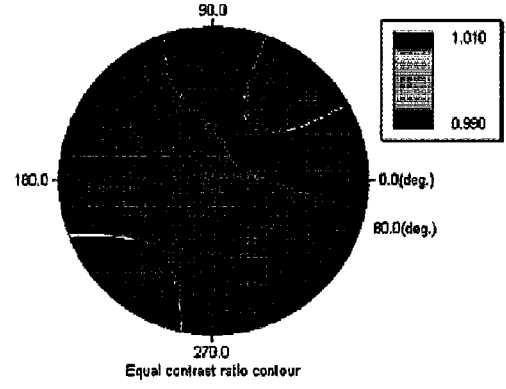
Figure 51:
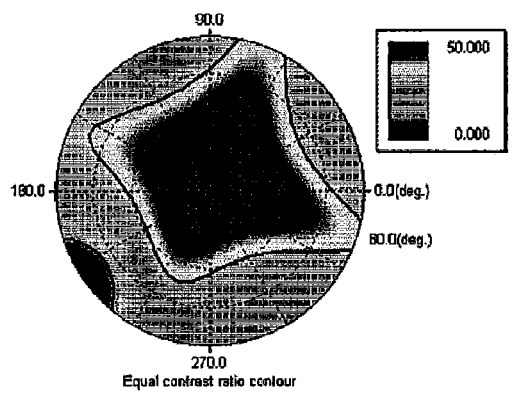
FIG. 51 are graphs each showing the isocontrast characteristic of Structure 1-1 of the liquid crystal display device according to the first embodiment of which (a) shows the case where the total Rth=70 nm is satisfied, (b) shows the case where the total Rth=130 nm is satisfied, (c) shows the case where the total Rth=140 nm is satisfied, and (d) shows the case where the total Rth=150 nm is satisfied.
Figure 51:
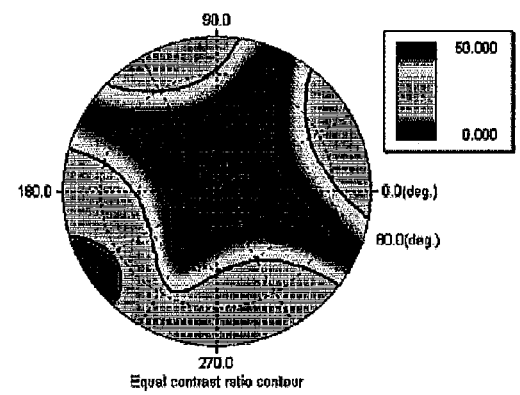
Figure 51:
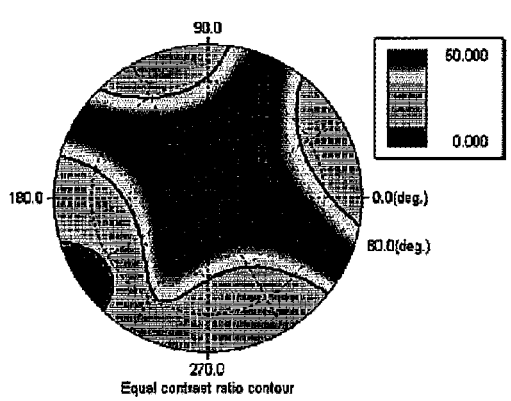
Figure 51:
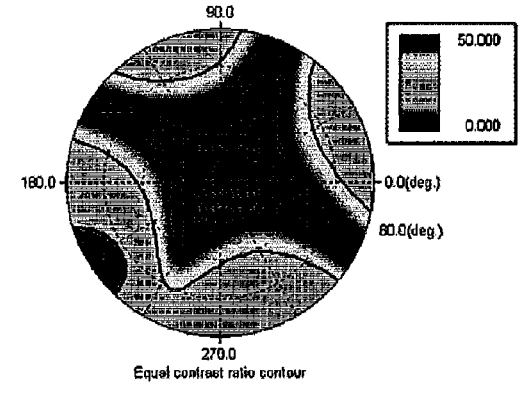
Figure 52:
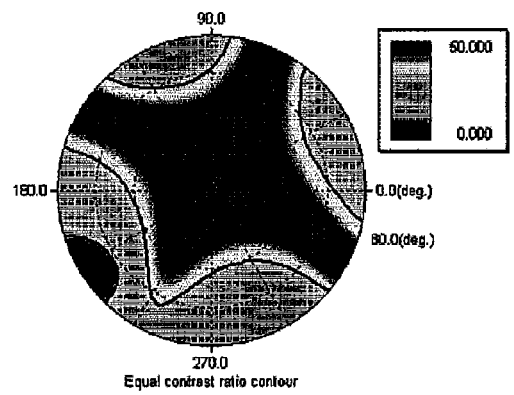
FIG. 52 are graphs each showing the isocontrast characteristic of Structure 1-1 of the liquid crystal display device according to the first embodiment of which (e) shows the case where the total Rth=160 nm is satisfied, (f) shows the case where the total Rth=170 nm is satisfied, (g) shows the case where the total Rth=190 nm is satisfied, and (h) shows the case where the total Rth=210 nm is satisfied.
Figure 52:
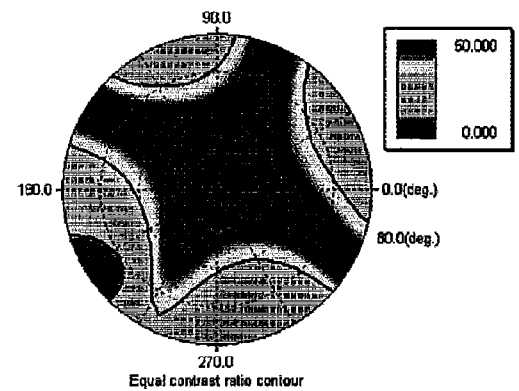
Figure 52:
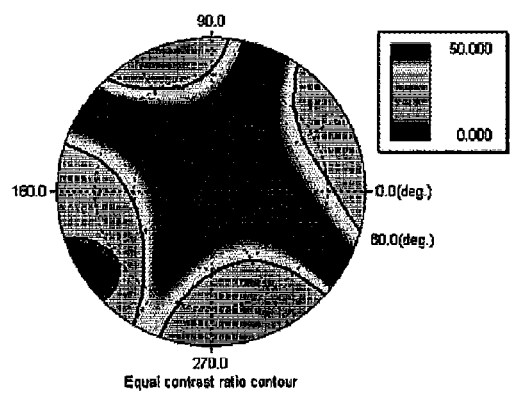
Figure 52:
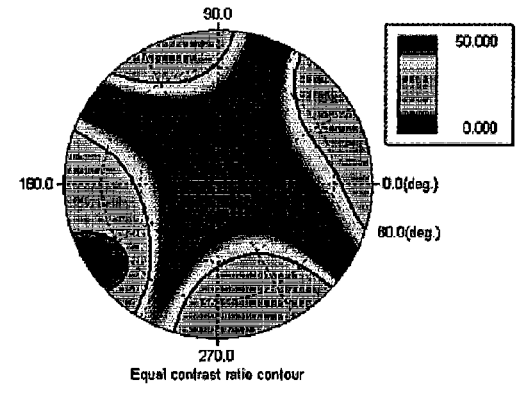
Figure 53:
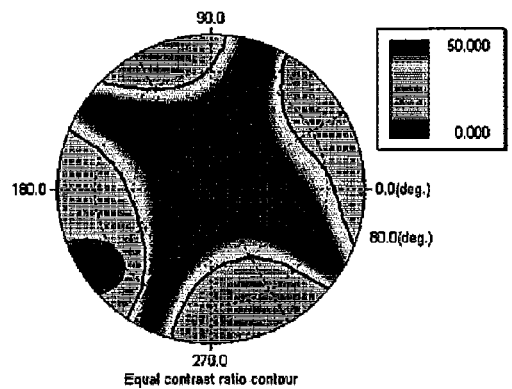
FIG. 53 are graphs each showing the isocontrast characteristic of Structure 1-1 of the liquid crystal display device according to the first embodiment of which (i) shows the case where the total Rth=230 nm is satisfied, (j) shows the case where the total Rth=250 nm is satisfied, (k) shows the case where the total Rth=270 nm is satisfied, and (l) shows the case where the total Rth=290 nm is satisfied.
Figure 53:
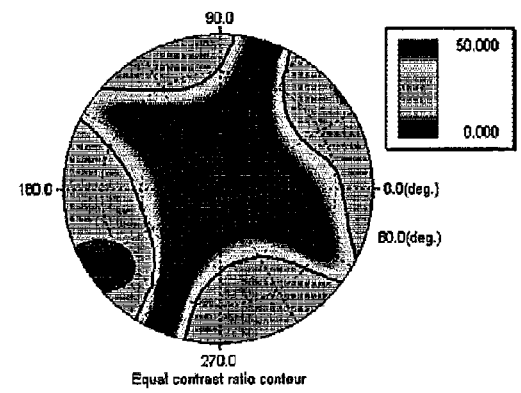
Figure 53:
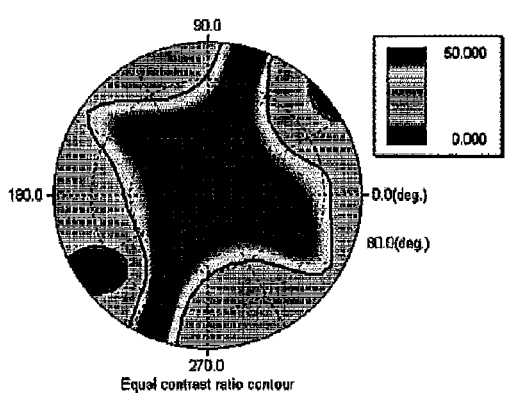
Figure 53:
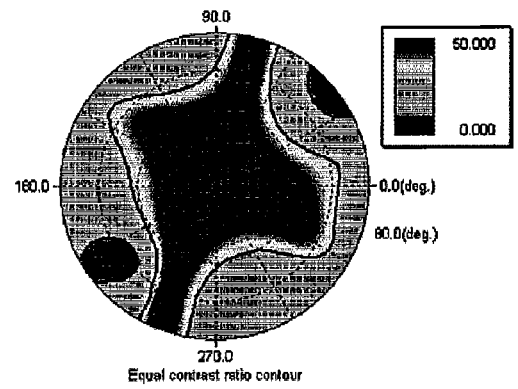
Figure 54:
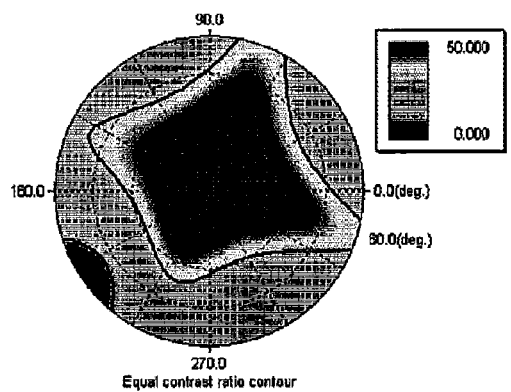
FIG. 54 are graphs each showing the isocontrast characteristic of Structure 1-2 of the liquid crystal display device according to the first embodiment of which (a) shows the case where the total Rth=70 nm is satisfied, (b) shows the case where the total Rth=130 nm is satisfied, (c) shows the case where the total Rth=140 nm is satisfied, and (d) shows the case where the total Rth=150 nm is satisfied.
Figure 54:
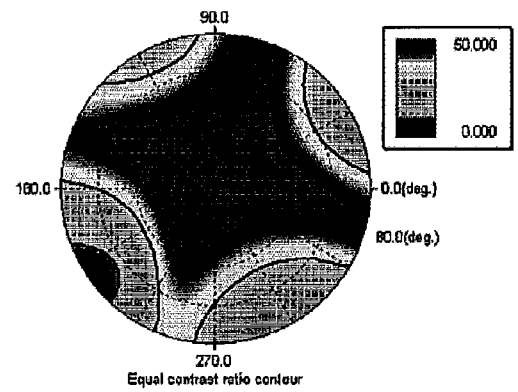
Figure 54:
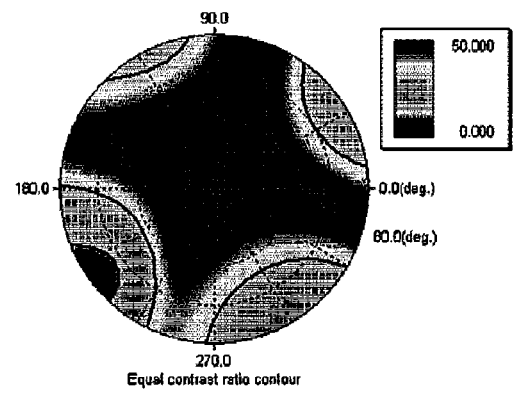
Figure 54:
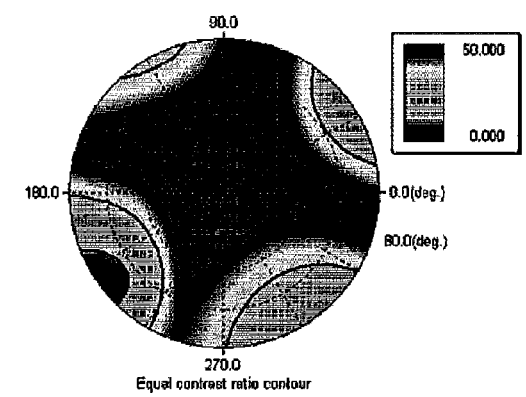
Figure 55:
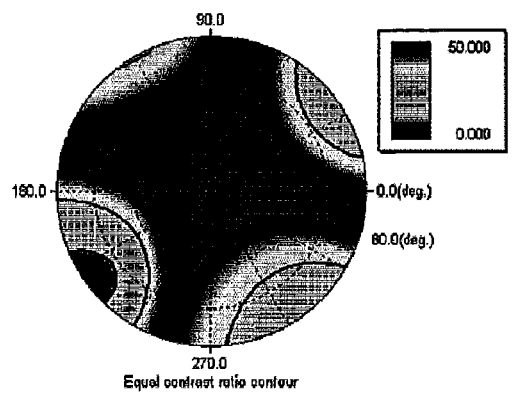
FIG. 55 are graphs each showing the isocontrast characteristic of Structure 1-2 of the liquid crystal display device according to the first embodiment of which (e) shows the case where the total Rth=160 nm is satisfied, (f) shows the case where the total Rth=170 nm is satisfied, (g) shows the case where the total Rth=190 nm is satisfied, and (h) shows the case where the total Rth=210 nm is satisfied.
Figure 55:
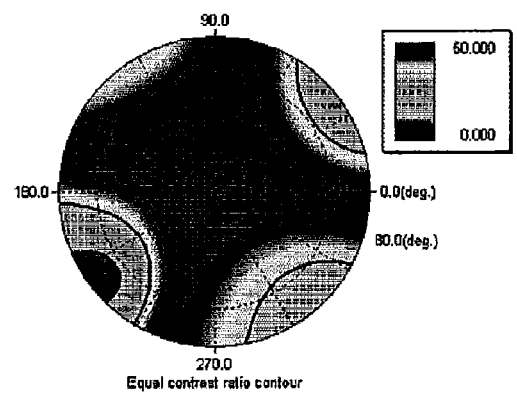
Figure 55:
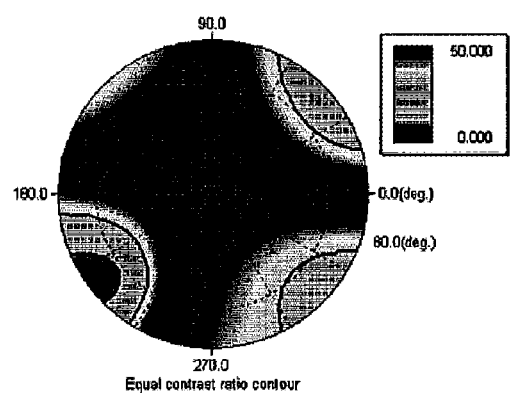
Figure 55:
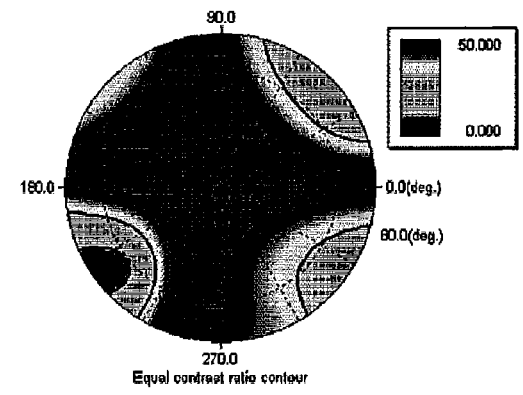
Figure 56:
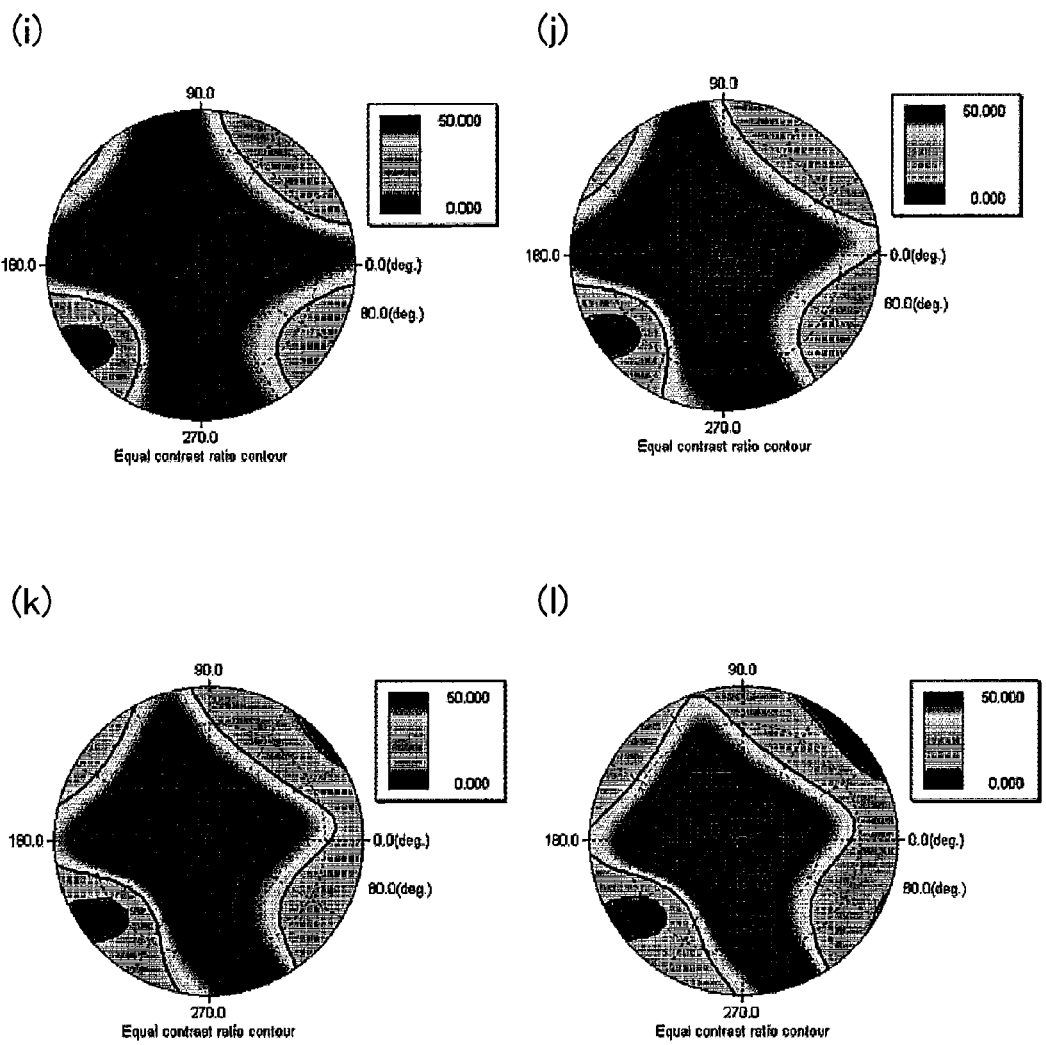
FIG. 56 are graphs each showing the isocontrast characteristic of Structure 1-2 of the liquid crystal display device according to the first embodiment of which (i) shows the case where the total Rth=230 nm is satisfied, (j) shows the case where the total Rth=250 nm is satisfied, (k) shows the case where the total Rth=270 nm is satisfied, and (l) shows the case where the total Rth=290 nm is satisfied.
Figure 57:
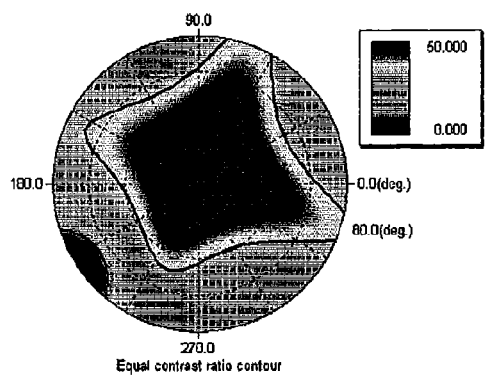
FIG. 57 are graphs each showing the isocontrast characteristic of Structure 1-3 of the liquid crystal display device according to the first embodiment of which (a) shows the case where the total Rth=70 nm is satisfied, (b) shows the case where the total Rth=130 nm is satisfied, (c) shows the case where the total Rth=140 nm is satisfied, and (d) shows the case where the total Rth=150 nm is satisfied.
Figure 57:
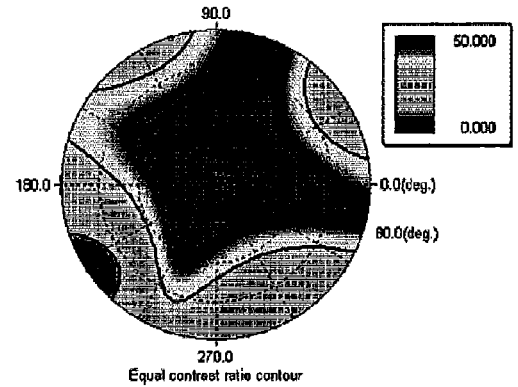
Figure 57:
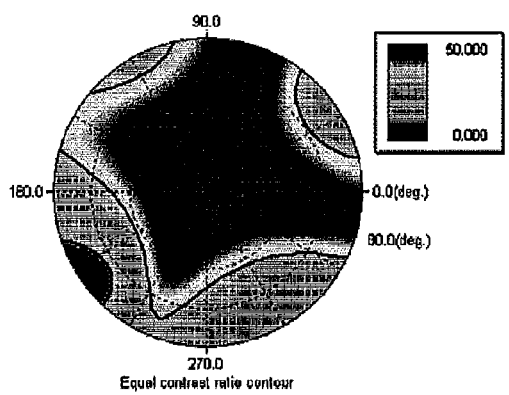
Figure 57:
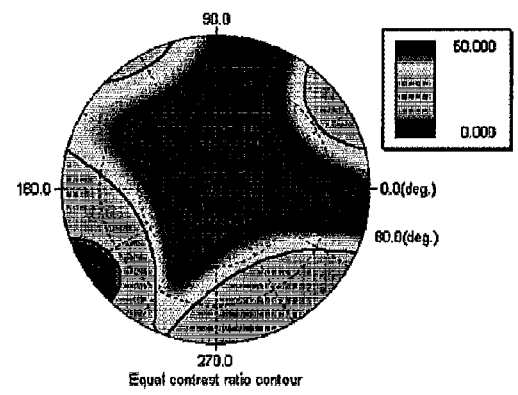
Figure 58:
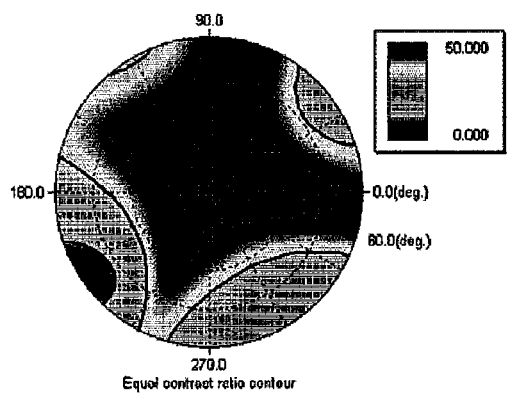
FIG. 58 are graphs each showing the isocontrast characteristic of Structure 1-3 of the liquid crystal display device according to the first embodiment of which (e) shows the case where the total Rth=160 nm is satisfied, (f) shows the case where the total Rth=170 nm is satisfied, (g) shows the case where the total Rth=190 nm is satisfied, and (h) shows the case where the total Rth=210 nm is satisfied.
Figure 58:
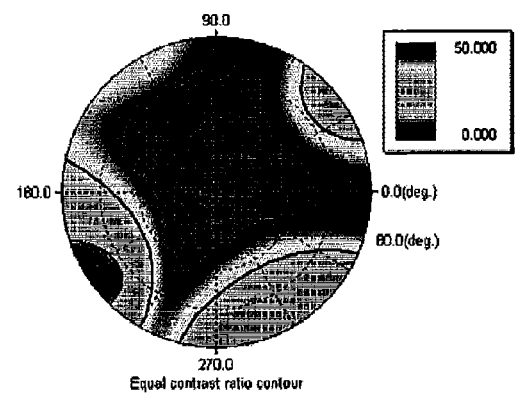
Figure 58:
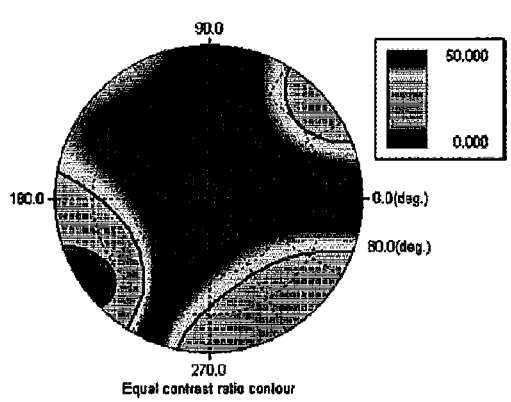
Figure 58:
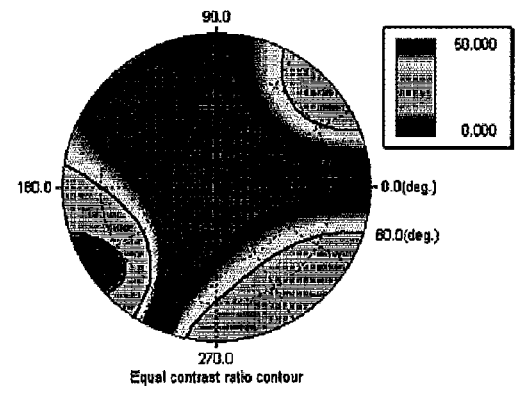
Figure 59:
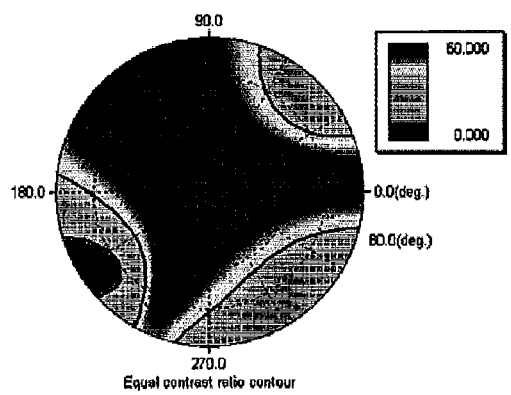
FIG. 59 are graphs each showing the isocontrast characteristic of Structure 1-3 of the liquid crystal display device according to the first embodiment of which (i) shows the case where the total Rth=230 nm is satisfied, (j) shows the case where the total Rth=250 nm is satisfied, (k) shows the case where the total Rth=270 nm is satisfied, and (l) shows the case where the total Rth=290 nm is satisfied.
Figure 59:
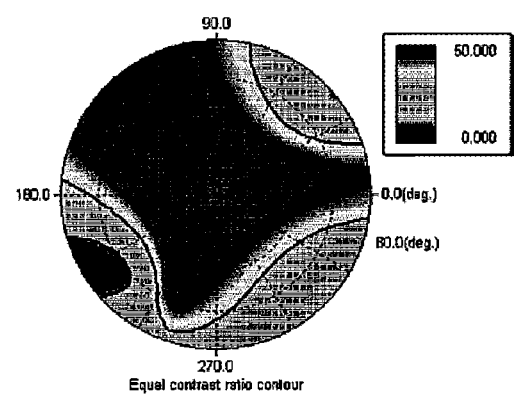
Figure 59:
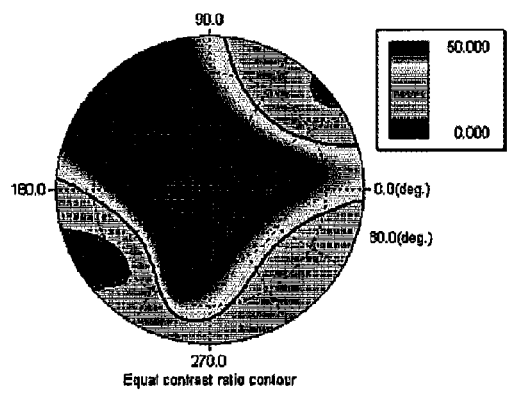
Figure 59:
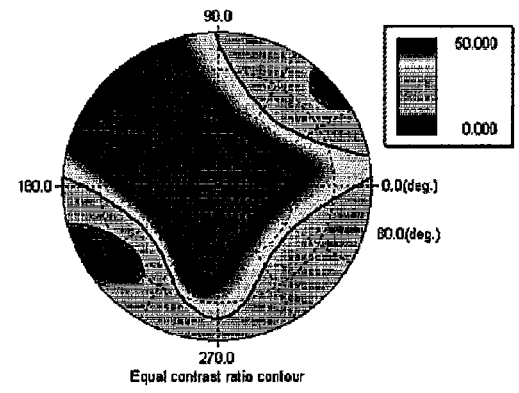
Figure 60:
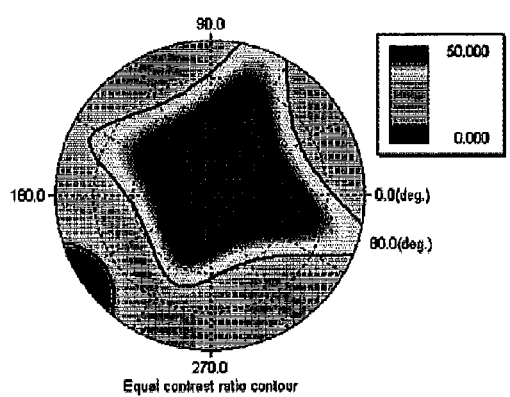
FIG. 60 are graphs each showing the isocontrast characteristic of Structure 1-4 of the liquid crystal display device according to the first embodiment of which (a) shows the case where the total Rth=70 nm is satisfied, (b) shows the case where the total Rth=130 nm is satisfied, (c) shows the case where the total Rth=140 nm is satisfied, and (d) shows the case where the total Rth=150 nm is satisfied.
Figure 60:
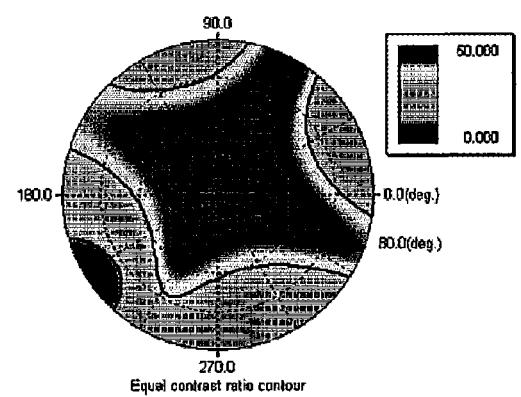
Figure 60:
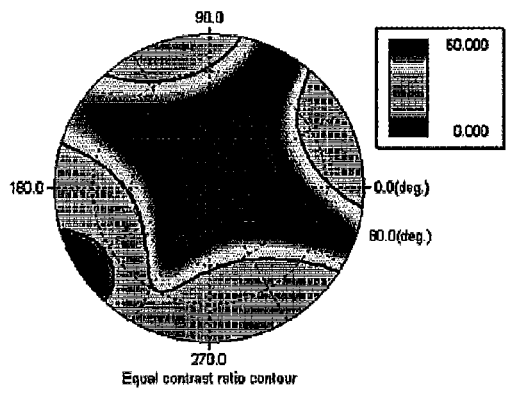
Figure 60:
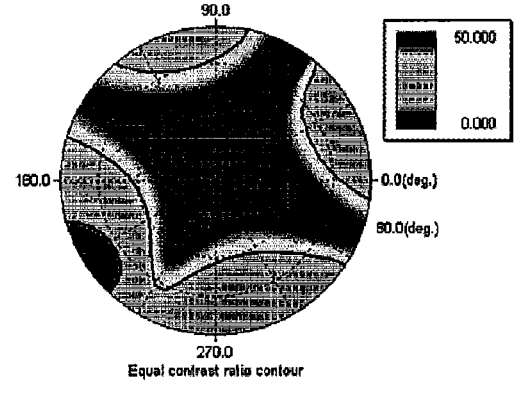
Figure 61:
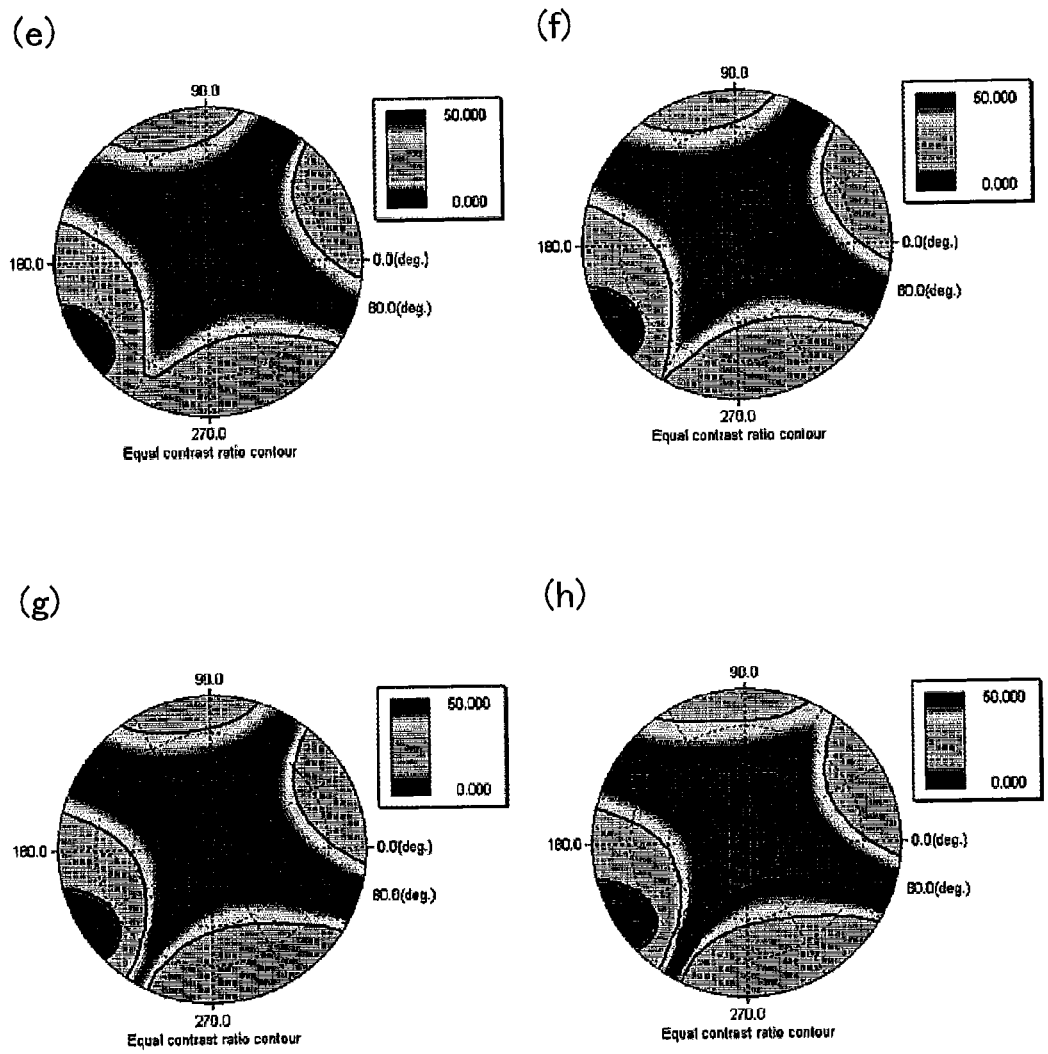
FIG. 61 are graphs each showing the isocontrast characteristic of Structure 1-4 of the liquid crystal display device according to the first embodiment of which (e) shows the case where the total Rth=160 nm is satisfied, (f) shows the case where the total Rth=170 nm is satisfied, (g) shows the case where the total Rth=190 nm is satisfied, and (h) shows the case where the total Rth=210 nm is satisfied.
Figure 62:
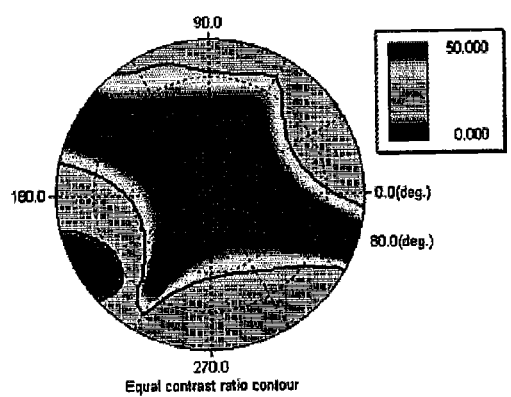
FIG. 62 are graphs each showing the isocontrast characteristic of Structure 1-4 of the liquid crystal display device according to the first embodiment of which (i) shows the case where the total Rth=230 nm is satisfied, (j) shows the case where the total Rth=250 nm is satisfied, (k) shows the case where the total Rth=270 nm is satisfied, and (l) shows the case where the total Rth=290 nm is satisfied.
Figure 62:
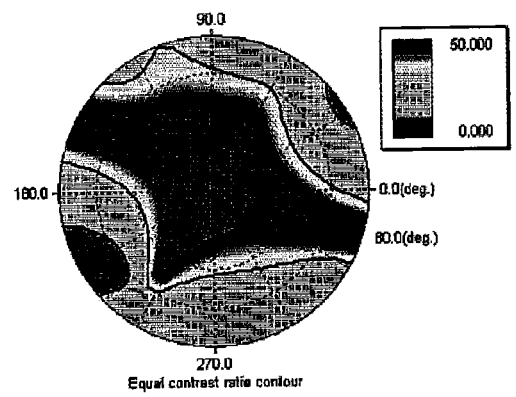
Figure 62:
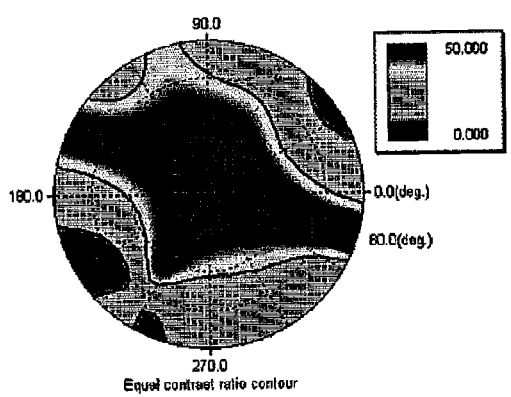
Figure 62:
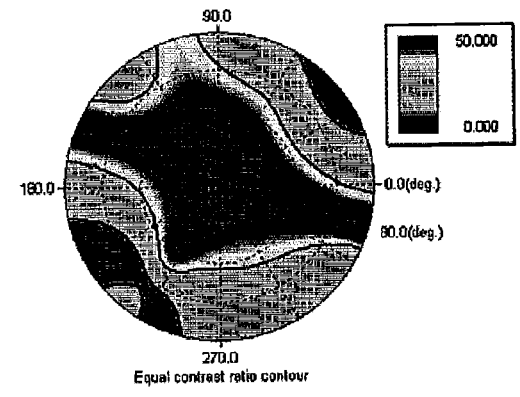
Figure 63:
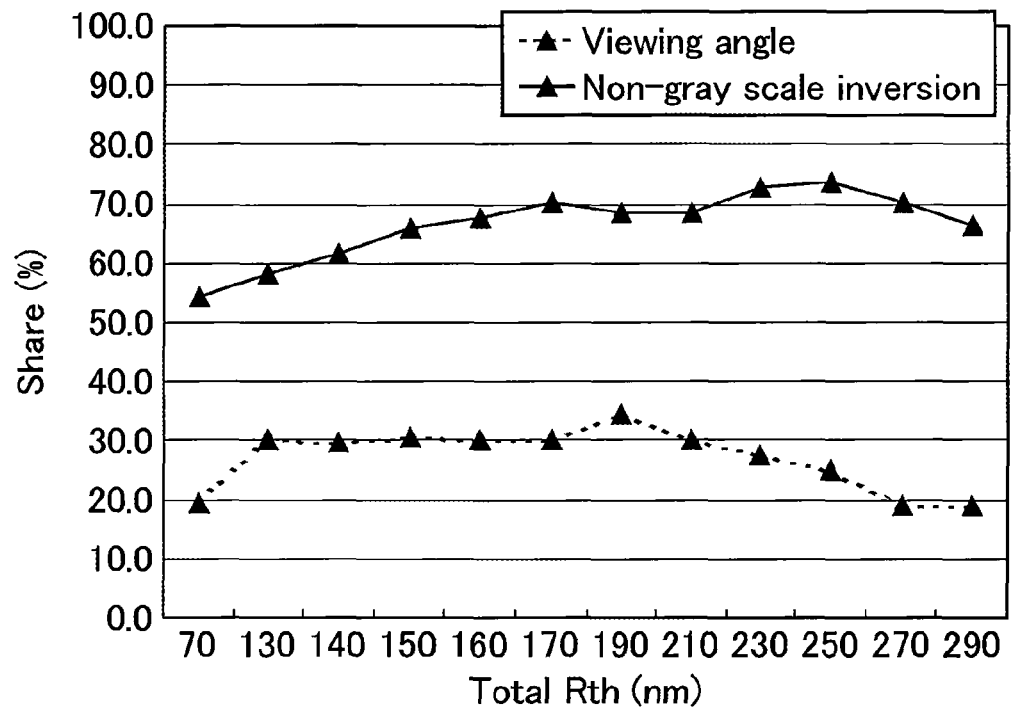
FIG. 63 is a graph showing the non-gray scale inversion share and a viewing angle share of Structure 1-1 of the liquid crystal display device according to the first embodiment.
Figure 64:
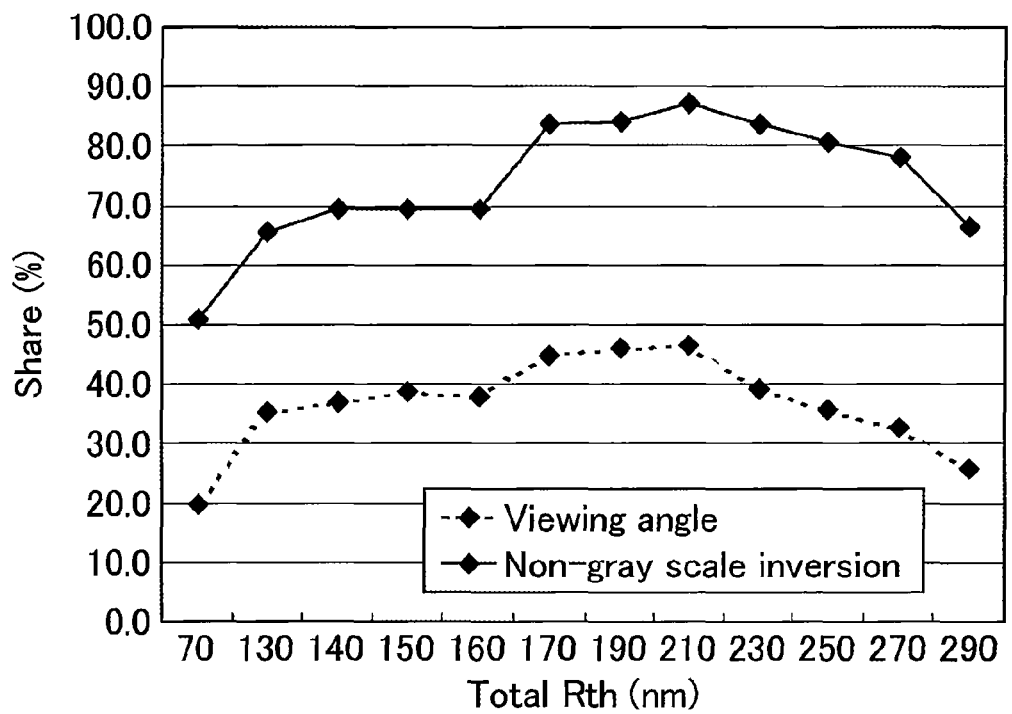
FIG. 64 is a graph showing the non-gray scale inversion share and the viewing angle share of Structure 1-2 of the liquid crystal display device according to the first embodiment.
Figure 65:
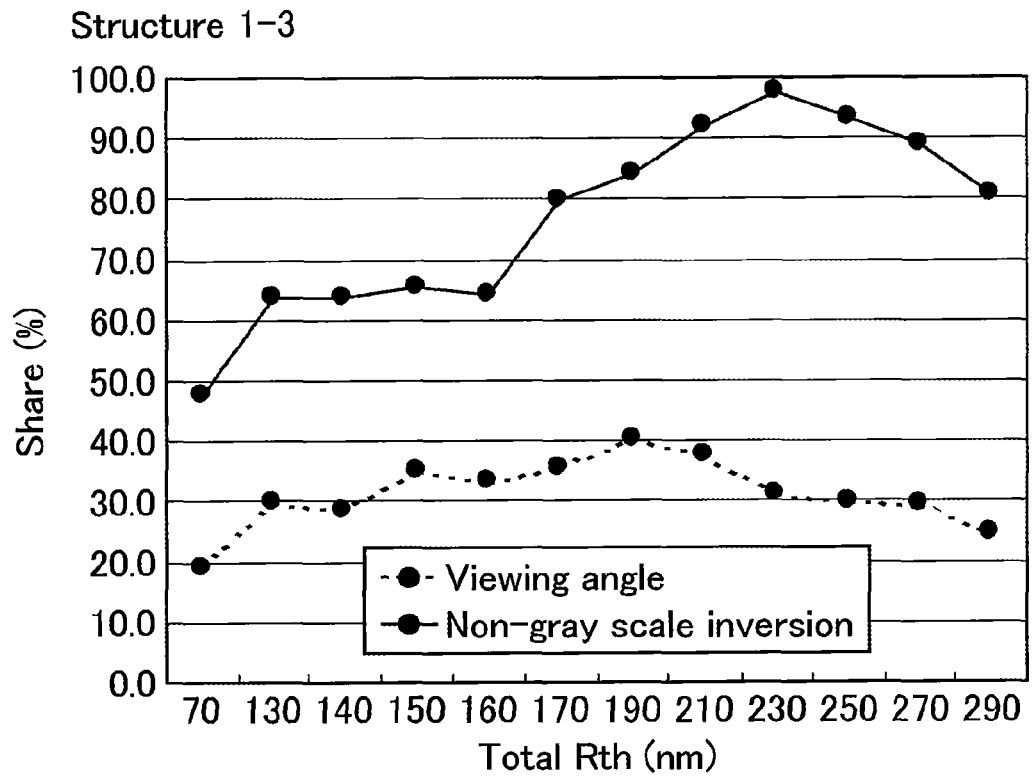
FIG. 65 is a graph showing the non-gray scale inversion share and the viewing angle share of Structure 1-3 of the liquid crystal display device according to the first embodiment.
Figure 66:
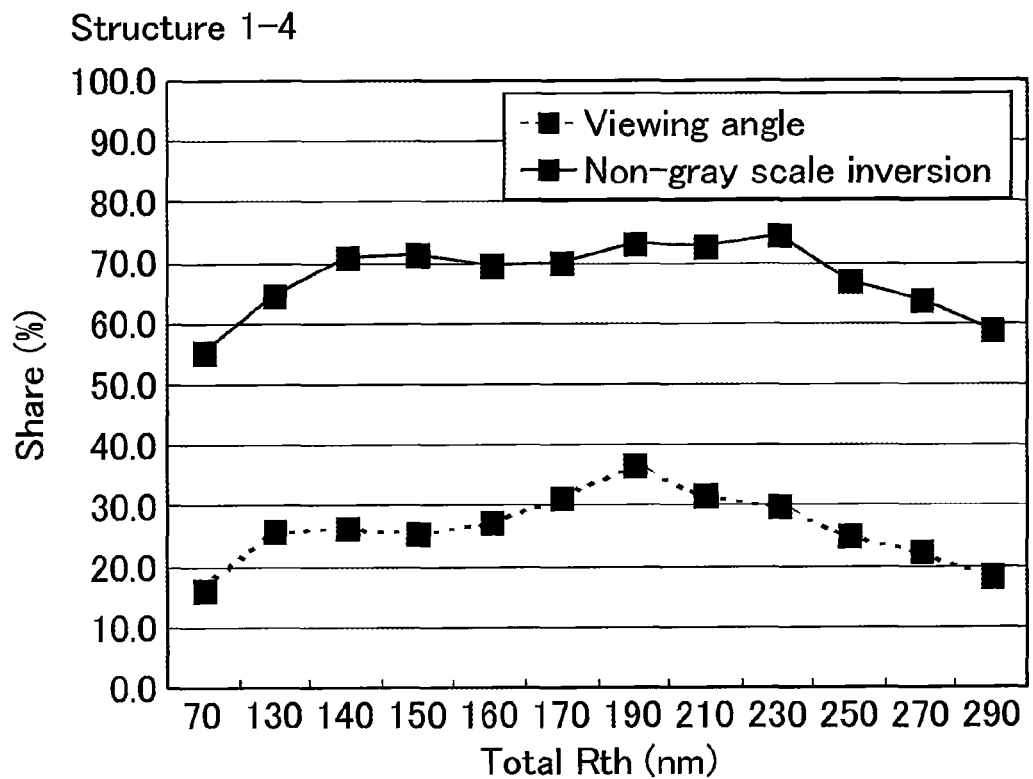
FIG. 66 is a graph showing the non-gray scale inversion share and the viewing angle share of Structure 1-4 of the liquid crystal display device according to the first embodiment.
Figure 67:
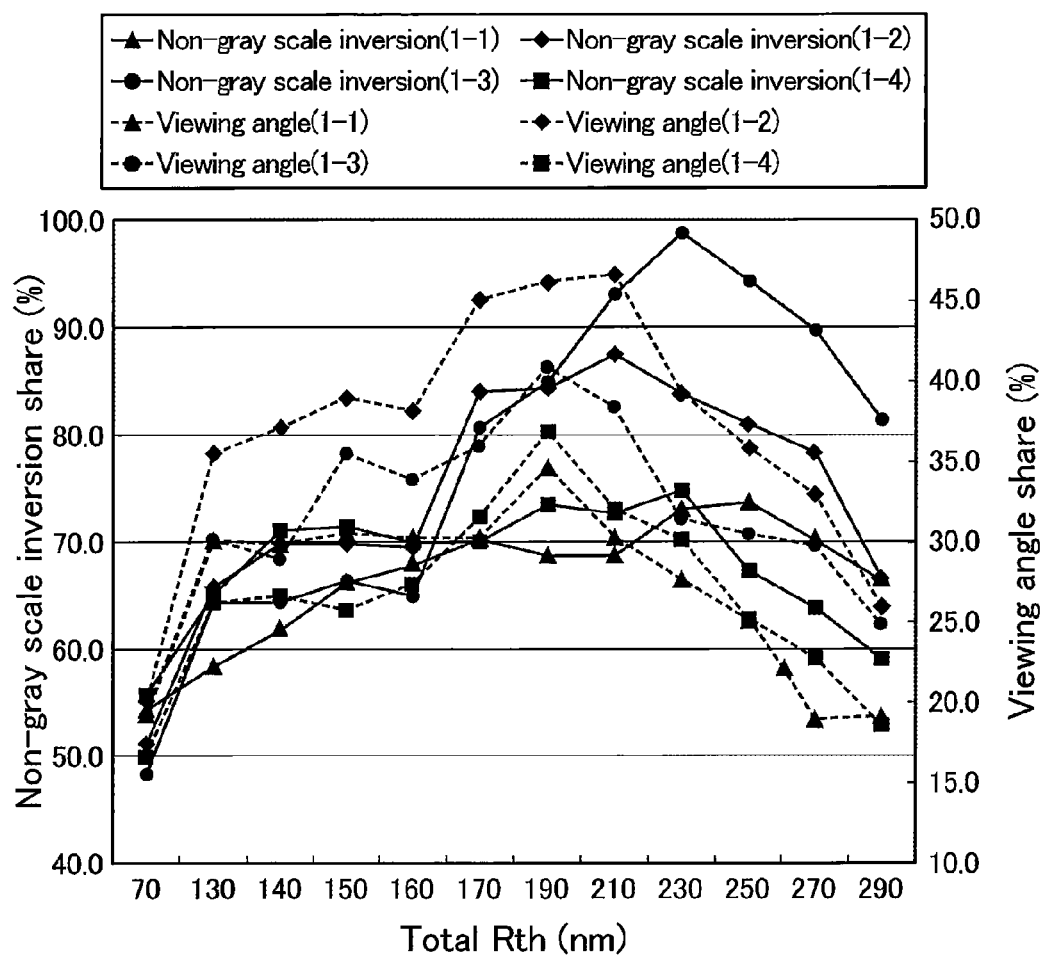
FIG. 67 is a graph showing the non-gray scale inversion share and the viewing angle share of each of Structures 1-1 to 1-4 of the liquid crystal display device according to the first embodiment.
Figure 68:
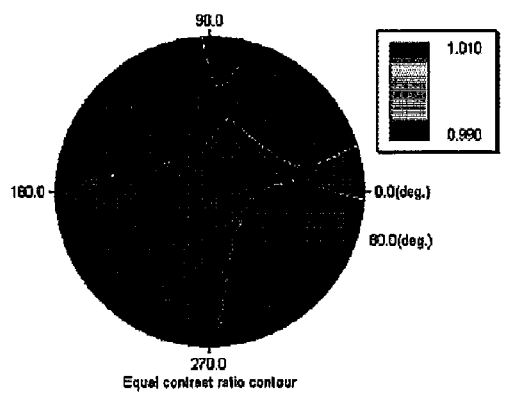
FIG. 68 are graphs each showing the gray scale inversion characteristic of Structure 2-1 of the liquid crystal display device according to the first embodiment of which (a) shows the case where the total Rth=70 nm is satisfied, (b) shows the case where the total Rth=130 nm is satisfied, (c) shows the case where the total Rth=140 nm is satisfied, and (d) shows the case where the total Rth=150 nm is satisfied.
Figure 68:
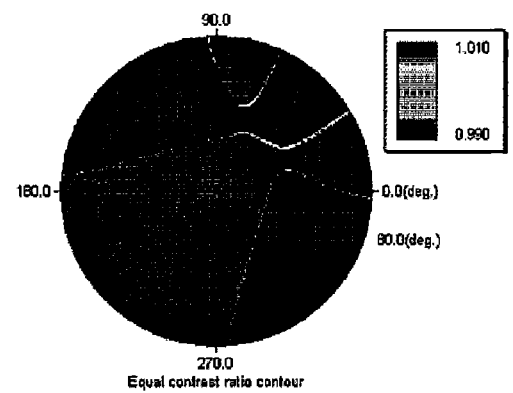
Figure 68:
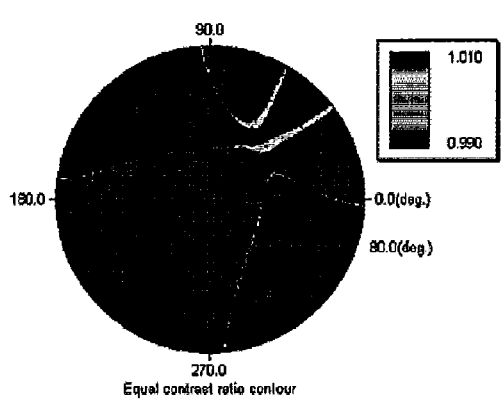
Figure 68:
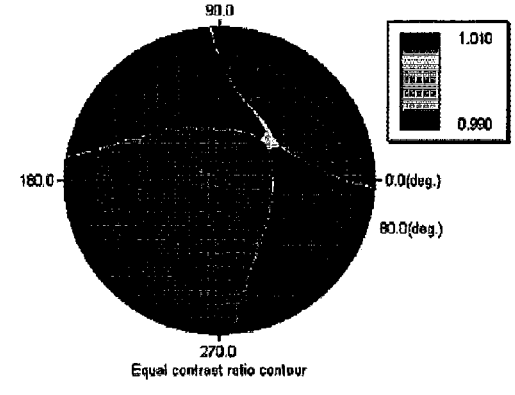
Figure 69:
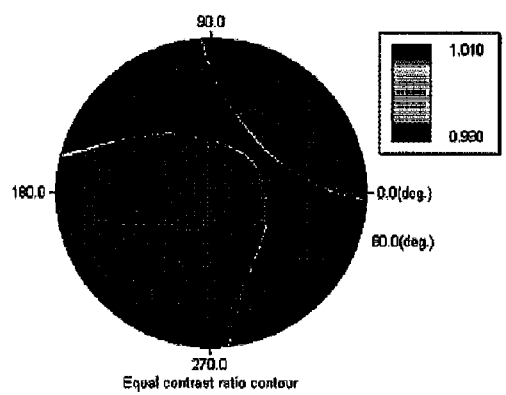
FIG. 69 are graphs each showing the gray scale inversion characteristic of Structure 2-1 of the liquid crystal display device according to the first embodiment of which (e) shows the case where the total Rth=160 nm is satisfied, (f) shows the case where the total Rth=170 nm is satisfied, (g) shows the case where the total Rth=190 nm is satisfied, and (h) shows the case where the total Rth=210 nm is satisfied.
Figure 69:
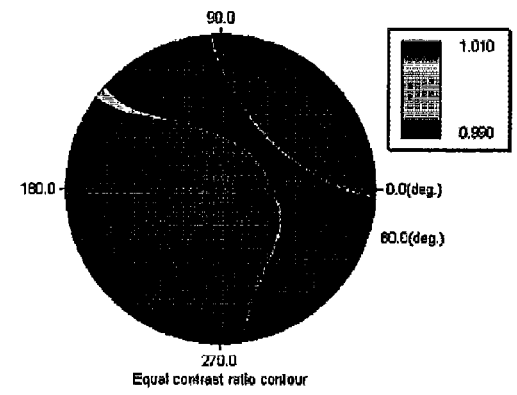
Figure 69:
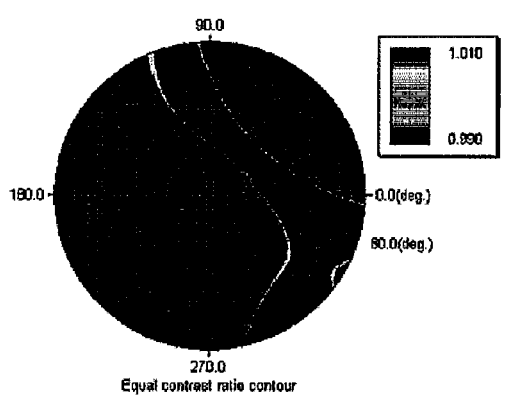
Figure 69:
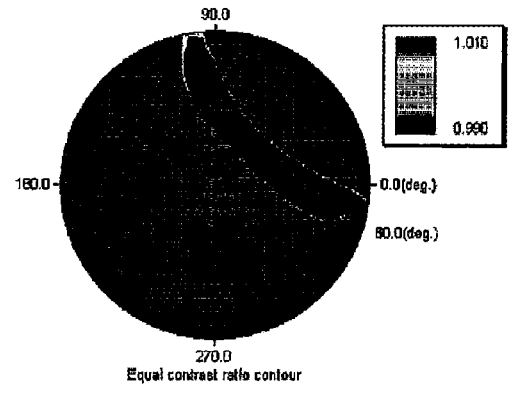
Figure 70:
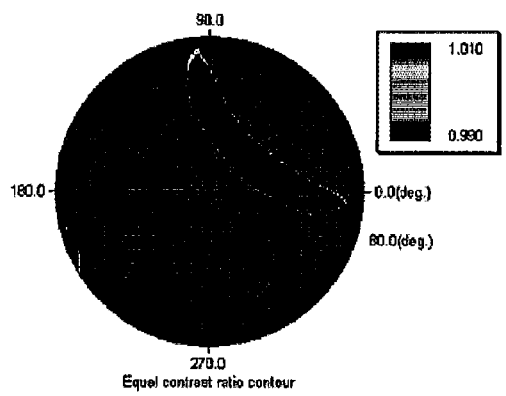
FIG. 70 are graphs each showing the gray scale inversion characteristic of Structure 2-1 of the liquid crystal display device according to the first embodiment of which (i) shows the case where the total Rth=230 nm is satisfied, (j) shows the case where the total Rth=250 nm is satisfied, (k) shows the case where the total Rth=270 nm is satisfied, and (l) shows the case where the total Rth=290 nm is satisfied.
Figure 70:
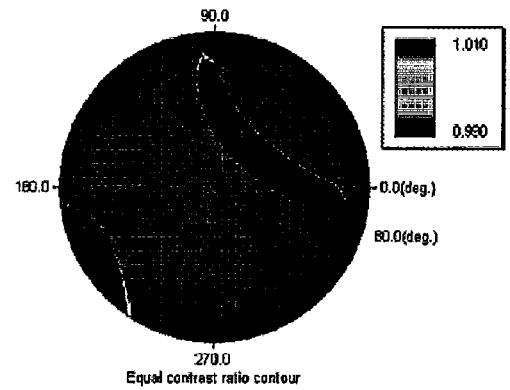
Figure 70:
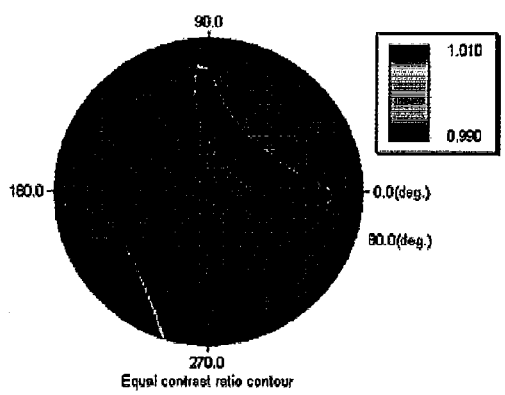
Figure 70:
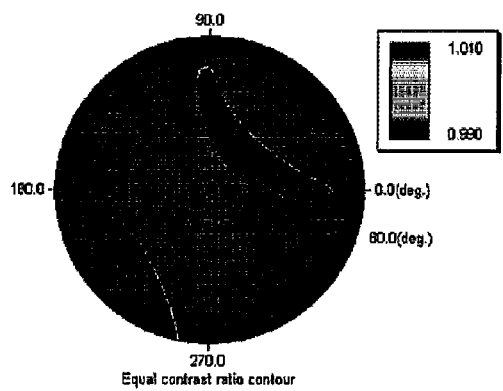
Figure 71:
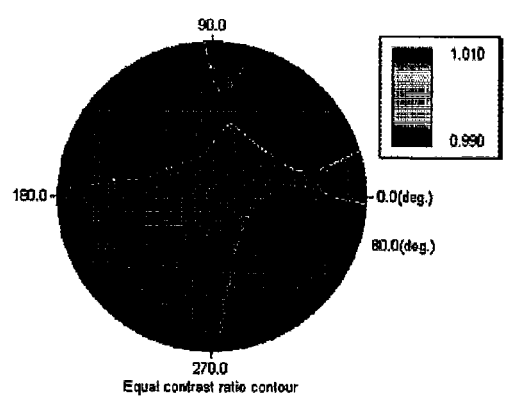
FIG. 71 are graphs each showing the gray scale inversion characteristic of Structure 2-2 of the liquid crystal display device according to the first embodiment of which (a) shows the case where the total Rth=70 nm is satisfied, (b) shows the case where the total Rth=130 nm is satisfied, (c) shows the case where the total Rth=140 nm is satisfied, and (d) shows the case where the total Rth=150 nm is satisfied.
Figure 71:
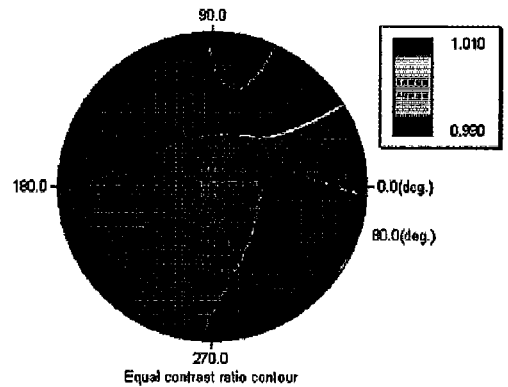
Figure 71:
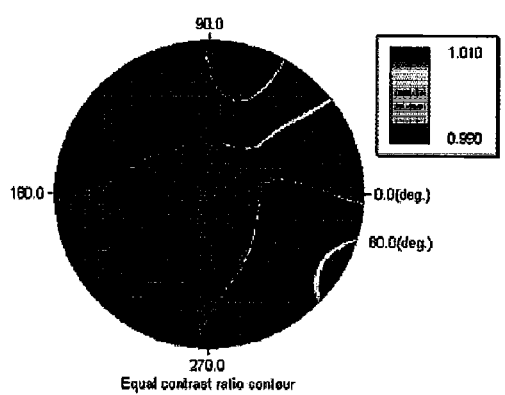
Figure 71:
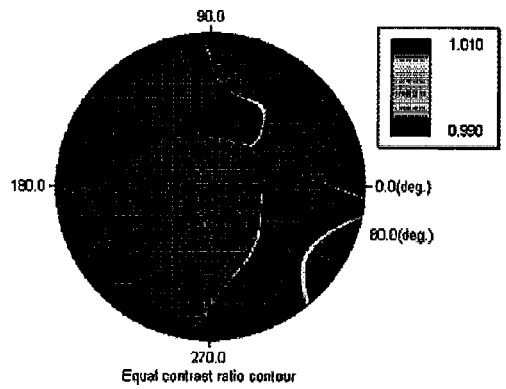
Figure 72:
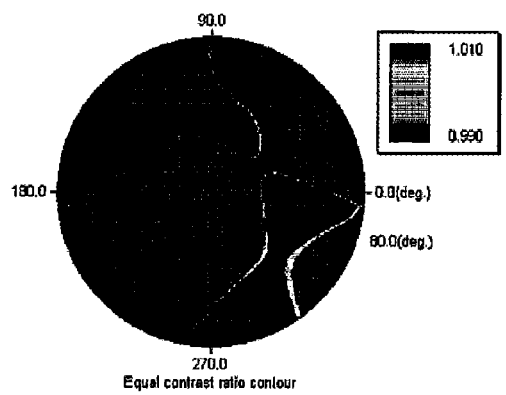
FIG. 72 are graphs each showing the gray scale inversion characteristic of Structure 2-2 of the liquid crystal display device according to the first embodiment of which (e) shows the case where the total Rth=160 nm is satisfied, (f) shows the case where the total Rth=170 nm is satisfied, (g) shows the case where the total Rth=190 nm is satisfied, and (h) shows the case where the total Rth=210 nm is satisfied.
Figure 72:
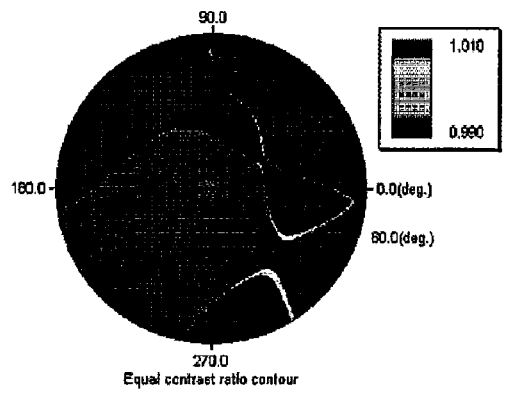
Figure 72:
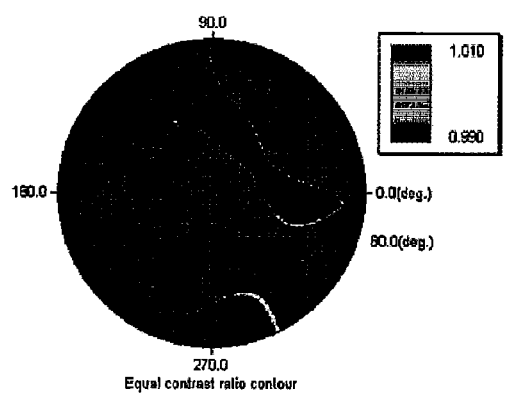
Figure 72:
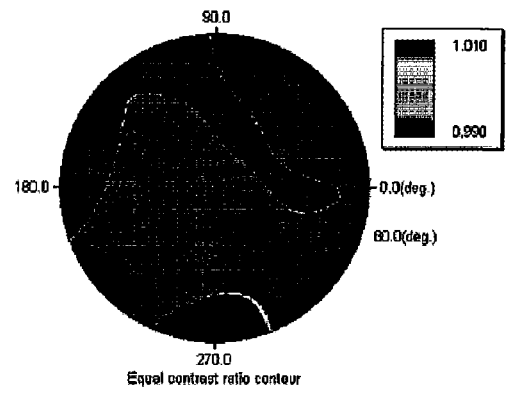
Figure 73:
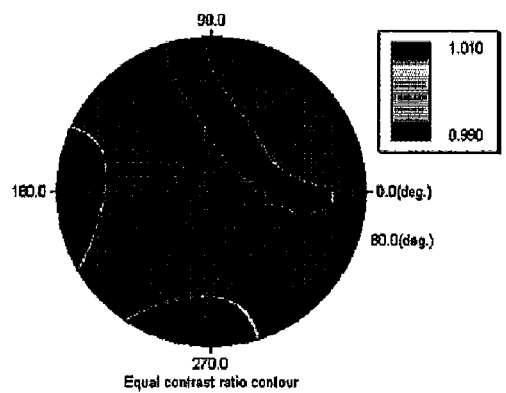
FIG. 73 are graphs each showing the gray scale inversion characteristic of Structure 2-2 of the liquid crystal display device according to the first embodiment of which (i) shows the case where the total Rth=230 nm is satisfied, (j) shows the case where the total Rth=250 nm is satisfied, (k) shows the case where the total Rth=270 nm is satisfied, and (l) shows the case where the total Rth=290 nm is satisfied.
Figure 73:
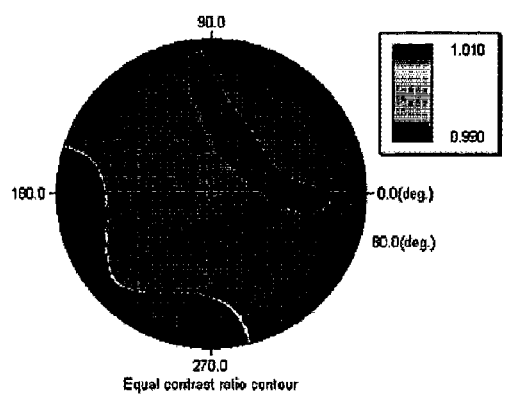
Figure 73:
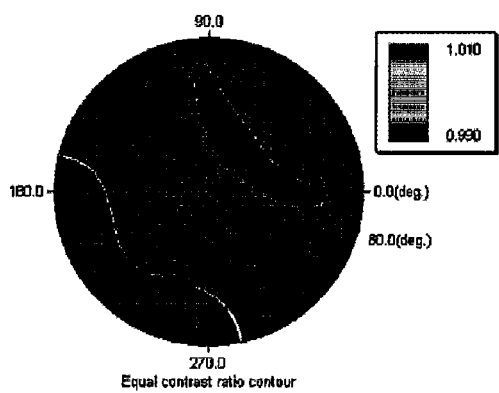
Figure 73:
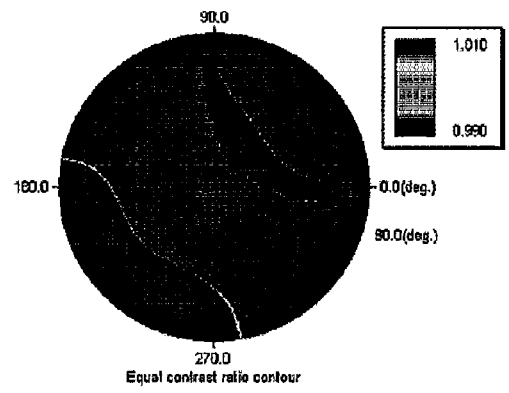
Figure 74:
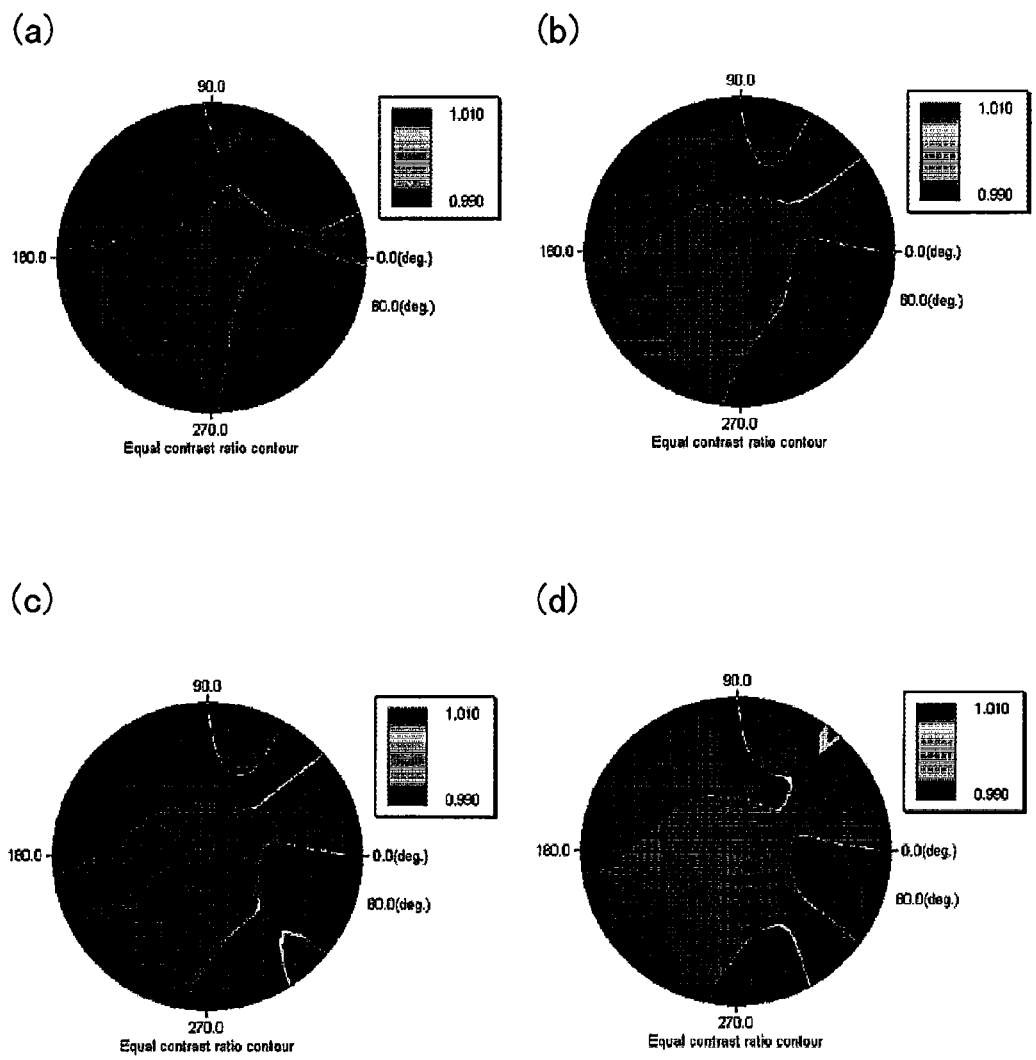
FIG. 74 are graphs each showing the gray scale inversion characteristic of Structure 2-3 of the liquid crystal display device according to the first embodiment of which (a) shows the case where the total Rth=70 nm is satisfied, (b) shows the case where the total Rth=130 nm is satisfied, (c) shows the case where the total Rth=140 nm is satisfied, and (d) shows the case where the total Rth=150 nm is satisfied.
Figure 75:
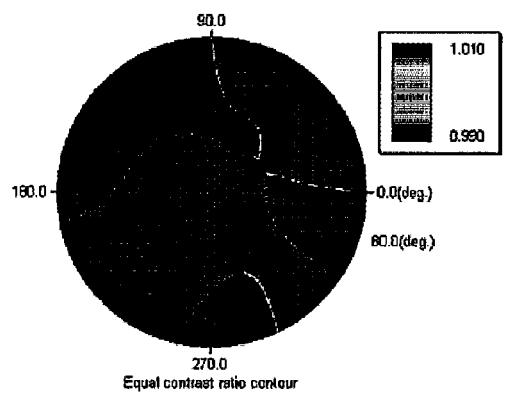
FIG. 75 are graphs each showing the gray scale inversion characteristic of Structure 2-3 of the liquid crystal display device according to the first embodiment of which (e) shows the case where the total Rth=160 nm is satisfied, (f) shows the case where the total Rth=170 nm is satisfied, (g) shows the case where the total Rth=190 nm is satisfied, and (h) shows the case where the total Rth=210 nm is satisfied.
Figure 75:
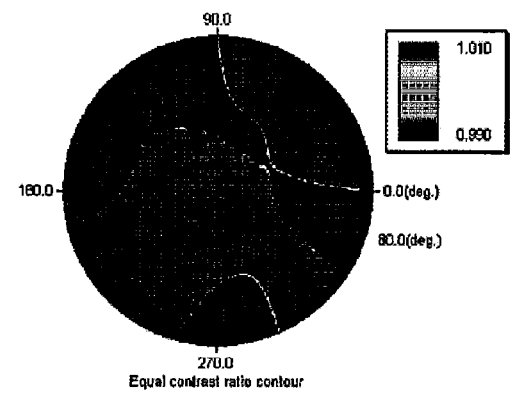
Figure 75:
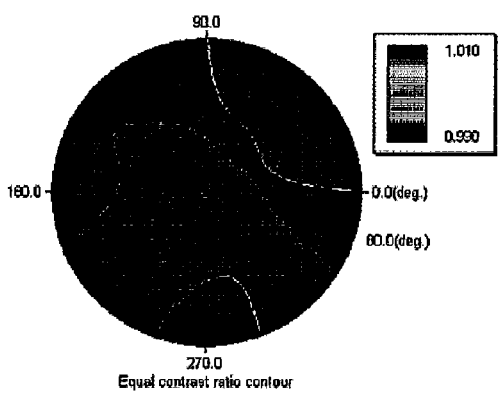
Figure 75:
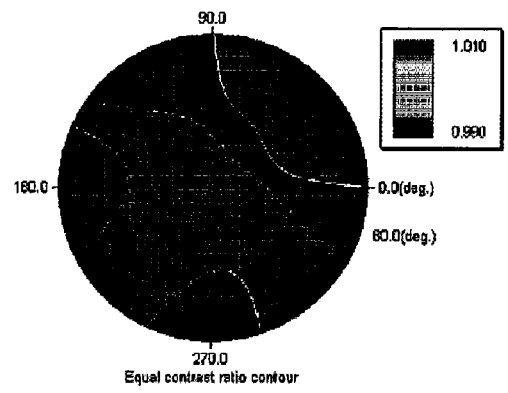
Figure 76:
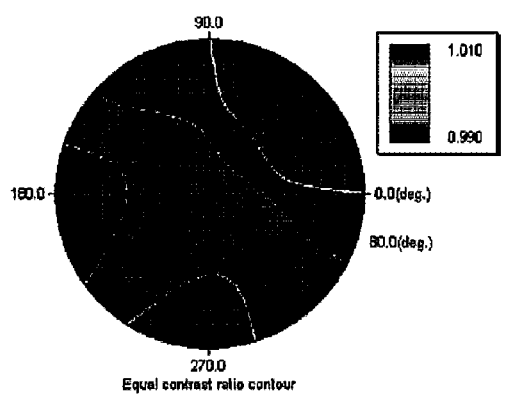
FIG. 76 are graphs each showing the gray scale inversion characteristic of Structure 2-3 of the liquid crystal display device according to the first embodiment of which (i) shows the case where the total Rth=230 nm is satisfied, (j) shows the case where the total Rth=250 nm is satisfied, (k) shows the case where the total Rth=270 nm is satisfied, and (l) shows the case where the total Rth=290 nm is satisfied.
Figure 76:
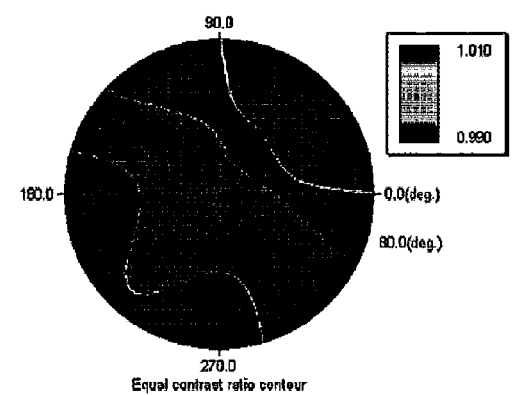
Figure 76:
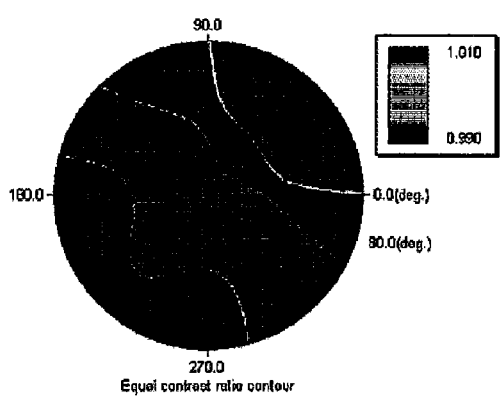
Figure 76:
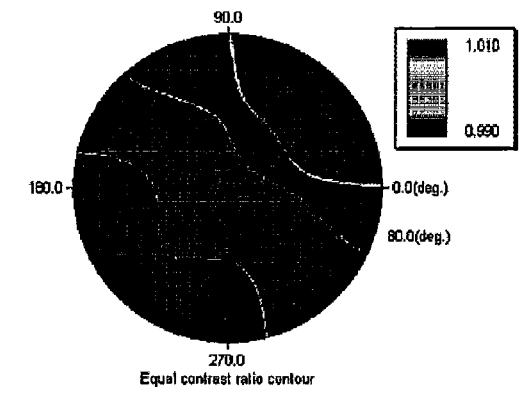
Figure 77:
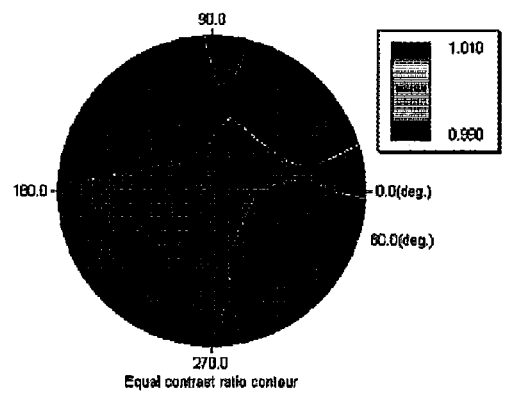
FIG. 77 are graphs each showing the gray scale inversion characteristic of Structure 2-4 of the liquid crystal display device according to the first embodiment of which (a) shows the case where the total Rth=70 nm is satisfied, (b) shows the case where the total Rth=130 nm is satisfied, (c) shows the case where the total Rth=140 nm is satisfied, and (d) shows the case where the total Rth=150 nm is satisfied.
Figure 77:
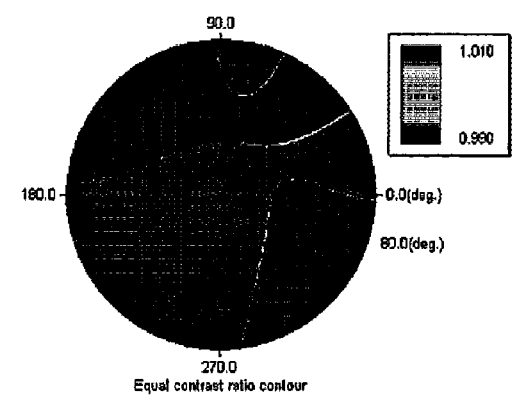
Figure 77:
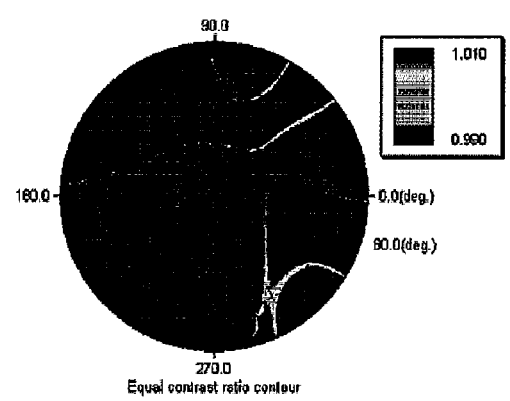
Figure 77:
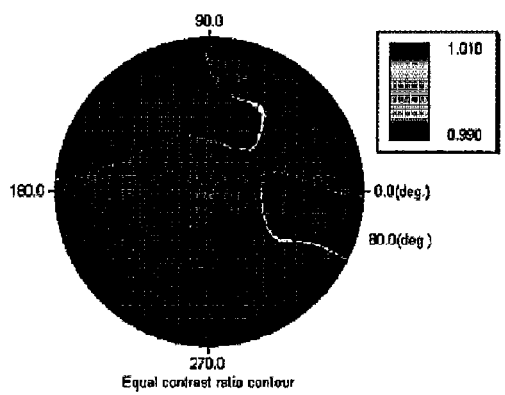
Figure 78:
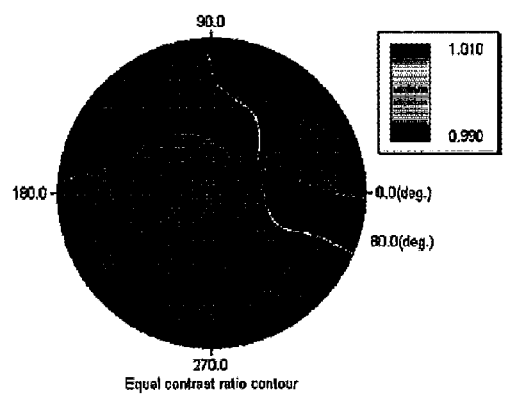
FIG. 78 are graphs each showing the gray scale inversion characteristic of Structure 2-4 of the liquid crystal display device according to the first embodiment of which (e) shows the case where the total Rth=160 nm is satisfied, (f) shows the case where the total Rth=170 nm is satisfied, (g) shows the case where the total Rth=190 nm is satisfied, and (h) shows the case where the total Rth=210 nm is satisfied.
Figure 78:
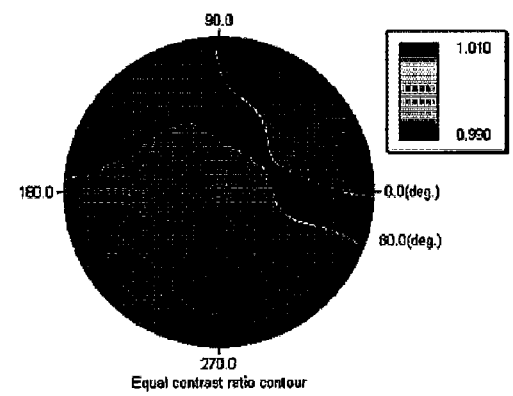
Figure 78:
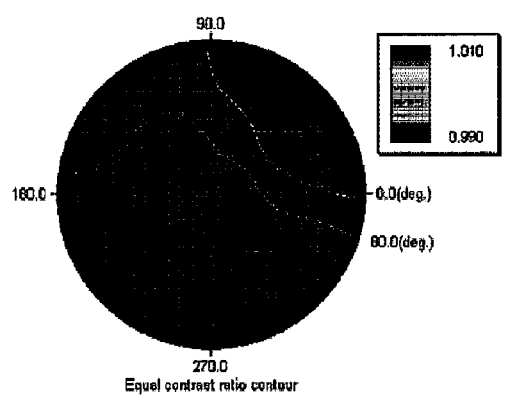
Figure 78:
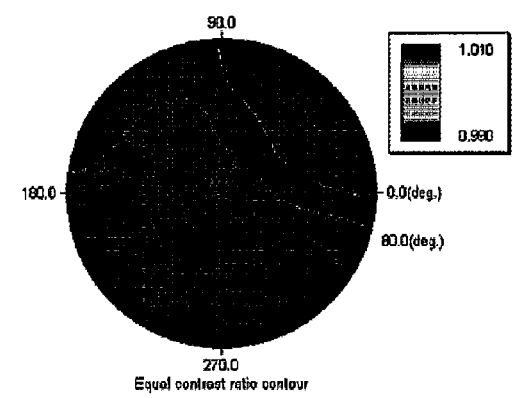
Figure 79:
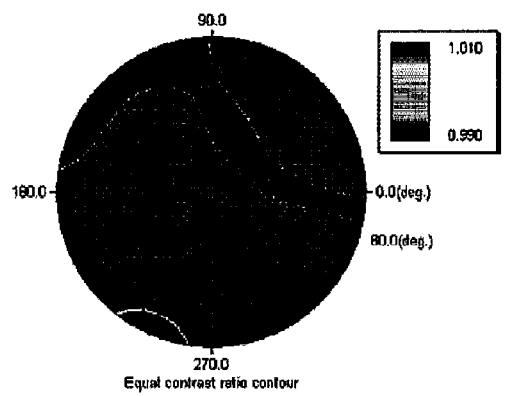
FIG. 79 are graphs each showing the gray scale inversion characteristic of Structure 2-4 of the liquid crystal display device according to the first embodiment of which (i) shows the case where the total Rth=230 nm is satisfied, (j) shows the case where the total Rth=250 nm is satisfied, (k) shows the case where the total Rth=270 nm is satisfied, and (l) shows the case where the total Rth=290 nm is satisfied.
Figure 79:
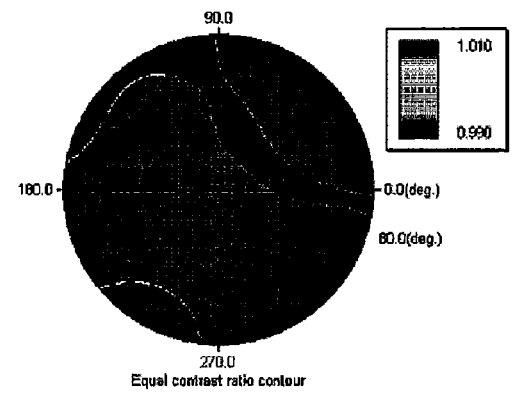
Figure 79:
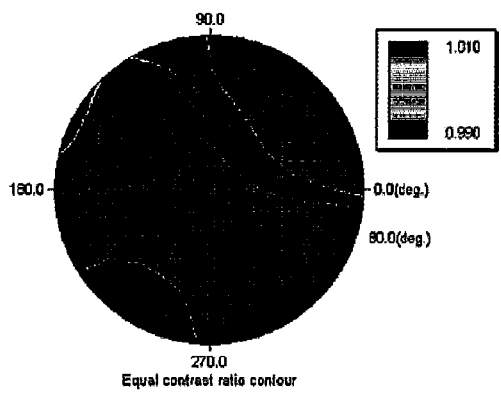
Figure 79:
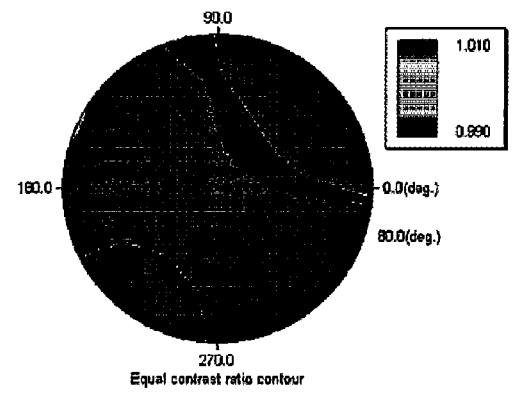
Figure 80:
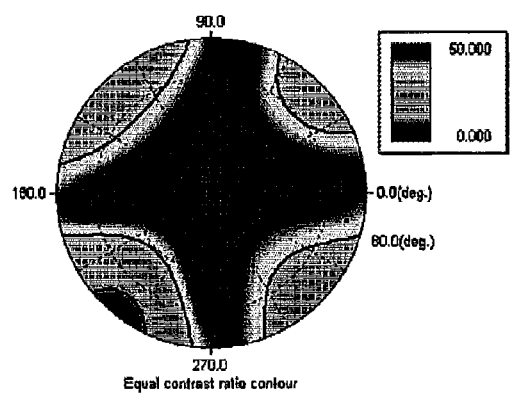
FIG. 80 are graphs each showing the isocontrast characteristic of Structure 2-1 of the liquid crystal display device according to the first embodiment of which (a) shows the case where the total Rth=70 nm is satisfied, (b) shows the case where the total Rth=130 nm is satisfied, (c) shows the case where the total Rth=140 nm is satisfied, and (d) shows the case where the total Rth=150 nm is satisfied.
Figure 80:
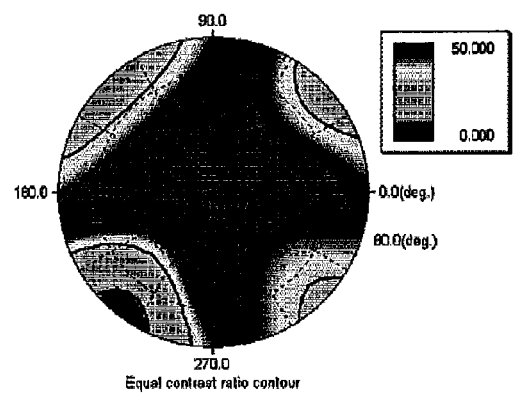
Figure 80:
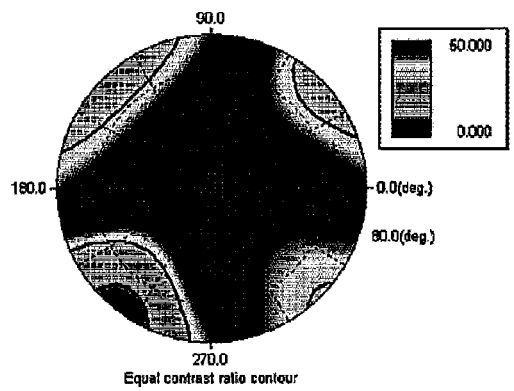
Figure 80:
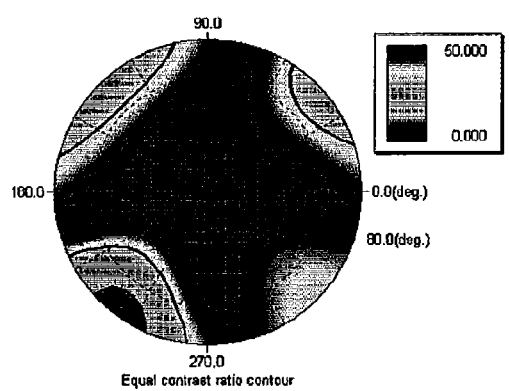
Figure 81:
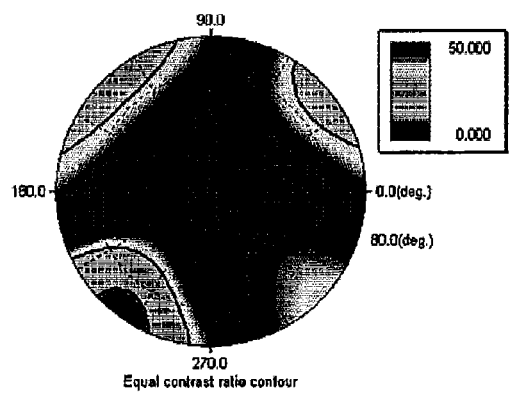
FIG. 81 are graphs each showing the isocontrast characteristic of Structure 2-1 of the liquid crystal display device according to the first embodiment of which (e) shows the case where the total Rth=160 nm is satisfied, (f) shows the case where the total Rth=170 nm is satisfied, (g) shows the case where the total Rth=190 nm is satisfied, and (h) shows the case where the total Rth=210 nm is satisfied.
Figure 81:
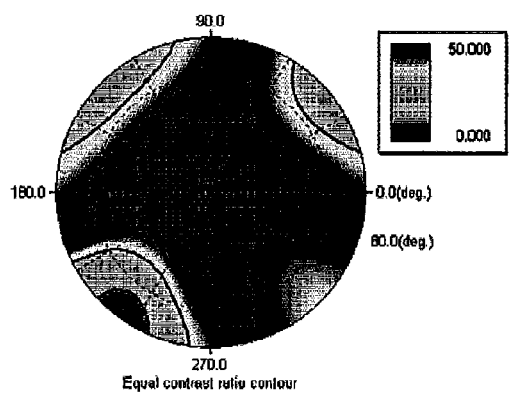
Figure 81:
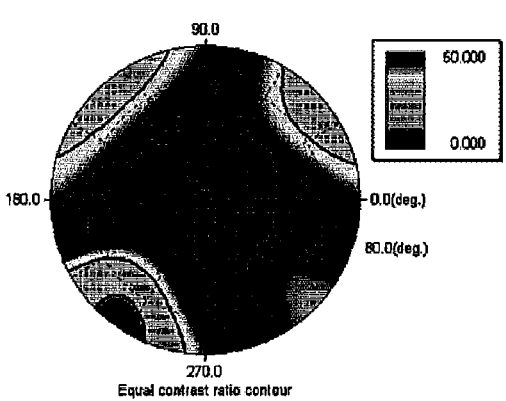
Figure 81:
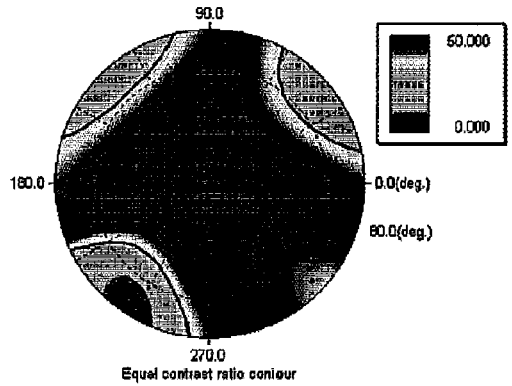
Figure 82:
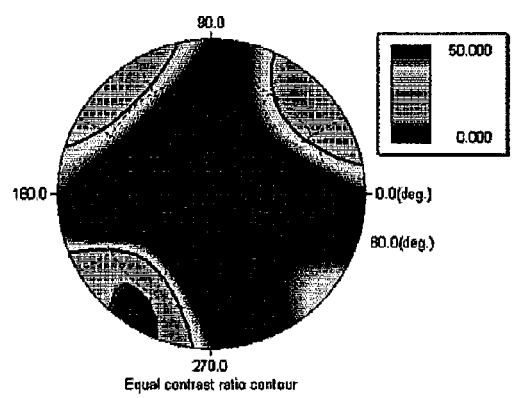
FIG. 82 are graphs each showing the isocontrast characteristic of Structure 2-1 of the liquid crystal display device according to the first embodiment of which (i) shows the case where the total Rth=230 nm is satisfied, (j) shows the case where the total Rth=250 nm is satisfied, (k) shows the case where the total Rth=270 nm is satisfied, and (l) shows the case where the total Rth=290 nm is satisfied.
Figure 82:
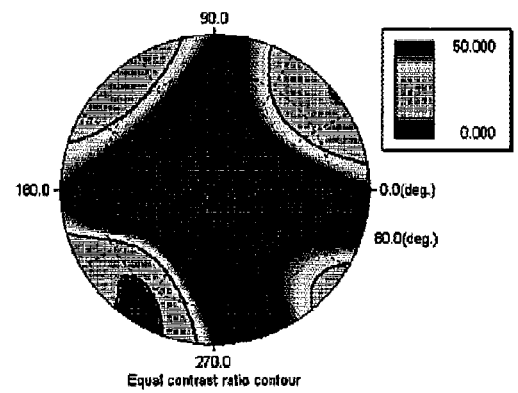
Figure 82:
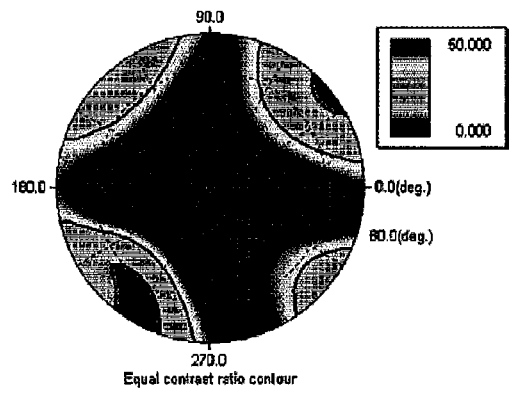
Figure 82:
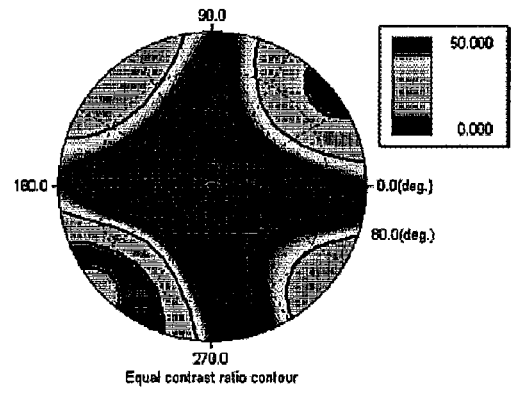
Figure 83:
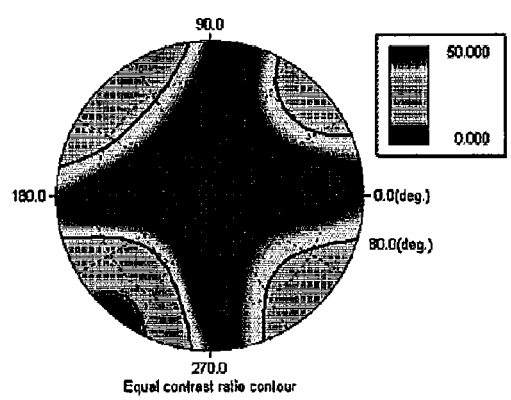
FIG. 83 are graphs each showing the isocontrast characteristic of Structure 2-2 of the liquid crystal display device according to the first embodiment of which (a) shows the case where the total Rth=70 nm is satisfied, (b) shows the case where the total Rth=130 nm is satisfied, (c) shows the case where the total Rth=140 nm is satisfied, and (d) shows the case where the total Rth=150 nm is satisfied.
Figure 83:
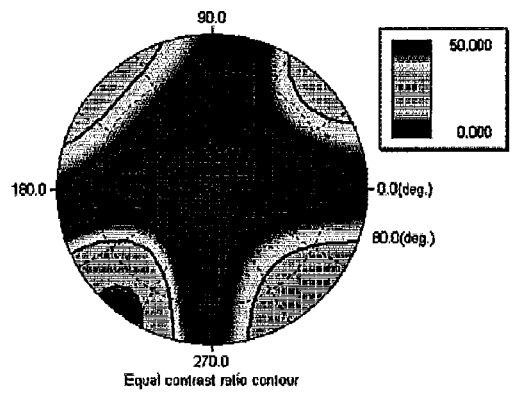
Figure 83:
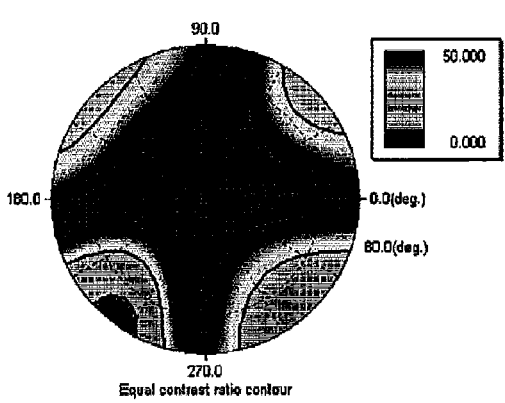
Figure 83:
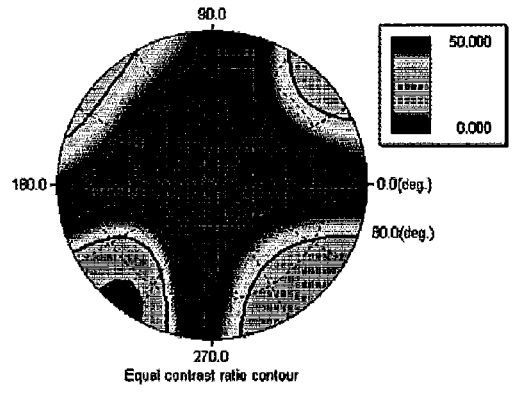
Figure 84:
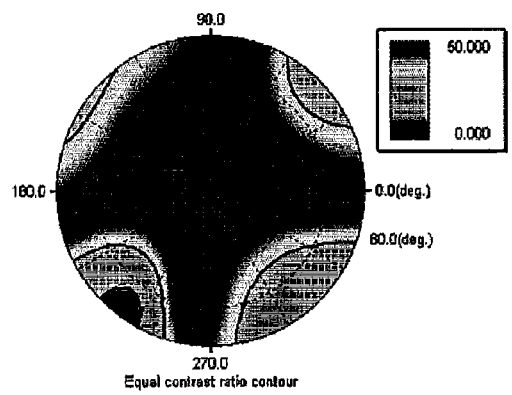
FIG. 84 are graphs each showing the isocontrast characteristic of Structure 2-2 of the liquid crystal display device according to the first embodiment of which (e) shows the case where the total Rth=160 nm is satisfied, (f) shows the case where the total Rth=170 nm is satisfied, (g) shows the case where the total Rth=190 nm is satisfied, and (h) shows the case where the total Rth=210 nm is satisfied.
Figure 84:
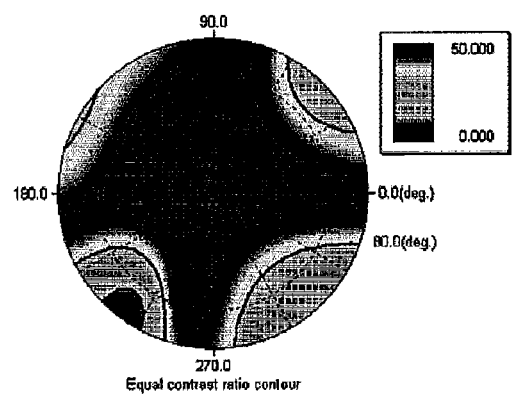
Figure 84:
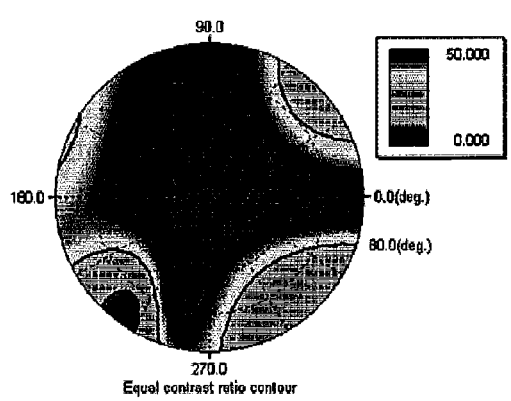
Figure 84:
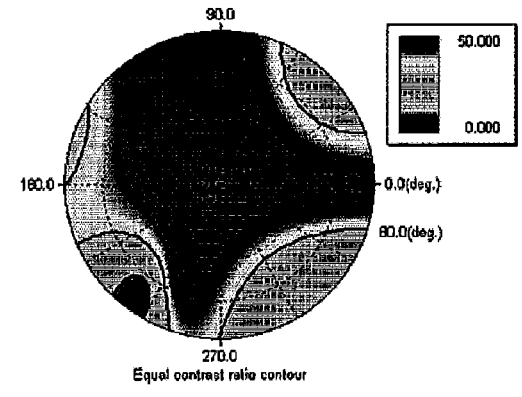
Figure 85:
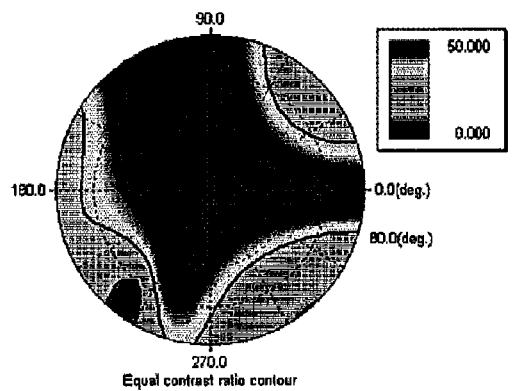
FIG. 85 are graphs each showing the isocontrast characteristic of Structure 2-2 of the liquid crystal display device according to the first embodiment of which (i) shows the case where the total Rth=230 nm is satisfied, (j) shows the case where the total Rth=250 nm is satisfied, (k) shows the case where the total Rth=270 nm is satisfied, and (l) shows the case where the total Rth=290 nm is satisfied.
Figure 85:
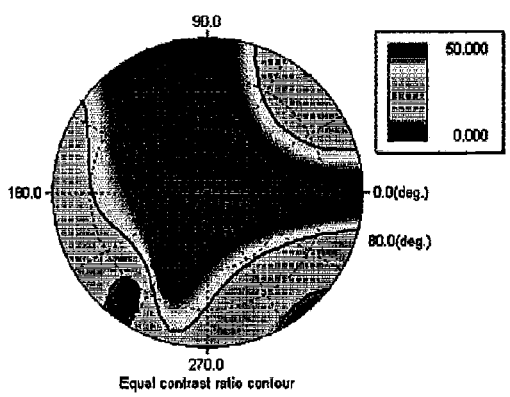
Figure 85:
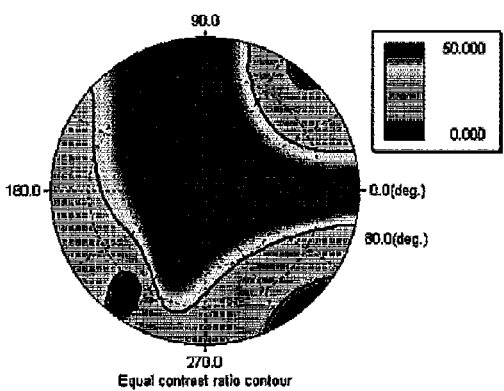
Figure 85:
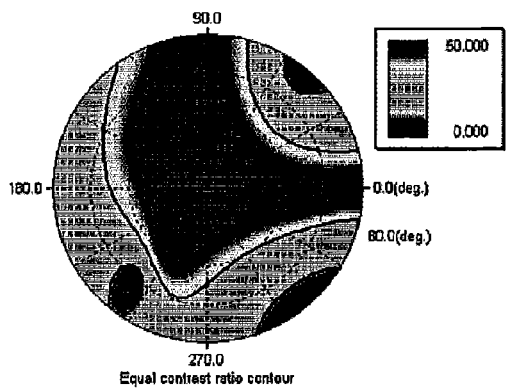
Figure 86:
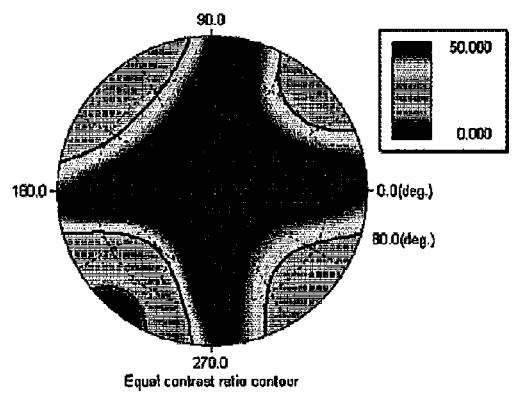
FIG. 86 are graphs each showing the isocontrast characteristic of Structure 2-3 of the liquid crystal display device according to the first embodiment of which (a) shows the case where the total Rth=70 nm is satisfied, (b) shows the case where the total Rth=130 nm is satisfied, (c) shows the case where the total Rth=140 nm is satisfied, and (d) shows the case where the total Rth=150 nm is satisfied.
Figure 86:
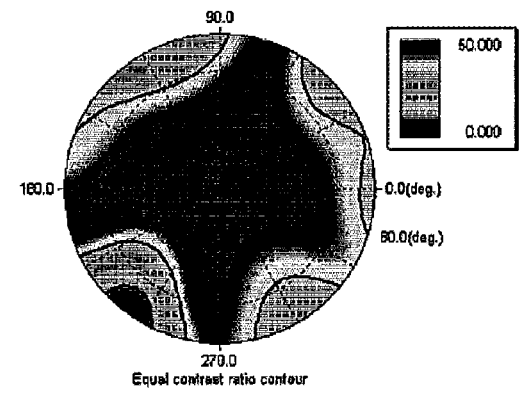
Figure 86:
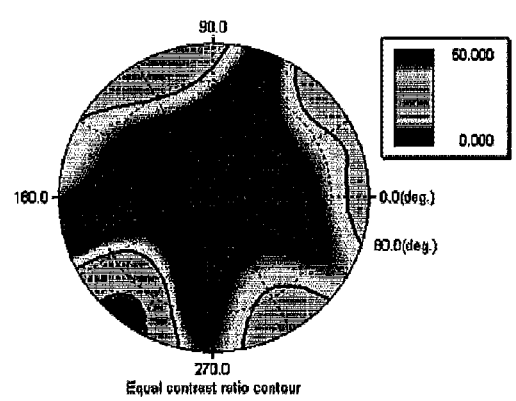
Figure 86:
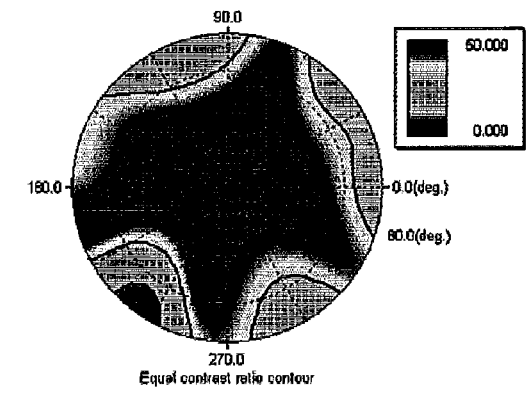
Figure 87:
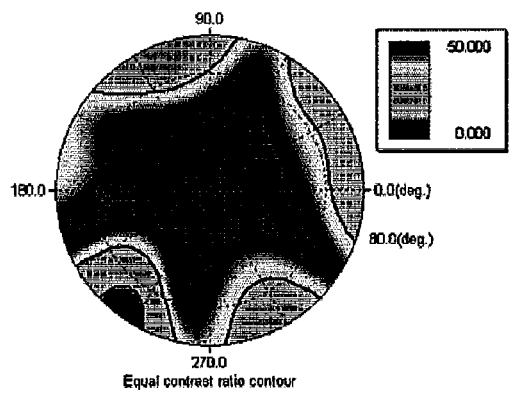
FIG. 87 are graphs each showing the isocontrast characteristic of Structure 2-3 of the liquid crystal display device according to the first embodiment of which (e) shows the case where the total Rth=160 nm is satisfied, (f) shows the case where the total Rth=170 nm is satisfied, (g) shows the case where the total Rth=190 nm is satisfied, and (h) shows the case where the total Rth=210 nm is satisfied.
Figure 87:
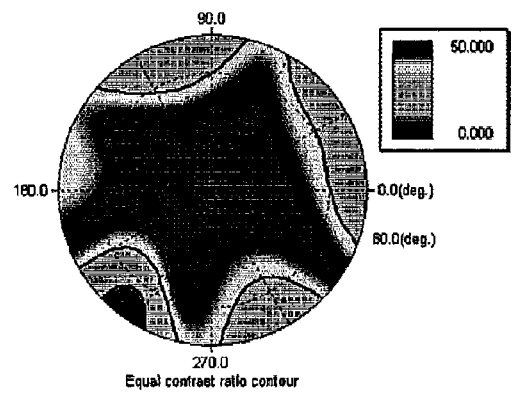
Figure 87:
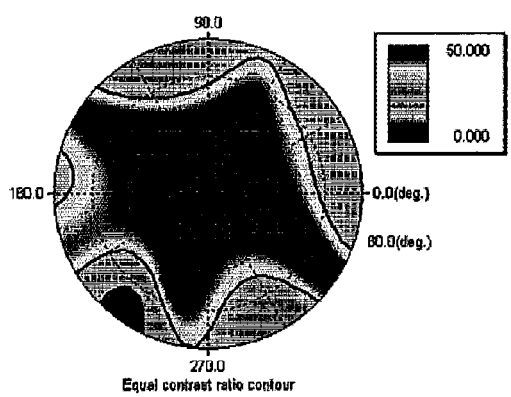
Figure 87:
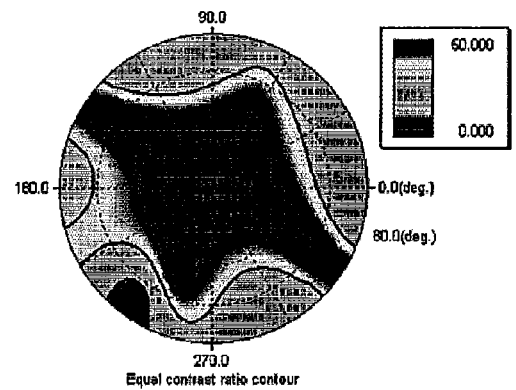
Figure 88:
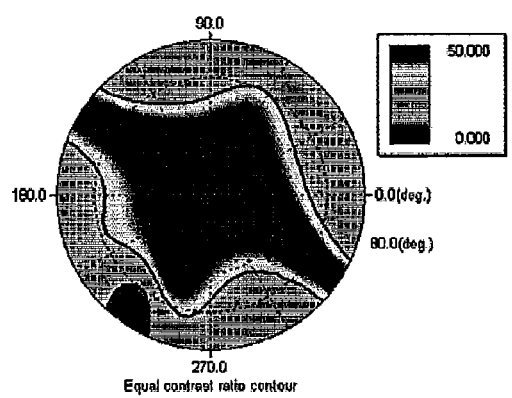
FIG. 88 are graphs each showing the isocontrast characteristic of Structure 2-3 of the liquid crystal display device according to the first embodiment of which (i) shows the case where the total Rth=230 nm is satisfied, (j) shows the case where the total Rth=250 nm is satisfied, (k) shows the case where the total Rth=270 nm is satisfied, and (l) shows the case where the total Rth=290 nm is satisfied.
Figure 88:
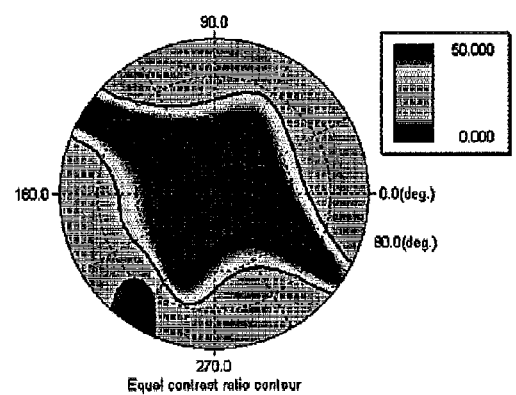
Figure 88:
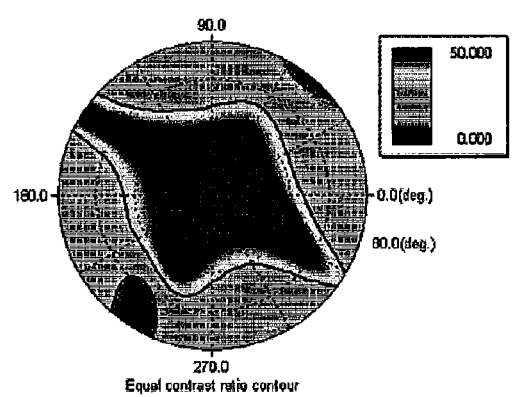
Figure 88:
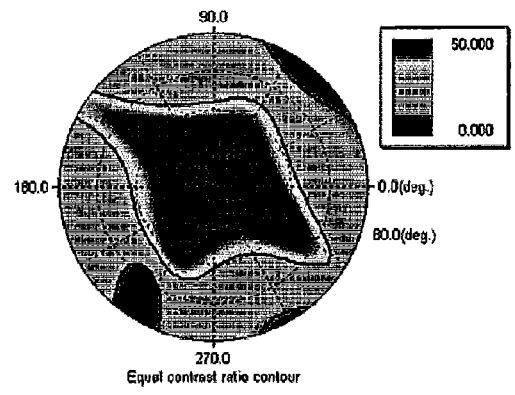
Figure 89:
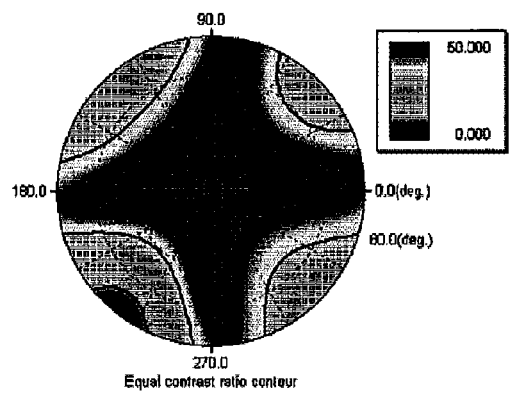
FIG. 89 are graphs each showing the isocontrast characteristic of Structure 2-4 of the liquid crystal display device according to the first embodiment of which (a) shows the case where the total Rth=70 nm is satisfied, (b) shows the case where the total Rth=130 nm is satisfied, (c) shows the case where the total Rth=140 nm is satisfied, and (d) shows the case where the total Rth=150 nm is satisfied.
Figure 89:
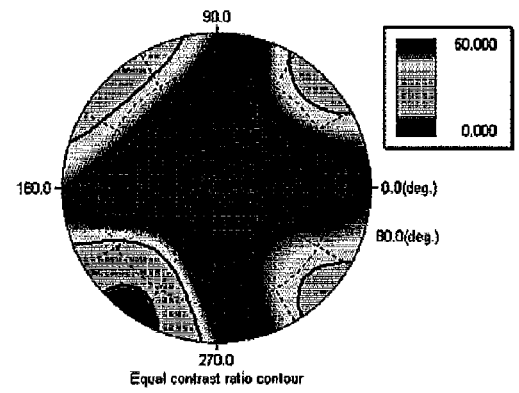
Figure 89:
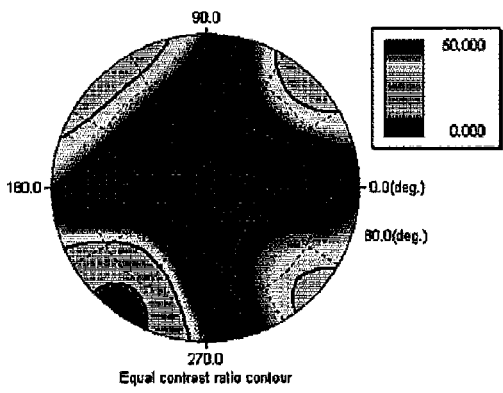
Figure 89:
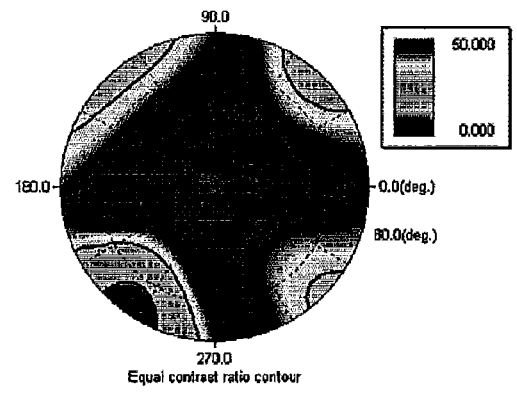
Figure 90:
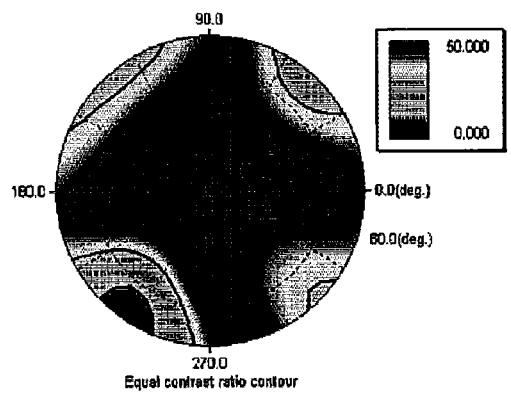
FIG. 90 are graphs each showing the isocontrast characteristic of Structure 2-4 of the liquid crystal display device according to the first embodiment of which (e) shows the case where the total Rth=160 nm is satisfied, (f) shows the case where the total Rth=170 nm is satisfied, (g) shows the case where the total Rth=190 nm is satisfied, and (h) shows the case where the total Rth=210 nm is satisfied.
Figure 90:
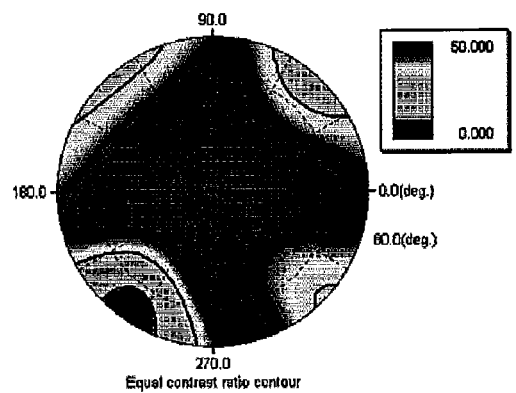
Figure 90:
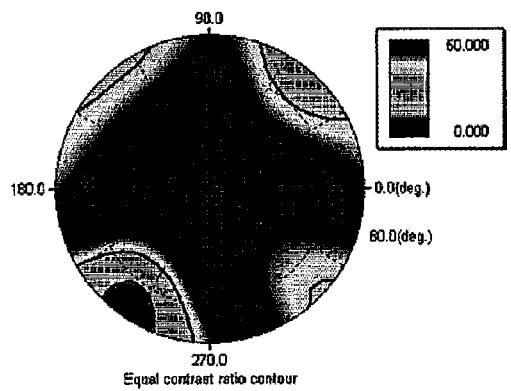
Figure 90:
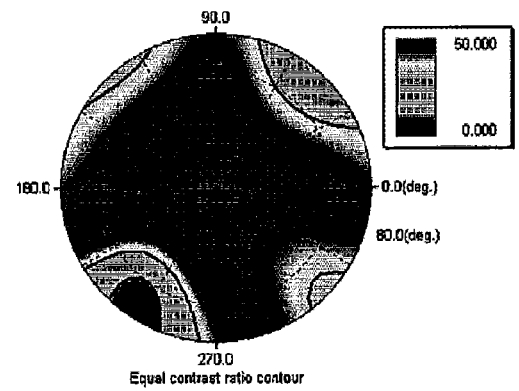
Figure 91:
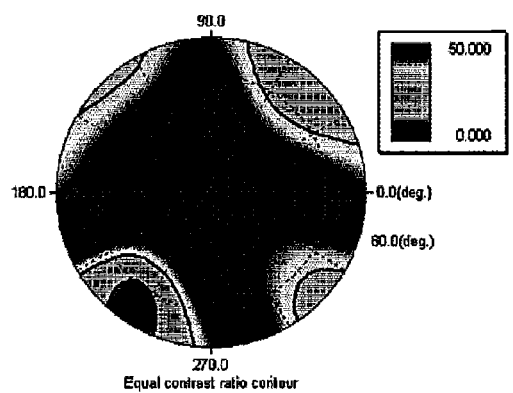
FIG. 91 are graphs each showing the isocontrast characteristic of Structure 2-4 of the liquid crystal display device according to the first embodiment of which (i) shows the case where the total Rth=230 nm is satisfied, (j) shows the case where the total Rth=250 nm is satisfied, (k) shows the case where the total Rth=270 nm is satisfied, and (l) shows the case where the total Rth=290 nm is satisfied.
Figure 91:
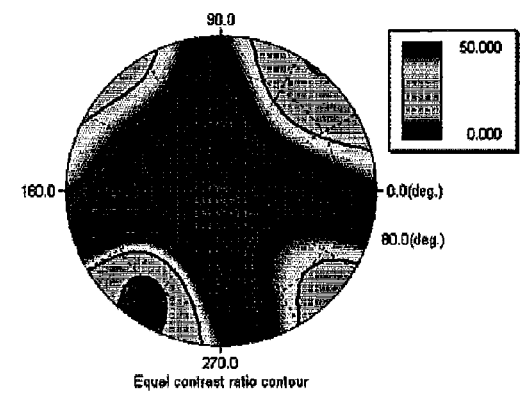
Figure 91:
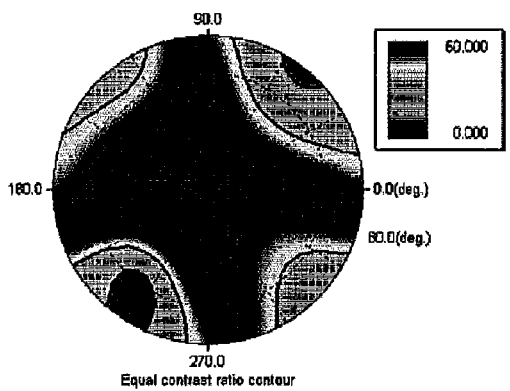
Figure 91:
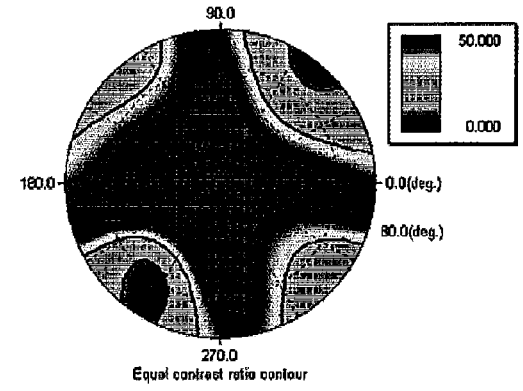
Figure 92:
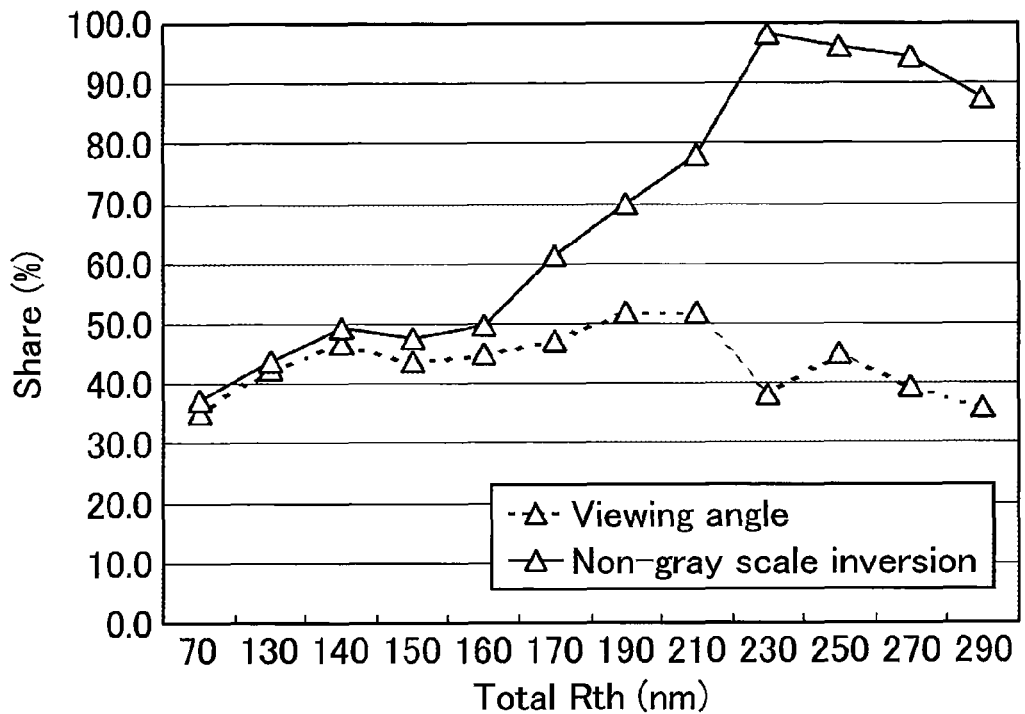
FIG. 92 is a graph showing the non-gray scale inversion share and the viewing angle share of Structure 2-1 of the liquid crystal display device according to the first embodiment.
Figure 93:
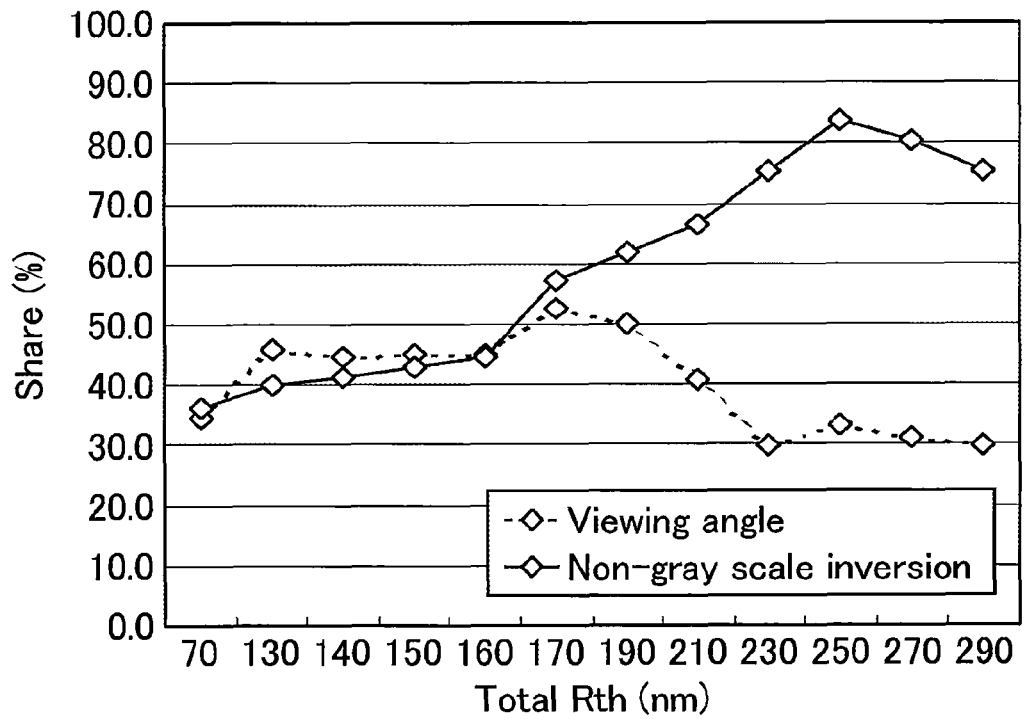
FIG. 93 is a graph showing the non-gray scale inversion share and the viewing angle share of Structure 2-2 of the liquid crystal display device according to the first embodiment.
Figure 94:
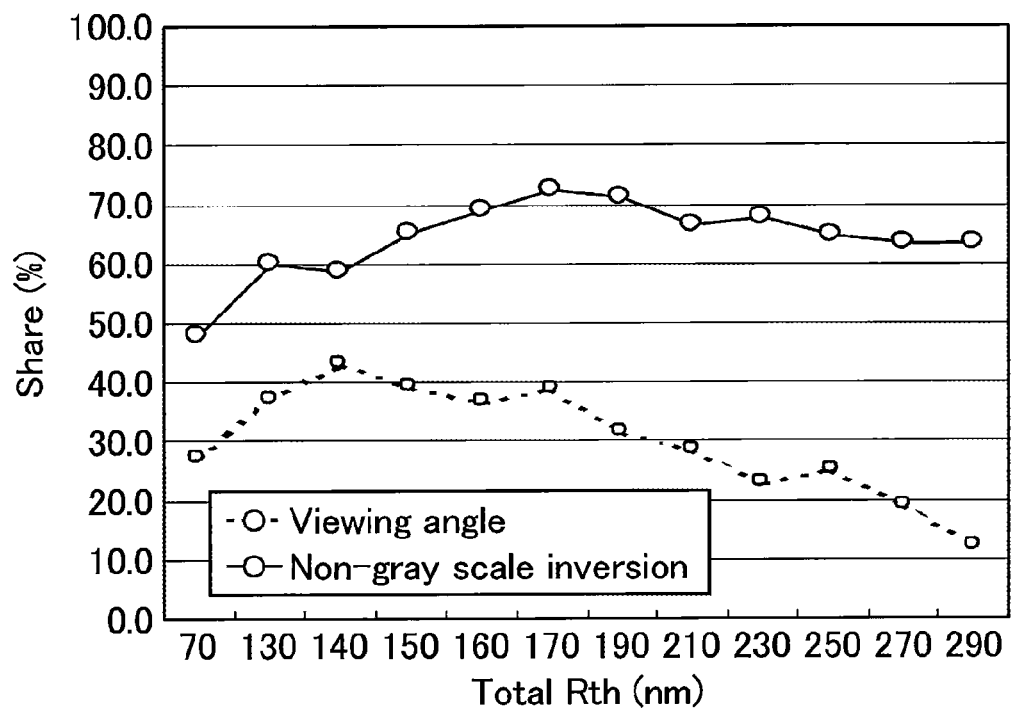
FIG. 94 is a graph showing the non-gray scale inversion share and the viewing angle share of Structure 2-3 of the liquid crystal display device according to the first embodiment.
Figure 95:
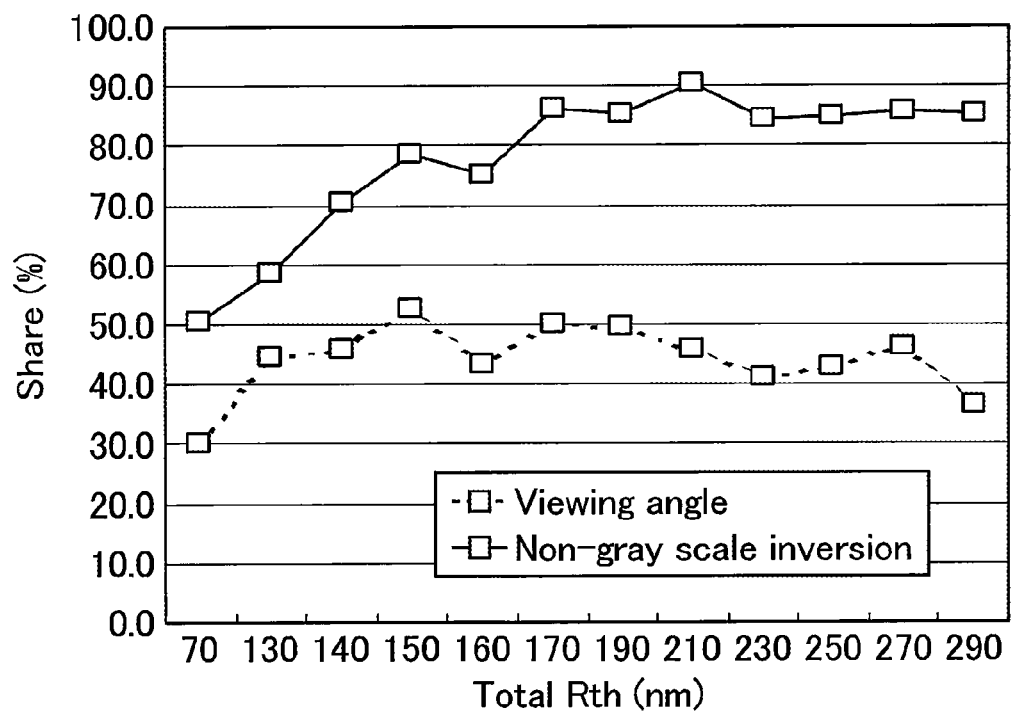
FIG. 95 is a graph showing the non-gray scale inversion share and the viewing angle share of Structure 2-4 of the liquid crystal display device according to the first embodiment.
Figure 96:
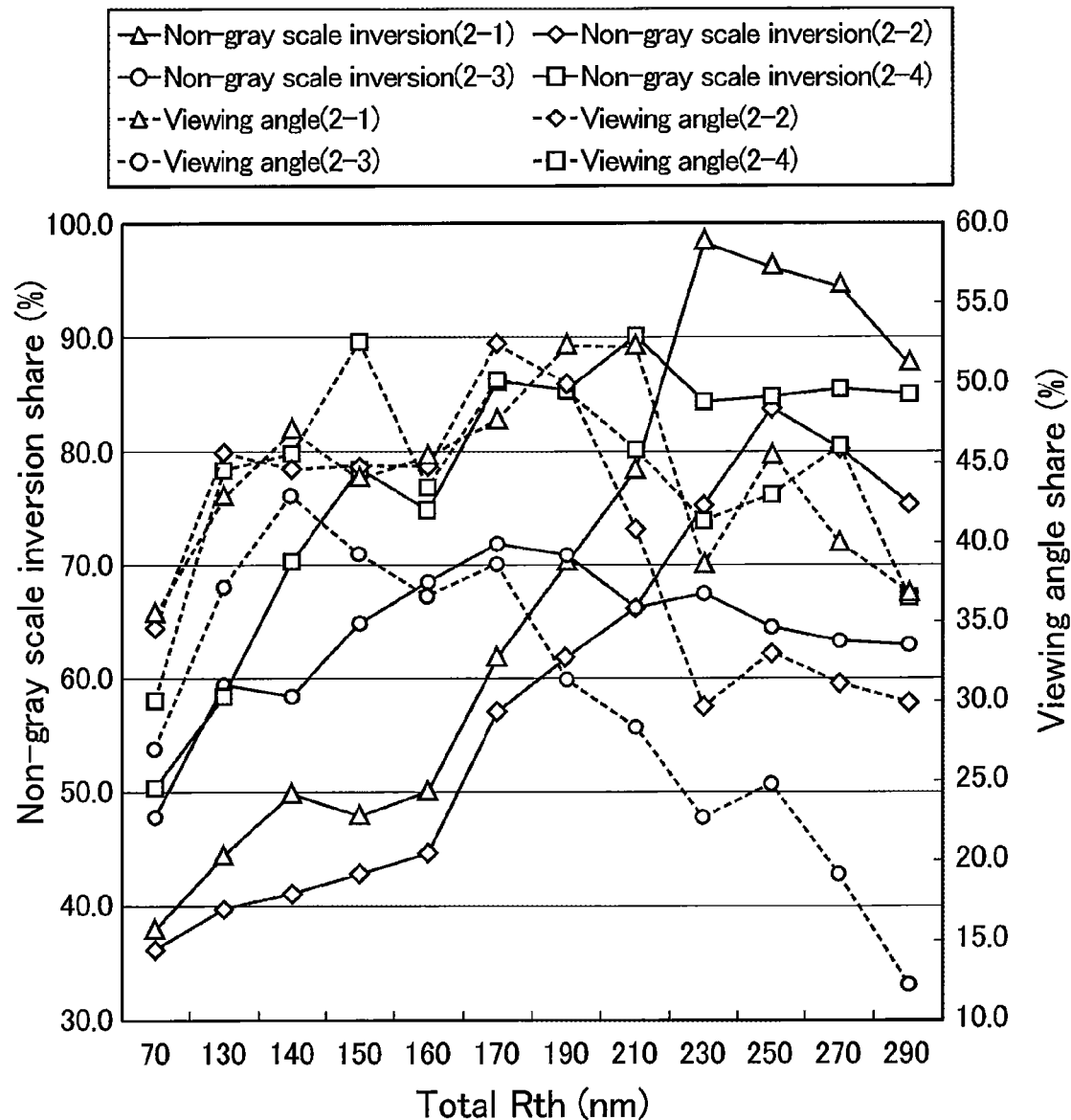
FIG. 96 is a graph showing the non-gray scale inversion share and the viewing angle share of each of Structures 2-1 to 2-4 of the liquid crystal display device according to the first embodiment.

With regard to each of Structures 1-1 to 1-4, the result of calculation performed with the Nz coefficient of the second phase plate 12 fixed to 1 and the Rth of the second phase plate 12 fixed to 70 nm, and the Rth of the third phase plate set to 0 nm, 60 nm, 70 nm, 80 nm, 90 nm, 100 nm, 120 nm, 140 nm, 160 nm, 180 nm, 200 nm, or 220 nm is shown in FIGS. 39 to

TABLE 2

| NZ coefficent | 1 | 1.4 | 1.6 | 1.8 | 2 | 2.3 | 2.6 | Judgment reference value |
|---|---|---|---|---|---|---|---|---|
| Total Rth (nm) | 100 | 156 | 184 | 212 | 240 | 282 | 324 | |
| Structure 1 + transparent protective layer | 57.5% | 72.6% | 74.4% | 81.8% | 88.3% | 81.0% | 79.3% | 61.8% |
| Structure 2 + transparent protective layer | 48.2% | 61.9% | 65.4% | 64.2% | 62.4% | 52.8% | 46.1% | 56.1% |

As the result, in Structure 1+transparent protective layer, it was found that the non-gray scale inversion share of not less than the judgment reference value was exhibited in the range of the total Rth of 150 nm or more and 330 nm or less, and the extremely excellent gray scale inversion characteristic could be achieved. In Structure 1+transparent protective layer, the

62. In addition, with regard to each of Structures 1-1 to 1-4, the results of calculation of the non-gray scale inversion share and the viewing angle share are shown in FIGS. 63 to 67 and Table 3. Note that, in each of Structures 1-1 to 1-4, the total Rth corresponds to the sum of the Rth (70 nm) of the second phase plate 12 and each Rth of the third phase plate.

TABLE 3

| | | Total Rth (nm) | 70 | 130 | 140 | 150 | 160 | 170 | 190 | 210 | 230 | 250 | 270 | 290 | Judgment reference value |
|---|---|---|---|---|---|---|---|---|---|---|---|---|---|---|---|
| Non-gray scale inversion share | Structure 1-1 | | 54.4% | 58.4% | 61.8% | 66.2% | 67.8% | 70.3% | 68.8% | 68.8% | 73.1% | 73.8% | 70.2% | 66.4% | 65.2% |
| | Structure 1-2 | | 51.2% | 65.8% | 69.9% | 69.8% | 69.5% | 84.1% | 84.4% | 87.6% | 83.9% | 81.0% | 78.4% | 66.6% | 61.4% |
| | Structure 1-3 | | 48.3% | 64.4% | 64.4% | 66.4% | 65.0% | 80.8% | 85.0% | 93.1% | 98.8% | 94.4% | 89.7% | 81.5% | 58.0% |
| | Structure 1-4 | | 55.8% | 65.1% | 71.1% | 71.5% | 69.9% | 70.1% | 73.6% | 72.7% | 74.8% | 67.3% | 63.9% | 59.1% | 66.9% |
| Viewing angle share | Structure 1-1 | | 19.3% | 30.1% | 29.8% | 30.5% | 30.3% | 30.2% | 34.6% | 30.3% | 27.6% | 25.0% | 18.9% | 19.1% | 19.3% |
| | Structure 1-2 | | 20.1% | 35.6% | 37.2% | 39.0% | 38.2% | 45.1% | 46.2% | 46.6% | 39.3% | 35.9% | 33.0% | 26.0% | 20.1% |
| | Structure 1-3 | | 19.2% | 30.1% | 28.9% | 35.5% | 33.9% | 35.9% | 40.8% | 38.4% | 31.4% | 30.5% | 29.7% | 24.8% | 19.2% |
| | Structure 1-4 | | 16.6% | 26.3% | 26.7% | 25.8% | 27.4% | 31.6% | 36.9% | 32.1% | 30.1% | 25.3% | 22.8% | 18.6% | 16.6% |

As the result, in Structure 1-1, it was found that the non-gray scale inversion share of not less than the judgment reference value was exhibited without sacrificing the viewing angle share in the range of the total Rth of 140 nm or more and 250 nm or less, and the extremely excellent gray scale inversion characteristic could be achieved without deteriorating the isocontrast characteristic. From the same viewpoint, in Structure 1-2, it was found that the total Rth of 130 nm or more and 290 nm or less was preferable. In addition, in Structure 1-3, it was found that the total Rth of 130 nm or more and 290 nm or less was preferable. Further, in Structure 1-4, it was found that the total Rth of 140 nm or more and 250 nm or less was preferable. In each of Structure 1-2 and Structure 1-3, the total Rth may be 170 nm or more. Based this, it is possible to significantly improve the gray scale inversion characteristic.

With regard to each of Structures 2-1 to 2-4, the result of calculation performed with the Nz coefficient of the second phase plate 12 fixed to 1 and the Rth of the second phase plate 12 fixed to 70 nm, and the Rth of the third phase plate set to 0 nm, 60 nm, 70 nm, 80 nm, 90 nm, 100 nm, 120 nm, 140 nm, 160 nm, 180 nm, 200 nm, or 220 nm is shown in FIGS. 68 to 91. In addition, with regard to each of Structures 2-1 to 2-4, the results of calculation of the non-gray scale inversion share and the viewing angle share are shown in FIGS. 92 to 96 and Table 4. Note that, in each of Structures 2-1 to 2-4, the total Rth corresponds to the sum of the Rth (70 nm) of the second phase plate 12 and each Rth of the third phase plate.

TABLE 4

| | Total Rth (nm) | 70 | 130 | 140 | 150 | 160 | 170 | 190 | 210 | 230 | 250 | 270 | 290 | Judgment reference value |
|---|---|---|---|---|---|---|---|---|---|---|---|---|---|---|
| Non-gray scale inversion share | Structure 2-1 | 38.0% | 44.4% | 49.8% | 47.9% | 50.1% | 61.9% | 70.1% | 78.4% | 98.3% | 96.1% | 94.5% | 87.7% | 45.5% |
| | Structure 2-2 | 36.3% | 39.8% | 41.2% | 42.8% | 44.7% | 57.1% | 61.8% | 66.3% | 75.3% | 83.8% | 80.3% | 75.4% | 43.5% |
| | Structure 2-3 | 47.8% | 59.5% | 58.5% | 64.9% | 68.6% | 72.0% | 70.9% | 66.2% | 67.5% | 64.5% | 63.3% | 63.0% | 57.3% |
| | Structure 2-4 | 50.4% | 58.5% | 70.4% | 78.5% | 74.8% | 86.2% | 85.4% | 90.2% | 84.4% | 84.9% | 85.5% | 85.0% | 60.4% |
| Viewing angle share | Structure 2-1 | 35.6% | 42.9% | 47.2% | 44.1% | 45.6% | 47.7% | 52.4% | 52.3% | 38.6% | 45.4% | 40.0% | 36.8% | 35.6% |
| | Structure 2-2 | 34.6% | 45.7% | 44.7% | 44.8% | 44.8% | 52.5% | 50.0% | 40.9% | 29.7% | 33.0% | 31.1% | 29.9% | 34.6% |
| | Structure 2-3 | 26.9% | 37.1% | 42.9% | 39.2% | 36.5% | 38.6% | 31.3% | 28.3% | 22.6% | 24.8% | 19.1% | 12.2% | 26.9% |
| | Structure 2-4 | 30.1% | 44.6% | 45.6% | 52.6% | 43.4% | 50.1% | 49.5% | 45.8% | 41.3% | 43.0% | 46.1% | 36.5% | 30.1% |

As the result, in Structure 2-1, it was found that the non-gray scale inversion share of not less than the judgment reference value was exhibited without sacrificing the viewing angle share in the range of the total Rth of 140 nm or more and 250 nm or less, and the extremely excellent gray scale inversion characteristic could be achieved without deteriorating the isocontrast characteristic. From the same viewpoint, in Structure 1-2, it was found that the total Rth of 140 nm or more and 210 nm or less was preferable. In addition, in Structure 1-3, it was found that the total Rth of 130 nm or more and 210 nm or less was preferable. Further, in Structure 1-4, it was found that the total Rth of 140 nm or more and 270 nm or less was preferable. In Structure 2-1, the total Rth may be 170 nm or more, or may also be 230 nm or more. In each of Structure 2-2 and Structure 2-4, the total Rth may be 170 nm or more. Based on these, it is possible to significantly improve the gray scale inversion characteristic.

Figure 97:
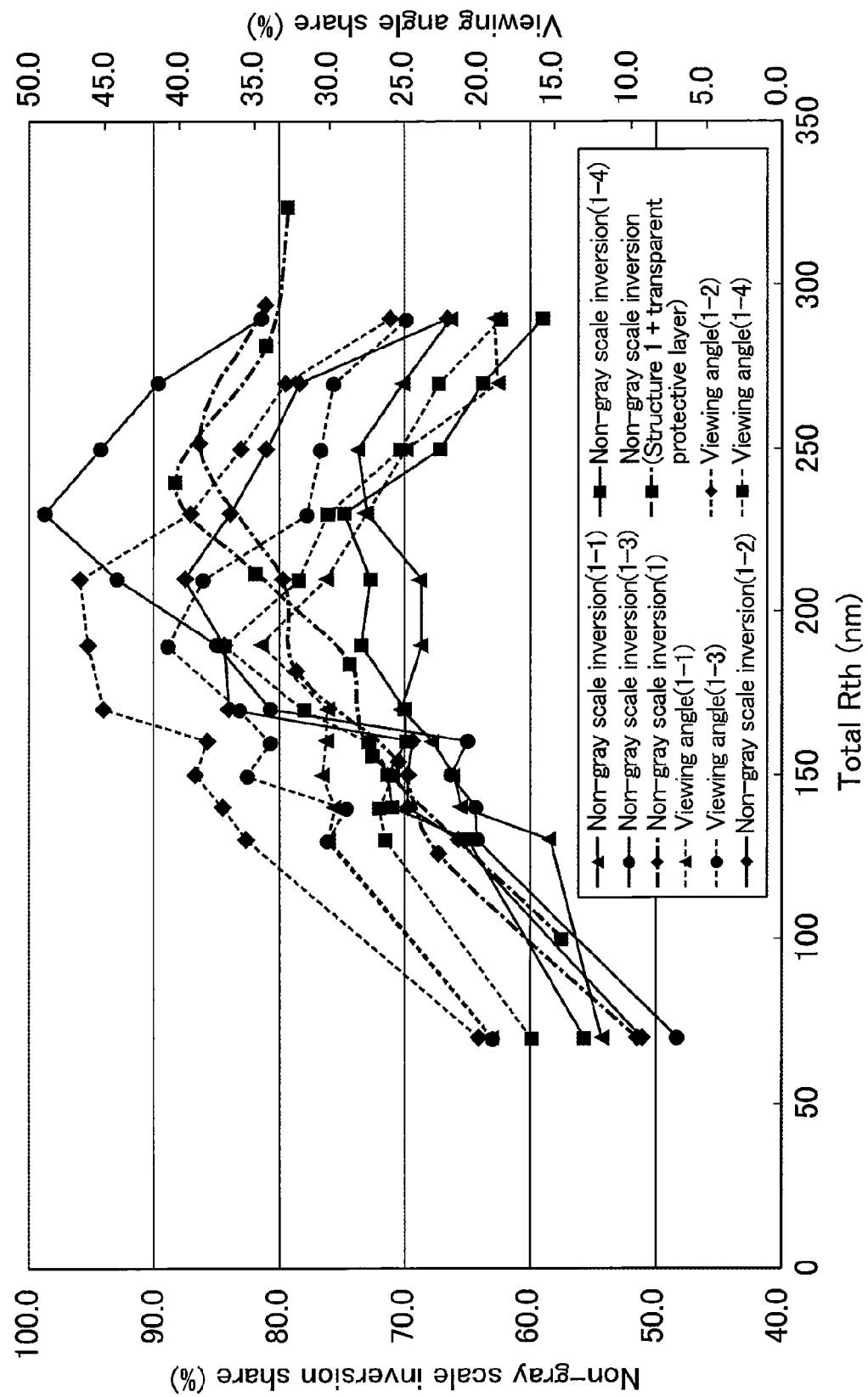
FIG. 97 is a graph showing the non-gray scale inversion share and the viewing angle share of each of Structure 1, Structure 1+transparent protective layer, and Structures 1-1 to 1-4.

In FIG. 97 and Table 5, the results of Structure 1, Structure 1+transparent protective layer, and Structures 1-1 to 1-4 are collectively shown.

TABLE 5

| | | Judgment reference value | 70 | 100 | 126 | 130 | 140 | 150 | 154 | 156 | 160 | 170 | 182 | 184 | 190 | 210 |
|---|---|---|---|---|---|---|---|---|---|---|---|---|---|---|---|---|
| Non-gray scale inversion share | Structure 1 | 61.8% | 51.5% | | 67.4% | | | | 70.6% | | | | 78.6% | | | 79.8% |
| | Structure 1 + transparent protective layer | 61.8% | | 57.5% | | | | | | 72.6% | | | | 74.4% | | |
| | Structure 1-1 | 65.2% | 54.4% | | | 58.4% | 65.5% | 66.2% | | | 67.8% | 70.3% | | | 68.8% | 68.8% |
| | Structure 1-2 | 61.4% | 51.2% | | | 65.8% | 69.9% | 69.8% | | | 69.5% | 84.1% | | | 84.4% | 87.6% |
| | Structure 1-3 | 58.0% | 48.3% | | | 64.4% | 64.4% | 66.4% | | | 65.0% | 80.8% | | | 85.0% | 93.1% |
| | Structure 1-4 | 66.9% | 55.8% | | | 65.1% | 71.1% | 71.5% | | | 69.9% | 70.1% | | | 73.6% | 72.7% |
| Viewing angle share | Structure 1-1 | 19.3% | 19.3% | | | 30.1% | 29.8% | 30.5% | | | 30.3% | 30.2% | | | 34.6% | 30.3% |
| | Structure 1-2 | 20.1% | 20.1% | | | 35.6% | 37.2% | 39.0% | | | 38.2% | 45.1% | | | 46.2% | 46.6% |
| | Structure 1-3 | 19.2% | 19.2% | | | 30.1% | 28.9% | 35.5% | | | 33.9% | 35.9% | | | 40.8% | 38.4% |
| | Structure 1-4 | 16.6% | 16.6% | | | 26.3% | 26.7% | 25.8% | | | 27.4% | 31.6% | | | 36.9% | 32.1% |

| | | Judgment reference value | 212 | 230 | 240 | 250 | 252 | 270 | 282 | 290 | 294 | 324 |
|---|---|---|---|---|---|---|---|---|---|---|---|---|
| Non-gray scale inversion share | Structure 1 | 61.8% | | | | | 86.4% | | | 81.2% | | |
| | Structure 1 + transparent protective layer | 61.8% | 81.8% | | 88.3% | | | | 81.0% | | | 79.3% |
| | Structure 1-1 | 65.2% | | 73.1% | | 73.8% | | 70.2% | | 66.4% | | |
| | Structure 1-2 | 61.4% | | 83.9% | | 81.0% | | 78.4% | | 66.6% | | |
| | Structure 1-3 | 58.0% | | 98.8% | | 94.4% | | 89.7% | | 81.5% | | |
| | Structure 1-4 | 66.9% | | 74.8% | | 67.3% | | 63.9% | | 59.1% | | |
| Viewing angle share | Structure 1-1 | 19.3% | | 27.6% | | 25.0% | | 18.9% | | 19.1% | | |
| | Structure 1-2 | 20.1% | | 39.3% | | 35.9% | | 33.0% | | 26.0% | | |
| | Structure 1-3 | 19.2% | | 31.4% | | 30.5% | | 29.7% | | 24.8% | | |
| | Structure 1-4 | 16.6% | | 30.1% | | 25.3% | | 22.8% | | 18.6% | | |

As the result, it was found that the non-gray scale inversion share of not less than the judgment reference value was exhibited in each of Structure 1, Structure 1+transparent protective layer, and Structures 1-1 to 1-4 as long as the total Rth fell within a range of 150 nm or more and 250 nm or less. That is, in a mode where the first polarizer 5/the first phase plate 11/the liquid crystal display panel 10/the second phase plate 12/the second polarizer 6 were stacked in this order, it was found that the extremely excellent gray scale inversion characteristic could be reliably achieved by setting the total Rth in the range of 150 nm or more and 250 nm or less.

Figure 98:
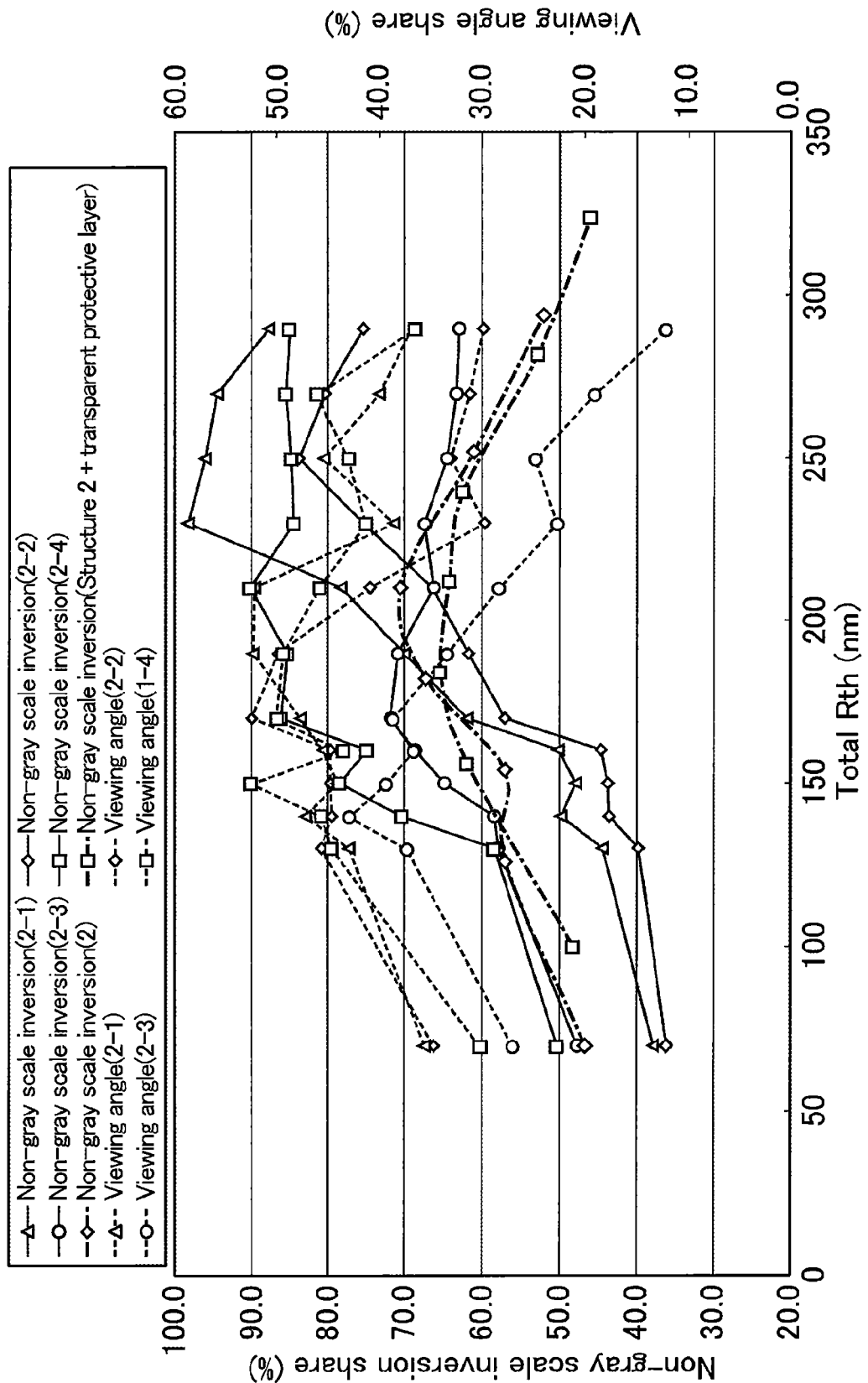
FIG. 98 is a graph showing the non-gray scale inversion share and the viewing angle share of each of Structure 2, Structure 2+transparent protective layer, and Structures 2-1 to 2-4.

In FIG. 98 and Table 6, the results of Structure 2, Structure 2+transparent protective layer, and Structures 2-1 to 2-4 are collectively shown.

TABLE 6

| | Total Rth (nm) | Judgment reference value | 70 | 100 | 126 | 130 | 140 | 150 | 154 | 156 | 160 | 170 | 182 | 184 | 190 | 210 |
|---|---|---|---|---|---|---|---|---|---|---|---|---|---|---|---|---|
| Non-gray scale inversion share | Structure 2 | 56.1% | 46.8% | | 57.0% | | | | 57.0% | | | | 67.3% | | 70.5% | |
| | Structure 2 + transparent protective layer | 56.1% | | 48.2% | | | | | | 61.9% | | | 65.4% | | | |
| | Structure 2-1 | 45.5% | 38.0% | | | 44.4% | 49.8% | 47.9% | | | 50.1% | 61.9% | | | 70.1% | 78.4% |
| | Structure 2-2 | 43.5% | 36.3% | | | 39.8% | 43.6% | 43.8% | | | 44.7% | 57.1% | | | 61.8% | 66.3% |
| | Structure 2-3 | 57.3% | 47.8% | | | 58.0% | 58.5% | 64.9% | | | 68.6% | 72.0% | | | 70.9% | 66.2% |
| | Structure 2-4 | 60.4% | 50.4% | | | 58.5% | 70.4% | 78.5% | | | 74.8% | 86.2% | | | 85.4% | 90.2% |
| Viewing angle share | Structure 2-1 | 35.6% | 35.6% | | | 42.9% | 47.2% | 44.1% | | | 45.6% | 47.7% | | | 52.4% | 52.3% |
| | Structure 2-2 | 34.6% | 34.6% | | | 45.7% | 44.7% | 44.8% | | | 44.8% | 52.5% | | | 50.0% | 40.9% |
| | Structure 2-3 | 26.9% | 26.9% | | | 37.1% | 42.9% | 39.2% | | | 36.5% | 38.6% | | | 33.3% | 28.3% |
| | Structure 2-4 | 30.1% | 30.1% | | | 44.6% | 45.6% | 52.6% | | | 43.4% | 50.1% | | | 49.5% | 45.8% |

| | Total Rth (nm) | Judgment reference value | 212 | 230 | 240 | 250 | 252 | 270 | 282 | 290 | 294 | 324 |
|---|---|---|---|---|---|---|---|---|---|---|---|---|
| Non-gray scale inversion share | Structure 2 | 56.1% | | | | | 61.1% | | | | 52.2% | |
| | Structure 2 + transparent protective layer | 56.1% | 64.2% | | 62.4% | | | | 52.8% | | | 46.1% |
| | Structure 2-1 | 45.5% | | 98.3% | | 96.1% | | 94.5% | | 87.7% | | |
| | Structure 2-2 | 43.5% | | 75.3% | | 83.8% | | 80.3% | | 75.4% | | |
| | Structure 2-3 | 57.3% | | 67.5% | | 64.5% | | 63.3% | | 63.0% | | |
| | Structure 2-4 | 60.4% | | 84.4% | | 84.9% | | 85.5% | | 85.0% | | |
| Viewing angle share | Structure 2-1 | 35.6% | | 38.6% | | 45.4% | | 40.0% | | 36.8% | | |
| | Structure 2-2 | 34.6% | | 29.7% | | 33.0% | | 31.1% | | 29.9% | | |
| | Structure 2-3 | 26.9% | | 22.6% | | 24.8% | | 19.1% | | 12.2% | | |
| | Structure 2-4 | 30.1% | | 41.3% | | 43.0% | | 46.1% | | 36.5% | | |

As the result, it was found that the non-gray scale inversion share of not less than the judgment reference value was exhibited in each of Structure 2, Structure 2+transparent protective layer, and Structures 2-1 to 2-4 as long as the total Rth fell within a range of 150 nm or more and 210 nm or less. That is, in a mode where the first polarizer 5/the second phase plate 12/the first phase plate 11/the liquid crystal display panel 10/the second polarizer 6 were stacked in this order, it was found that the extremely excellent gray scale inversion characteristic could be reliably achieved by setting the total Rth in the range of 150 nm or more and 210 nm or less.

Next, a description is given of examples of the liquid crystal display device according to the first embodiment. Note that, in the following individual examples, the azimuth of the slow axis of each phase plate and the azimuth of the absorption axis of each polarizer are defined by the angle formed with the X axis, as shown in FIG. 20.

EXAMPLE 1

Figure 99:
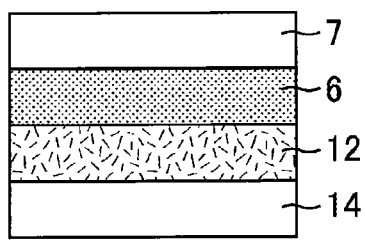
FIG. 99 is a schematic cross-sectional view showing a structure of a liquid crystal display device according to each of Examples of 1 to 3.
Figure 99:
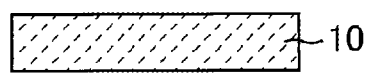
Figure 99:
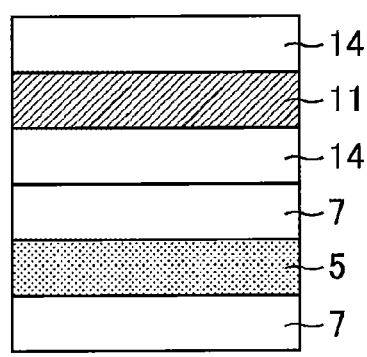

In a liquid crystal display device of Example 1, as shown in FIG. 99, the transparent protective layer 7 made of the TAC film, the first polarizer 5, the transparent protective layer 7 made of the TAC film, the first phase plate 11 made of the liquid crystal film, the liquid crystal display panel 10, the second phase plate 12, the second polarizer 6, and the transparent protective layer 7 made of the TAC film were provided in this order from the backlight side. Thus, Example 1 relates to the structure of the above-described Structure 1+transparent protective layer.

The transparent protective layer 7 and the first phase plate 11 were laminated together via an acrylic adhesive layer 14 having a thickness of 5 μm. In addition, the first phase plate 11 and the liquid crystal display panel 10 were laminated together via the acrylic adhesive layer 14 having a thickness of 25 μm. Further, the liquid crystal display panel 10 and the second phase plate 12 were laminated together via the acrylic adhesive layer 14 having a thickness of 20 μm.

In the liquid crystal display panel 10, the liquid crystal layer is made of the liquid crystal composition containing the homogeneously aligned liquid crystal molecules, and a liquid crystal material (Δn=0.65) manufactured by Merck KGaA was used as the liquid crystal composition. At this point, the director of the homogeneous liquid crystal (the longitudinal direction of the liquid crystal molecule) was regulated by a rubbing direction of an alignment layer, and the alignment direction of the homogeneous liquid crystal was set to 45°. The pretilt angle of the homogeneous liquid crystal was set to 3°. A gap (cell gap) in the liquid crystal layer was set to 4 μm. At the time of black display, the residual phase difference Re of the liquid crystal display panel 10 was 50 nm.

In order to compensate the birefringence resulting from the homogeneous liquid crystal, the alignment direction of the first phase plate 11 was set to an azimuth (an azimuth of 225°) which was substantially opposite to and in parallel with the rubbing direction so as to successively compensate the birefringence. Note that the phase difference Re, h of the liquid crystal film was set to 90 nm. In addition, the average tilt angle of the liquid crystal film was set to 37°, and the film thickness of the liquid crystal film (including the over-coat layer) was set to 7 μm. As such first phase plate 11, NH film manufactured by Nippon Oil Corporation was used.

The slow axis of the second phase plate 12 was set to an azimuth (an azimuth of 135°) which was substantially orthogonal to the alignment direction of each of the homogeneous liquid crystal and the first phase plate 11. Note that the Re of the second phase plate 12 was set to 140 nm so as to correspond to the sum of the residual phase difference Re of the liquid crystal display panel 10 and the phase difference Re, h of the liquid crystal film. In addition, the Nz coefficient of the second phase plate 12 was set to 1.6. As the result, the Rth of the second phase plate 12 was 154 nm. The film thickness of the second phase plate 12 was set to 32 μm. As such second phase plate 12, ZEONOR manufactured by OPTES INC. was used.

In order to convert linearly polarized light having passed through the first polarizer 5 into desired elliptically polarized light or linearly polarized light and cause the light to enter the liquid crystal layer, the absorption axis of the first polarizer 5 was set to an azimuth (an azimuth of 90°) which intersected the alignment direction of the first phase plate 11 and the slow axis of the second phase plate 12 at an angle of substantially 45°. On the other hand, the absorption axis of the second polarizer 6 was set to an azimuth (an azimuth of 0°) which was substantially orthogonal to the absorption axis of the first polarizer 5. The film thickness of each of the first polarizer 5 and the second polarizer 6 was set to 28 μm. As such first and second polarizers 5 and 6, there was used a polarizing film obtained by dyeing a PVA film manufactured by KURARAY CO., LTD. with iodine, and then stretching the PVA film.

The film thickness of the TAC film was set to 40 μm, and the Rth of the TAC film was set to 30 nm. As such TAC film, there was used a TAC film for a liquid crystal polarizing plate manufactured by Konica Minolta Opto Products Co., Ltd.

The total Rth in the liquid crystal display device of Example 1 corresponded to the sum of the Rth (30 nm) of the transparent protective layer 7 and the Rth (154 nm) of the second phase plate 12, and was approximately 184 nm.

EXAMPLE 2

A liquid crystal display device of Example 2 was fabricated in a manner similar to that used to fabricate the liquid crystal display device of Example 1 except that the Nz coefficient of the second phase plate 12 was set to 1.4, the Rth of the second phase plate 12 was set to 126 nm, and the total Rth was changed to 156 nm.

EXAMPLE 3

A liquid crystal display device of Example 3 was fabricated in a manner similar to that used to fabricate the liquid crystal display device of Example 1 except that the Nz coefficient of the second phase plate 12 was set to 1.8, the Rth of the second phase plate 12 was set to 182 nm, and the total Rth was changed to 212 nm.

EXAMPLE 4

Figure 100:
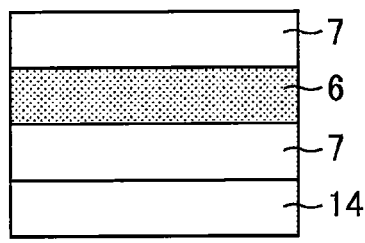
FIG. 100 is a schematic cross-sectional view showing a structure of a liquid crystal display device according to each of Examples 4 to 6.
Figure 100:
Figure 100:
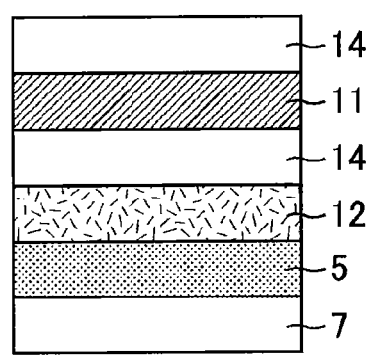

In a liquid crystal display device of Example 4, as shown in FIG. 100, the transparent protective layer 7 made of the TAC film, the first polarizer 5, the second phase plate 12, the first phase plate 11 made of the liquid crystal film, the liquid crystal display panel 10, the transparent protective layer 7 made of the TAC film, the second polarizer 6, and the transparent protective layer 7 made of the TAC film were provided in this order from the backlight side. Thus, Example 4 is different from Example 1 only in the relationship of arrangement of the individual members. In addition, Example 4 relates to the structure of the above-described Structure 2+transparent protective layer.

Note that the second phase plate 12 and the first phase plate 11 were laminated together via the acrylic adhesive layer 14 having a thickness of 5 μm. The first phase plate 11 and the liquid crystal display panel 10 were laminated together via the acrylic adhesive layer 14 having a thickness of 25 μm. The liquid crystal display panel 10 and the transparent protective layer 7 were laminated together via the acrylic adhesive layer 14 having a thickness of 20 μm.

EXAMPLE 5

A liquid crystal display device of Example 5 was fabricated in a manner similar to that used to fabricate the liquid crystal display device of Example 4 except that the Nz coefficient of the second phase plate 12 was set to 1.4, the Rth of the second phase plate 12 was set to 126 nm, and the total Rth was changed to 156 nm.

EXAMPLE 6

A liquid crystal display device of Example 6 was fabricated in a manner similar to that used to fabricate the liquid crystal display device of Example 4 except that the Nz coefficient of the second phase plate 12 was set to 1.8, the Rth of the second phase plate 12 was set to 182 nm, and the total Rth was changed to 212 nm.

COMPARATIVE EXAMPLE 1

A liquid crystal display device of Comparative Example 1 was fabricated in a manner similar to that used to fabricate the liquid crystal display device of Example 4 except that the Nz coefficient of the second phase plate 12 was set to 1, the Rth of the second phase plate 12 was set to 70 nm, and the total Rth was changed to 100 nm.

The results of actual measurement of the gray scale inversion characteristic of the liquid crystal display devices of Examples 1 to 6 and Comparative Example 1 were compared with the results of simulation of the gray scale inversion characteristic performed by using the fabrication conditions of the liquid crystal display devices of Examples 1 to 6 and Comparative Example 1. Note that the simulation has the results similar to the results of simulation of the above-described Structure 1+transparent protective layer or Structure 2+transparent protective layer. These results are shown in FIG. 101 and Table 7.

TABLE 7

| Total Rth (nm) | 100 | 156 | 184 | 212 | 240 | 282 | 324 |
|---|---|---|---|---|---|---|---|
| Structure 1 + transparent protective layer (simulation value) | 57.5% | 72.6% | 74.4% | 81.8% | 88.3% | 81.0% | 79.3% |
| Structure 1 + transparent protective layer (actually measured value) | | 71.4% | 73.5% | 78.7% | | | |
| Structure 2 + transparent protective layer (simulation value) | 48.2% | 61.9% | 65.4% | 64.2% | 62.4% | 52.8% | 46.1% |
| Structure 2 + transparent protective layer (actually measured value) | 46.5% | 62.2% | 66.5% | 65.2% | | | |

Figure 101:
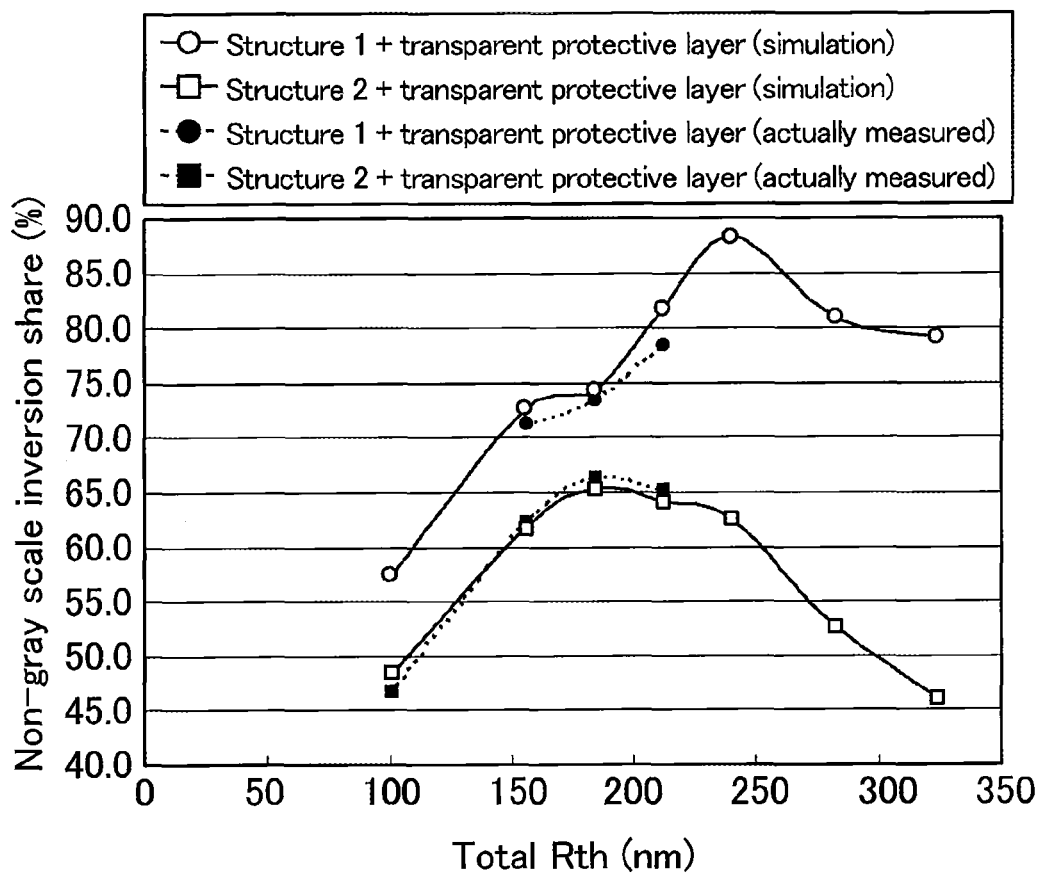
FIG. 101 is a graph showing the non-gray scale inversion share of the liquid crystal display device according to each of Examples 1 to 6 and Comparative Example 1.

As is obvious from FIG. 101 and Table 7, the difference between the actually measured value and the value determined by the simulation falls within about 3%, and it can be seen that the actual non-gray scale inversion share can be evaluated by using the simulation with high precision.

Next, a description is given of the presence or absence of the correlation between the gray scale inversion characteristic and the isocontrast characteristic.

Figure 102:
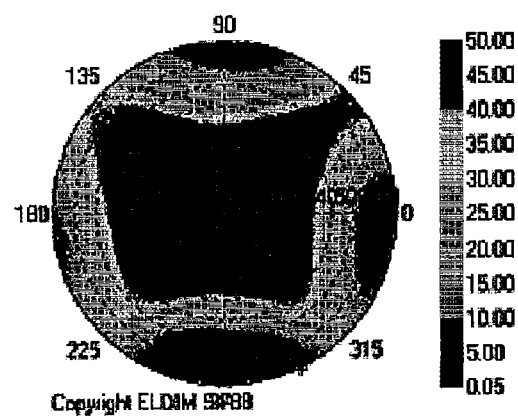
FIG. 102 shows the isocontrast characteristic of a TN mode liquid crystal display device provided with a wide view film.
Figure 103:
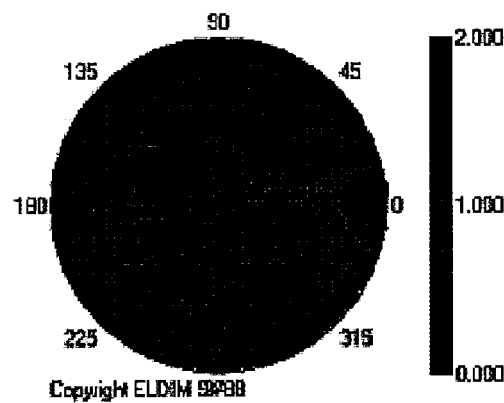
FIG. 103 shows the gray scale inversion characteristic of the TN mode liquid crystal display device provided with the wide view film.
Figure 112:
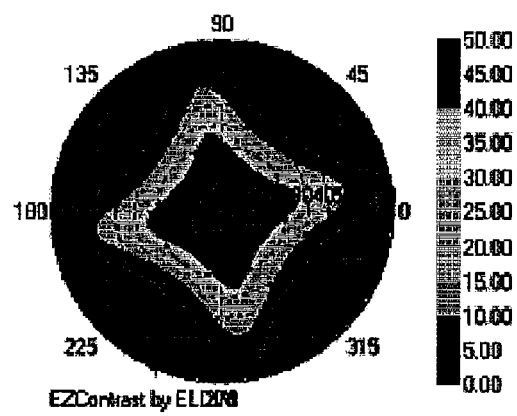
FIG. 112 shows the isocontrast characteristic of an ASV mode liquid crystal display device.
Figure 113:
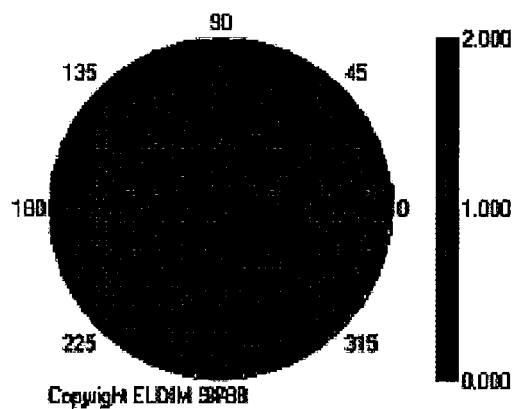
FIG. 113 shows the gray scale inversion characteristic of the ASV mode liquid crystal display device.

FIGS. 102 and 103 show the isocontrast characteristic and the gray scale inversion characteristic of a TN mode liquid crystal display device provided with a wide view film (WV film). FIGS. 104 to 111 show the isocontrast characteristic and the gray scale inversion characteristic of an ECB mode liquid crystal display device. FIGS. 112 and 113 show the isocontrast characteristic and the gray scale inversion characteristic of a liquid crystal display device of an ASV (Advanced Super View) mode which is one type of the VA mode. Note that, in the ASV mode, the liquid crystal molecules are tilted in all directions like a firework when the voltage is applied.

Figure 104:
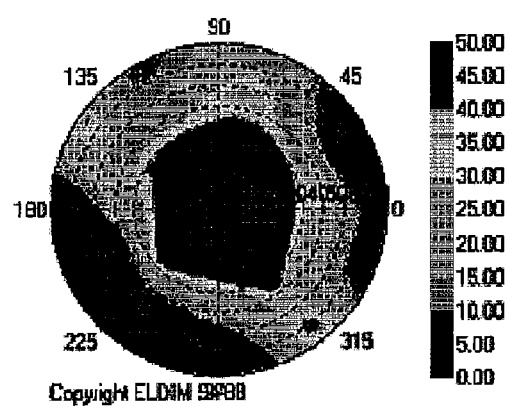
FIG. 104 shows the isocontrast characteristic of an ECB mode liquid crystal display device.
Figure 105:
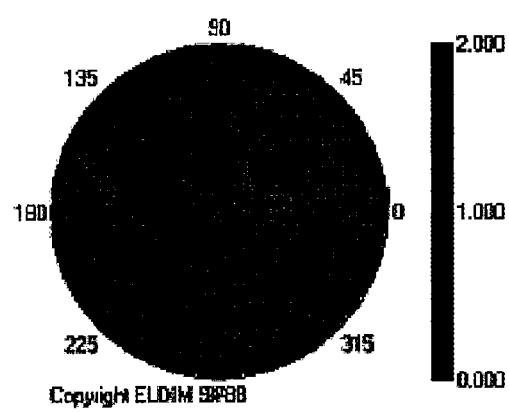
FIG. 105 shows the gray scale inversion characteristic of the ECB mode liquid crystal display device.

The ECB mode liquid crystal display device of FIGS. 104 and 105 has a structure in which the polarizing plate, the phase plate (the Re=270 nm), the liquid crystal film (the phase difference Re, h=90 nm), the ECB mode liquid crystal display panel, the phase plate (the Re=270 nm, the Nz coefficient=1.4), the phase plate (the Re=270 nm), and the polarizing plate are provided in this order from the backlight side.

Figure 106:
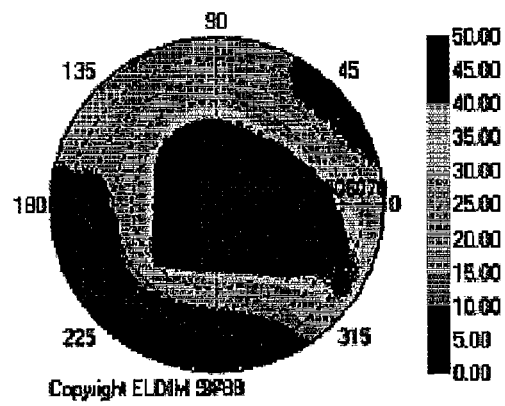
FIG. 106 shows the isocontrast characteristic of the ECB mode liquid crystal display device.
Figure 107:
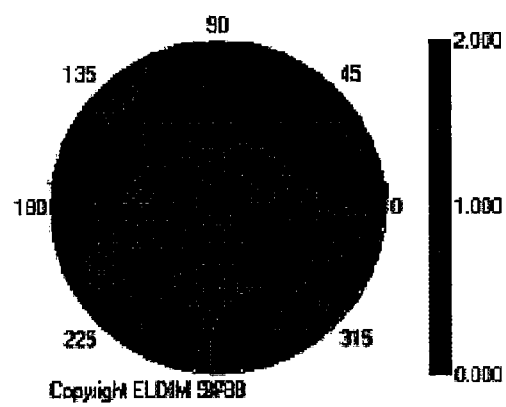
FIG. 107 shows the gray scale inversion characteristic of the ECB mode liquid crystal display device.

The ECB mode liquid crystal display device of FIGS. 106 and 107 has a structure in which the polarizing plate, the phase plate (the Re=270 nm), the liquid crystal film (the phase difference Re, h=90 nm), the ECB mode liquid crystal display panel, the phase plate (the Re=270 nm, the Nz coefficient=1.0), the phase plate (the Re=270 nm), and the polarizing plate are provided in this order from the backlight side.

Figure 108:
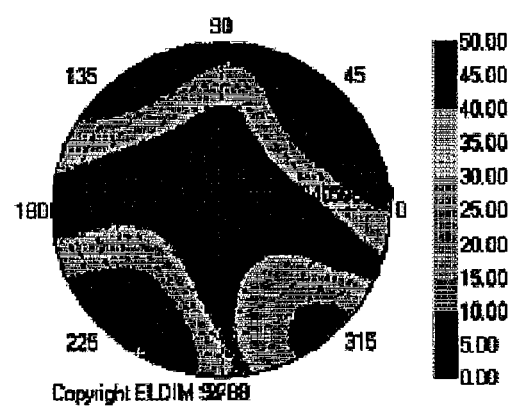
FIG. 108 shows the isocontrast characteristic of Structure 2 of the liquid crystal display device according to the first embodiment.
Figure 109:
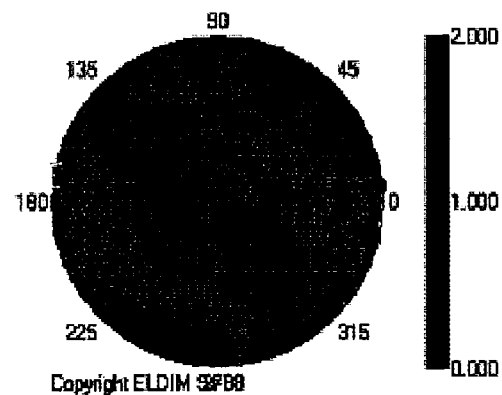
FIG. 109 shows the gray scale inversion characteristic of Structure 2 of the liquid crystal display device according to the first embodiment.
Figure 110:
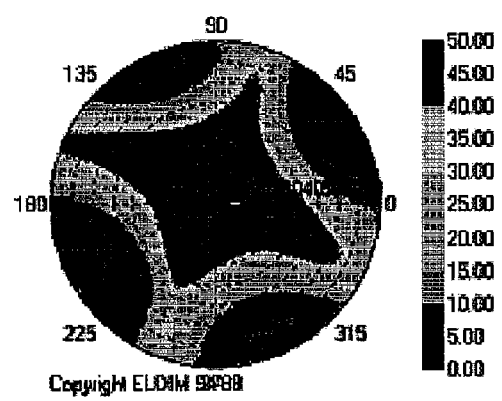
FIG. 110 shows the isocontrast characteristic of Structure 1 of the liquid crystal display device according to the first embodiment.
Figure 111:
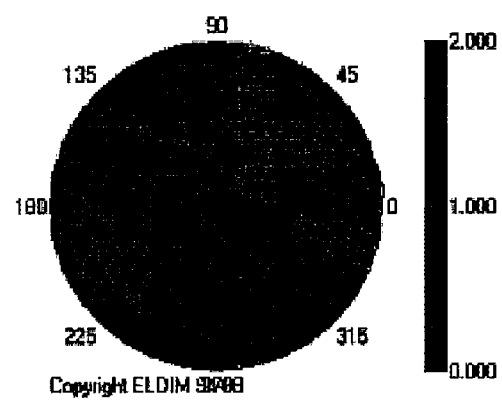
FIG. 111 shows the gray scale inversion characteristic of Structure 1 of the liquid crystal display device according to the first embodiment.

FIGS. 108 and 109 show the evaluation result of the liquid crystal display device having the above-described Structure 2, while FIGS. 110 and 111 show the evaluation result of the liquid crystal display device having the above-described Structure 1.

From these drawings, it is found that the correlation between the gray scale inversion characteristic and the isocontrast characteristic is not observed. That is, when the liquid crystal mode differs, the states of both of the characteristics are significantly changed. In addition, the difference in gray scale inversion characteristic can be seen even between the ECB mode liquid crystal display devices. For example, when the liquid crystal display device of FIGS. 104 and 105 is compared with the liquid crystal display device of FIGS. 106 and 107, the viewing angle of the isocontrast characteristic is apparently larger in the liquid crystal display device of FIGS. 106 and 107, but the gray scale inversion characteristic is apparently worse. Thus, a better isocontrast characteristic does not necessarily lead to a better gray scale inversion characteristic.

Figure 114:
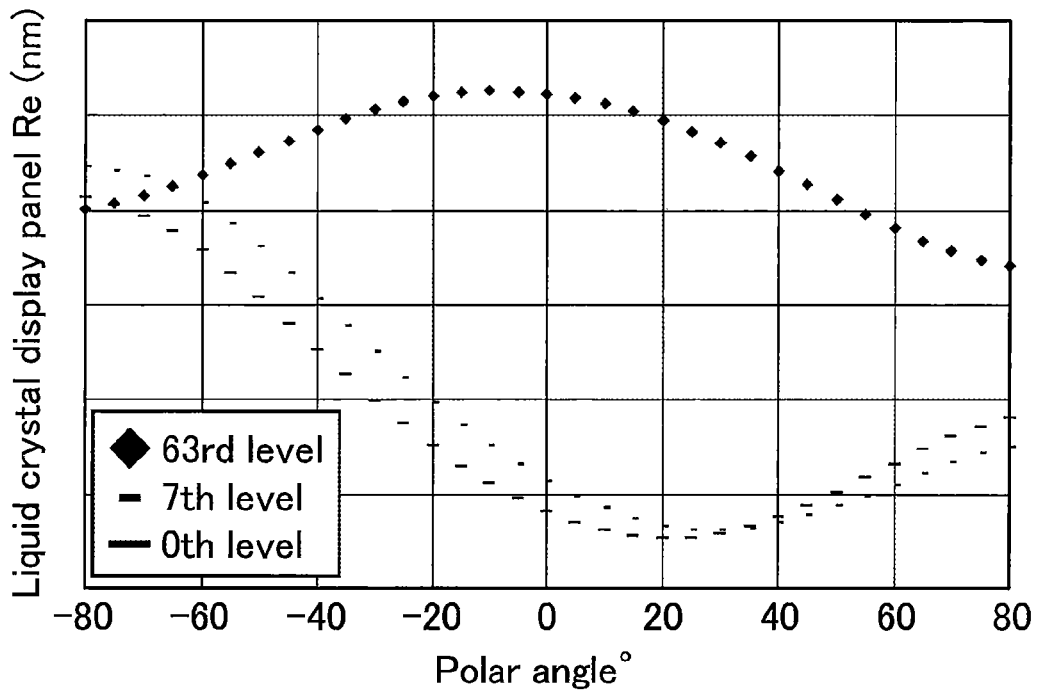
FIG. 114 shows viewing angle dependence of a phase difference of an ECB mode liquid crystal display panel.

As shown in FIG. 114, when the voltage is applied to the ECB mode liquid crystal display panel, the phase difference changes according to a gray scale voltage in the front direction (a polar angle of 0°). However, in an oblique direction, the liquid crystal molecule in the shape of a rugby ball is straightening up, and hence a phenomenon occurs in which the tilt angle of the head portion (a reverse curve point portion) of the rugby ball is changed according to the magnitude of the voltage and the phase difference does not change according to the gray scale voltage. Although a system capable of compensating the 63rd and 0th levels of the gray scale is sufficient only for increasing the viewing angle of the isocontrast characteristic, an improvement in gray scale inversion is an improvement in the inverted portion so that it is necessary to perform a different operation. The gray scale inversion does not occur without the inverted portion. In the VA mode such as the ASV mode or the like, the liquid crystal molecule is controlled such that the head portion (the reverse curve point portion) thereof can fall in any direction. Consequently, when pixels are viewed averagely, the reverse curve point portion of each liquid crystal molecule is cancelled by the reverse curve point portion of another pixel so that it can be assumed that the reverse curve point portion has disappeared. In addition, in the IPS mode, the liquid crystal molecule is aligned such that the reverse curve point portion cannot be seen from the display surface. On the other hand, in the TN mode or the ECB mode, the reverse curve point portion inevitably appears, and hence the gray scale inversion tends to occur.

According to the present invention, it is possible to realize the liquid crystal display device suitable for the ECB mode in which the gray scale inversion tends to occur in the manner described above.

(Second Embodiment)

A description is given hereinbelow of a liquid crystal display device of a second embodiment. Note that members in the second embodiment which are the same as those in the first embodiment are designated with the same reference numerals and the description thereof is omitted.

Figure 115:
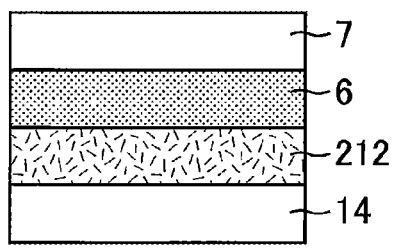
FIG. 115 is a schematic cross-sectional view showing a structure of a liquid crystal display device according to a second embodiment.
Figure 115:
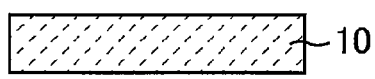
Figure 115:
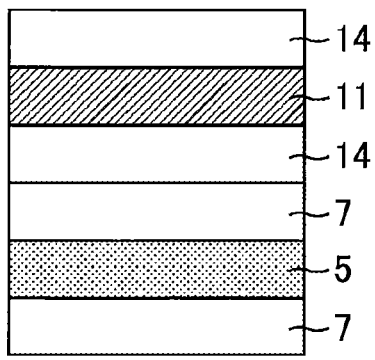

The liquid crystal display device of the present embodiment is a transmission liquid crystal display device in which the transparent protective layer 7 made of the TAC film, the first polarizer 5, the transparent protective layer 7 made of the TAC film, the first phase plate 11 made of the liquid crystal film, the liquid crystal display panel 10, a second phase plate 212, the second polarizer 6, and the transparent protective layer 7 made of the TAC film are provided in this order from the backlight side, as shown in FIG. 115.

In the present embodiment, as the transparent protective layer 7, the TAC film having a film thickness of 40 μm is used. Although the Rth of the TAC film is especially preferably 30 nm, the Rth thereof may also be 25 to 35 nm in consideration of variations in products. On the other hand, as the transparent protective layer 7, a protective film which is made of an acrylic polymer and satisfies the Rth=0 nm may also be used.

As a stack of the transparent protective layer 7, the first polarizer 5, and the transparent protective layer 7, a common polarizing plate can be used.

The second phase plate 212 is used for optical compensation in the front direction. The phase difference value of the second phase plate 212 in the perpendicular direction influences the viewing angle characteristic, and the viewing angle characteristic is changed by adjusting the phase difference value. The second phase plate 212 is fabricated by using the material and the method similar to those for the second phase plate 12 of the first embodiment.

Although the Re of the second phase plate 212 is especially preferably 140 nm, the Re thereof may also be 130 to 150 nm (preferably 135 to 145 nm) in consideration of variations in products. In addition, the Re of the second phase plate 212 preferably substantially satisfies the relationship of (residual phase difference Re of liquid crystal display panel 10)=(Re of second phase plate 212)−(phase difference Re, h of liquid crystal film).

The phase plate satisfying the Re=140 nm is mass-produced for the VA mode liquid crystal display device using circularly polarized light and can be used in the present embodiment, and hence the phase plate is advantageous in terms of cost. In addition, a stack of the phase plate satisfying the Re=140 nm and the polarizer functions also as a circularly polarizing plate, and hence it is possible to prevent visual recognition of reflection in the electrode in the panel.

Thus, as the stack of the second phase plate 212, the second polarizer 6, and the transparent protective layer 7, a common circularly polarizing plate can be suitably used.

Although the Nz coefficient of the second phase plate 212 is especially preferably 1.55, the Nz coefficient thereof may also be 1.35 to 1.75 (preferably 1.4 to 1.7) in consideration of variations in products.

Although the Rth of the second phase plate 212 satisfying the above-described Re and Nz coefficient is especially preferably 147 nm, the Rth thereof may also be 140 to 155 nm in consideration of variations in products. In addition, in the present embodiment, the total Rth corresponds to the sum of the Rth of the second phase plate 212 and the Rth (30 nm) of the transparent protective layer 7, and is 120 nm or more.

The stack of the transparent protective layer 7, the first polarizer 5, and the transparent protective layer 7 (the polarizing plate), and the first phase plate 11 are laminated together via a bonding layer or an adhesive layer (e.g., an acrylic adhesive layer having a thickness of 5 μm). In addition, the first phase plate 11 and the liquid crystal display panel 10 are laminated together via the bonding layer or the adhesive layer (e.g., the acrylic adhesive layer having a thickness of 25 μm). Further, the liquid crystal display panel 10 and the stack of the second phase plate 212, the second polarizer 6, and the transparent protective layer 7 (the circularly polarizing plate) are laminated together via the bonding layer or the adhesive layer (e.g., the acrylic adhesive layer having a thickness of 25 μm). Note that, as the bonding layer and the adhesive layer, those shown as examples in the first embodiment may be used.

In the second embodiment, the azimuth and the alignment direction of the optical axis of each member is set in a manner similar to that in the first embodiment.

Thus, according to the present embodiment, similarly to the first embodiment, it is possible to exhibit the excellent gray scale inversion characteristic when a color close to black is displayed.

Specifically, the non-gray scale inversion share of the liquid crystal display device of the second embodiment is preferably 60% or more. When the non-gray scale inversion share is less than 60%, it may be felt that the gray scale inversion is not sufficiently suppressed when a color close to black is displayed.

The present application claims priority to Patent Application No. 2009-207543 filed in Japan on Sep. 8, 2009 under the Paris Convention and provisions of national law in a designated State, the entire contents of which are hereby incorporated by reference.

EXPLANATION OF REFERENCE NUMERALS

1, 2: transparent substrate
3: liquid crystal layer
4: homogeneous liquid crystal
4d: alignment direction of homogeneous liquid crystal
5: first polarizer
5a: absorption axis of first polarizer
6: second polarizer
6a: absorption axis of second polarizer
7: transparent protective layer
8: nematic liquid crystal
10: liquid crystal display panel
11: first phase plate
11d: alignment direction of first phase plate
12: second phase plate
12a: slow axis of second phase plate
13: third phase plate
14: adhesive layer

The invention claimed is:

1. A liquid crystal display device comprising:
a first polarizer;
a second polarizer;
a liquid crystal display panel;
a first phase plate; and
a second phase plate, wherein
the second polarizer is disposed to face the first polarizer,
the liquid crystal display panel is provided between the first polarizer and the second polarizer,
the first phase plate and the second phase plate are provided between the first or second polarizer and the liquid crystal display panel independently of each other,
the liquid crystal display panel has a pair of substrates disposed to face each other and a liquid crystal layer sandwiched between the pair of substrates,
the liquid crystal layer includes a homogeneously aligned liquid crystal molecule,
the first phase plate includes a liquid crystal film,
the liquid crystal film is formed by being set in a state where a nematic liquid crystal is hybrid-aligned, and
a specific phase difference as a phase difference in a perpendicular direction of a member which is present between the first and second polarizers, excluding the liquid crystal layer and the first phase plate, is 120 nm or more.

2. The liquid crystal display device according to claim 1, wherein
the first polarizer, the first phase plate, the liquid crystal display panel, the second phase plate, and the second polarizer are disposed in this order, and
the specific phase difference is 120 nm or more and 300 nm or less.

3. The liquid crystal display device according to claim 1, further comprising a transparent protective layer having a phase difference in a perpendicular direction of 25 nm or more and 35 nm or less, wherein
the first polarizer, the transparent protective layer, the first phase plate, the liquid crystal display panel, the second phase plate, and the second polarizer are disposed in this order, and
the specific phase difference is 150 nm or more and 330 nm or less.

4. The liquid crystal display device according to claim 1, further comprising a third phase plate exhibiting optically negative uniaxiality in a perpendicular direction, wherein the first polarizer, the first phase plate, the liquid crystal display panel, the second phase plate, the third phase plate, and the second polarizer are disposed in this order, and the specific phase difference is 140 nm or more and 250 nm or less.

5. The liquid crystal display device according to claim 1, further comprising a third phase plate exhibiting optically negative uniaxiality in a perpendicular direction, wherein the first polarizer, the first phase plate, the liquid crystal display panel, the third phase plate, the second phase plate, and the second polarizer are disposed in this order, and the specific phase difference is 130 nm or more and 290 nm or less.

6. The liquid crystal display device according to claim 1, further comprising a third phase plate exhibiting optically negative uniaxiality in a perpendicular direction, wherein the first polarizer, the first phase plate, the third phase plate, the liquid crystal display panel, the second phase plate, and the second polarizer are disposed in this order, and the specific phase difference is 130 nm or more and 290 nm or less.

7. The liquid crystal display device according to claim 1, further comprising a third phase plate exhibiting optically negative uniaxiality in a perpendicular direction, wherein the first polarizer, the third phase plate, the first phase plate, the liquid crystal display panel, the second phase plate, and the second polarizer are disposed in this order, and the specific phase difference is 140 nm or more and 250 nm or less.

8. The liquid crystal display device according to claim 1, wherein the first polarizer, the second phase plate, the first phase plate, the liquid crystal display panel, and the second polarizer are disposed in this order, and the specific phase difference is 120 nm or more and 260 nm or less.

9. The liquid crystal display device according to claim 1, further comprising a transparent protective layer having a phase difference in a perpendicular direction of 25 nm or more and 35 nm or less, wherein the first polarizer, the transparent protective layer, the second phase plate, the first phase plate, the liquid crystal display panel, and the second polarizer are disposed in this order, and the specific phase difference is 150 nm or more and 240 nm or less.

10. The liquid crystal display device according to claim 1, further comprising a third phase plate exhibiting optically negative uniaxiality in a perpendicular direction, wherein the first polarizer, the second phase plate, the first phase plate, the liquid crystal display panel, the third phase plate, and the second polarizer are disposed in this order, and the specific phase difference is 140 nm or more and 250 nm or less.

11. The liquid crystal display device according to claim 1, further comprising a third phase plate exhibiting optically negative uniaxiality in a perpendicular direction, wherein the first polarizer, the second phase plate, the first phase plate, the third phase plate, the liquid crystal display panel, and the second polarizer are disposed in this order, and the specific phase difference is 140 nm or more and 210 nm or less.

12. The liquid crystal display device according to claim 1, further comprising a third phase plate exhibiting optically negative uniaxiality in a perpendicular direction, wherein the first polarizer, the second phase plate, the third phase plate, the first phase plate, the liquid crystal display panel, and the second polarizer are disposed in this order, and the specific phase difference is 130 nm or more and 210 nm or less.

13. The liquid crystal display device according to claim 1, further comprising a third phase plate exhibiting optically negative uniaxiality in a perpendicular direction, wherein the first polarizer, the third phase plate, the second phase plate, the first phase plate, the liquid crystal display panel, and the second polarizer are disposed in this order, and the specific phase difference is 140 nm or more and 270 nm or less.

14. The liquid crystal display device according to claim 1, wherein the specific phase difference is 330 nm or less.

15. The liquid crystal display device according to claim 1, wherein the first polarizer, the first phase plate, the liquid crystal display panel, the second phase plate, and the second polarizer are disposed in this order, and the specific phase difference is 150 nm or more and 250 nm or less.

16. The liquid crystal display device according to claim 1, wherein the first polarizer, the second phase plate, the first phase plate, the liquid crystal display panel, and the second polarizer are disposed in this order, and the specific phase difference is 150 nm or more and 210 nm or less.

17. The liquid crystal display device according to claim 1, wherein a non-gray scale inversion share of the liquid crystal display device is 60% or more.

18. A liquid crystal display device comprising:
a first polarizer;
a second polarizer;
a liquid crystal display panel;
a first phase plate; and
a second phase plate, wherein
the second polarizer is disposed to face the first polarizer,
the liquid crystal display panel is provided between the first polarizer and the second polarizer,
the first phase plate is provided between the first polarizer and the liquid crystal display panel,
the second phase plate is provided between the second polarizer and the liquid crystal display panel,
the liquid crystal display panel has a pair of substrates disposed to face each other and a liquid crystal layer sandwiched between the pair of substrates,
the liquid crystal layer includes a homogeneously aligned liquid crystal molecule,
a phase difference of the liquid crystal display panel is 210 to 310 nm,
the first phase plate includes a liquid crystal film,
the liquid crystal film is formed by being set in a state where a nematic liquid crystal is hybrid-aligned,
an average tilt angle of the nematic liquid crystal is 34 to 40°,
an in-plane phase difference of the second phase plate is 130 to 150 nm, and
an Nz coefficient of the second phase plate is 1.35 to 1.75.

19. The liquid crystal display device according to claim 18, wherein a non-gray scale inversion share of the liquid crystal display device is 60% or more.

\* \* \* \* \*